United States Patent
Jang et al.

(10) Patent No.: US 12,238,550 B2
(45) Date of Patent: Feb. 25, 2025

(54) METHOD AND APPARATUS FOR CONFIGURATION OF REPETITIVE TRANSMISSION AND RECEPTION OF DOWNLINK CONTROL INFORMATION IN WIRELESS COMMUNICATION SYSTEM

(71) Applicant: Samsung Electronics Co., Ltd., Suwon-si (KR)

(72) Inventors: Youngrok Jang, Suwon-si (KR); Taehyoung Kim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 17/576,493

(22) Filed: Jan. 14, 2022

(65) Prior Publication Data

US 2022/0240111 A1    Jul. 28, 2022

(30) Foreign Application Priority Data

Jan. 15, 2021 (KR) .................. 10-2021-0006333
Jan. 27, 2021 (KR) .................. 10-2021-0011826
Aug. 27, 2021 (KR) .................. 10-2021-0114198

(51) Int. Cl.
*H04W 24/08* (2009.01)
*H04W 72/04* (2023.01)
(Continued)

(52) U.S. Cl.
CPC ....... *H04W 24/08* (2013.01); *H04W 72/0446* (2013.01); *H04W 72/0473* (2013.01); *H04W 72/23* (2023.01); *H04W 72/51* (2023.01)

(58) Field of Classification Search
None
See application file for complete search history.

(56) References Cited

U.S. PATENT DOCUMENTS

2020/0022144 A1* 1/2020 Papasakellariou .... H04W 72/23
2020/0169991 A1   5/2020 Lin et al.
(Continued)

FOREIGN PATENT DOCUMENTS

| WO | 2020013559 A1 | 1/2020 |
| WO | 2020020780 A1 | 1/2020 |
| WO | 2020087326 A1 | 5/2020 |

OTHER PUBLICATIONS

International Search Report and Written Opinion of the International Searching Authority dated Apr. 20, 2022, in connection with International Application No. PCT/KR2022/000744, 6 pages.

(Continued)

*Primary Examiner* — Hong Shao

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method for coverage enhancement for a PDCCH in a wireless communication system. The disclosure provides a method for effectively improving the reception reliability of downlink control information in a mobile communication system via multiple transmission points (TRPs).

16 Claims, 21 Drawing Sheets

(51) Int. Cl.
   *H04W 72/044* (2023.01)
   *H04W 72/0446* (2023.01)
   *H04W 72/23* (2023.01)
   *H04W 72/51* (2023.01)

(56) References Cited

U.S. PATENT DOCUMENTS

2021/0250922 A1    8/2021   Xu et al.
2021/0385826 A1*  12/2021   Moon ..................... H04L 1/00

OTHER PUBLICATIONS

Ericsson, "Maintenance of PDCCH for NR URLLC," R1-2007703, 3GPP TSG-RAN WG1 Meeting #103-e, Online, Oct. 26-Nov. 13, 2020, 5 pages.
Samsung, "Enhancements on Multi-TRP for PDCCH, PUCCH and PUSCH," R1-2008149, 3GPP TSG RAN WG1 #103-e, e-Meeting, Oct. 26-Nov. 13, 2020, 11 pages.
ZTE, "Multi-TRP enhancements for PDCCH, PUCCH and PUSCH," R1-2007764, 3GPP TSG RAN WG1 Meeting #103-e, e-Meeting, Oct. 26-Nov. 13, 2020, 22 pages.
Supplementary European Search Report dated Feb. 21, 2024, in connection with European Application No. 22739774.2, 10 pages.

\* cited by examiner

FIG. 9

| R (910) | Serving Cell ID (915) | BWP ID (920) | Oct 1 (900) |
| CORESET ID (925) | TCI State ID (930) | | Oct 2 (905) |

METHOD AND APPARATUS FOR CONFIGURATION OF REPETITIVE TRANSMISSION AND RECEPTION OF DOWNLINK CONTROL INFORMATION IN WIRELESS COMMUNICATION SYSTEM

CROSS-REFERENCE TO RELATED APPLICATIONS

This application is based on and claims priority under 35 U.S.C. 119 to Korean Patent Application Nos. 10-2021-0006333, 10-2021-0011826, and 10-2021-0114198, filed on Jan. 15, 2021, Jan. 27, 2021, and Aug. 27, 2021, in the Korean Intellectual Property Office, the disclosures of which are herein incorporated by reference in their entirety.

BACKGROUND

1. Field

The disclosure relates to operations of a UE and a base station in a wireless communication system. More particularly, the disclosure relates to a method for configuring repetitive transmission of downlink control information in a wireless communication system, and an apparatus capable of performing the same.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the advance of wireless communication systems as described above, various services can be provided, and accordingly there is a need for schemes to effectively provide these services.

SUMMARY

The disclosure may provide an apparatus and a method capable of effectively providing a service in a mobile communication system.

In an embodiment, a method performed by a terminal in a wireless communication system is provided. The method includes receiving configuration information for physical downlink control channel (PDCCH) monitoring, identifying, based on the configuration information, monitoring occasions related to a first PDCCH candidate and a second PDCCH candidate for detection of a first downlink control information (DCI) format and a monitoring occasion related to a third PDCCH candidate for detection of a second DCI format, and performing the PDCCH monitoring based on the identification. the third PDCCH candidate is not counted for a number of blind decodings, in case that one of the first PDCCH candidate and the second PDCCH candidate overlaps with the third PDCCH candidate.

In an embodiment, a terminal in a wireless communication system is provided. The terminal includes a transceiver and a controller. The controller is configured to receive, via the transceiver, configuration information for physical downlink control channel (PDCCH) monitoring, identify, based on the configuration information, monitoring occasions related to a first PDCCH candidate and a second PDCCH candidate for detection of a first downlink control information (DCI) format and a monitoring occasion related to a third PDCCH candidate for detection of a second DCI forma, and perform the PDCCH monitoring based on the identification. The third PDCCH candidate is not counted for a number of blind decodings, in case that one of the first PDCCH candidate and the second PDCCH candidate overlaps with the third PDCCH candidate.

According to an embodiment of the disclosure, the reception reliability of downlink control information may be effectively improved in a mobile communication system via multiple transmission points (TRPs).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates a TCI indication MAC CE signaling structure for a PDCCH DMRS in a wireless communication system according to an embodiment of the disclosure;

DETAILED DESCRIPTION

Figure 1:
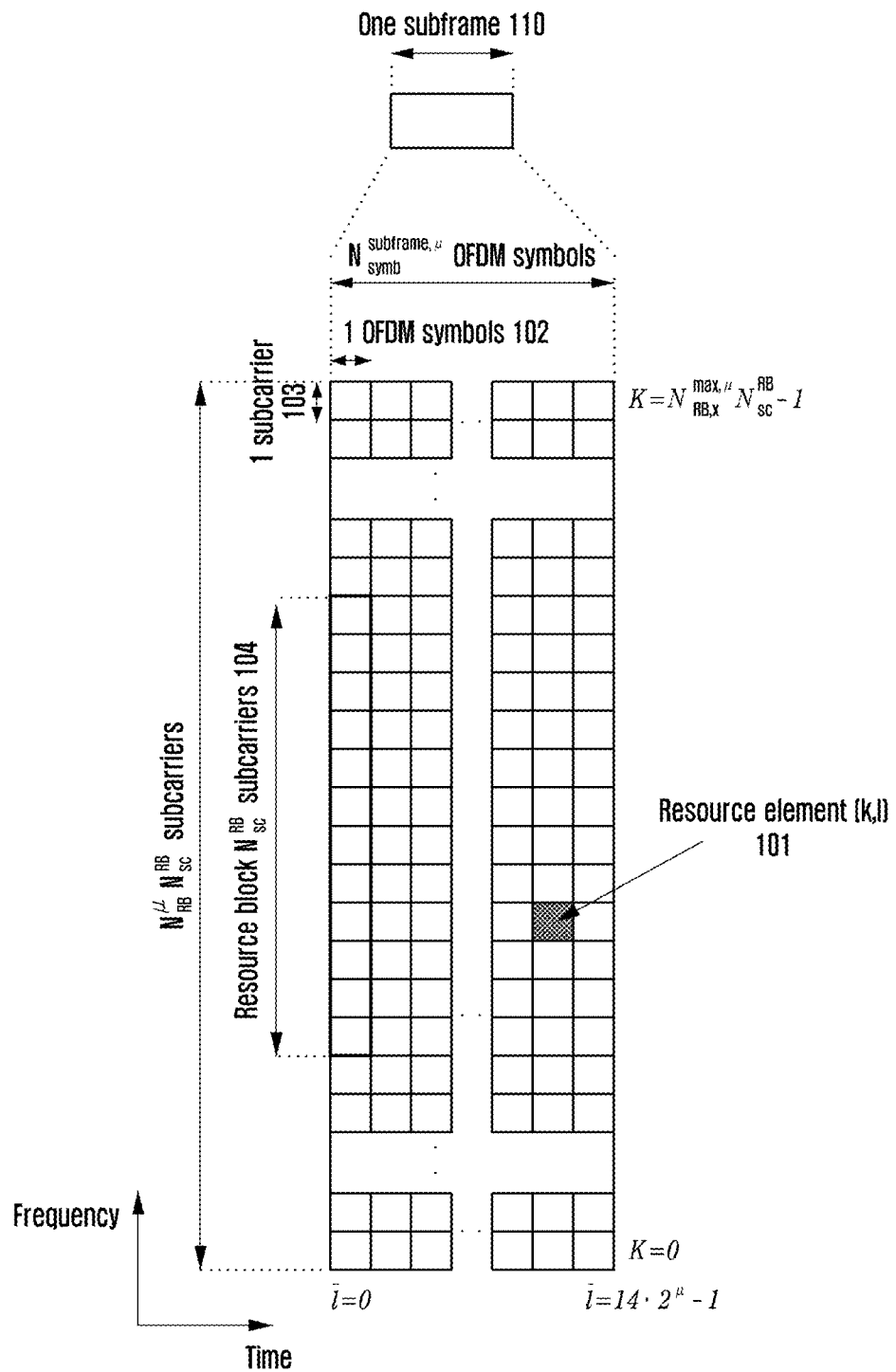
FIG. 1 illustrates a basic structure of a time-frequency domain in a wireless communication system according to an embodiment of the disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have been developed from wireless communication systems providing voice-centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.16e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (BS or eNodeB), and the DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, a 5G communication system has to be able to freely reflect various requirements of a user and a service provider, and thus services satisfying various requirements at the same time need to be supported. The services considered for the 5G communication system include enhanced mobile broadband (eMBB), massive machine-type communication (mMTC), ultra-reliability low latency communication (URLLC), and the like.

eMBB aims to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multi-input multi-output (MIMO) transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Things (IoT) in the 5G communication system. mMTC is required for access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and devices to provide communication functions. In addition, because the terminals supporting mMTC are more likely to be positioned in shaded areas not covered by a cell, such as a basement of a building due to nature of services, the terminals require a wider coverage than other services provided by the 5G communication system. The terminals that support mMTC should be configured as inexpensive terminals and require very long battery lifetime, such as 10 to 15 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC should provide very low latency and very high reliability. For example, URLLC-supportive services need to meet an air interface latency of less than 0.5 milliseconds and simultaneously include requirements of a packet error rate of 10$^{-5}$ or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the above 5G communication system may be multiplexed in one system and may be transmitted. Here, the services may use different transmission/reception techniques and transmission/reception parameters in order to satisfy different requirements. However, 5G is not limited to the above three services.

[NR Time-Frequency Resource]

Hereinafter, the frame structure of a 5G system will be described in more detail with reference to the drawings.

FIG. 1 illustrates the basic structure of a time-frequency domain, which is a radio resource domain in which data or a control channel is transmitted in a 5G system.

Referring to FIG. 1, the horizontal axis represents a time domain, and the vertical axis represents a frequency domain. A basic unit of resources in the time-frequency domain may be a resource element (RE) 101. The resource element 101 may be defined by 1 orthogonal frequency division multiplexing (OFDM) symbol 102 in a time domain and 1 subcarrier 103 in a frequency domain. In the frequency domain, $N_{sc}^{RB}$ (for example, 12) consecutive REs may configure one resource block (RB) 104.

Figure 2:
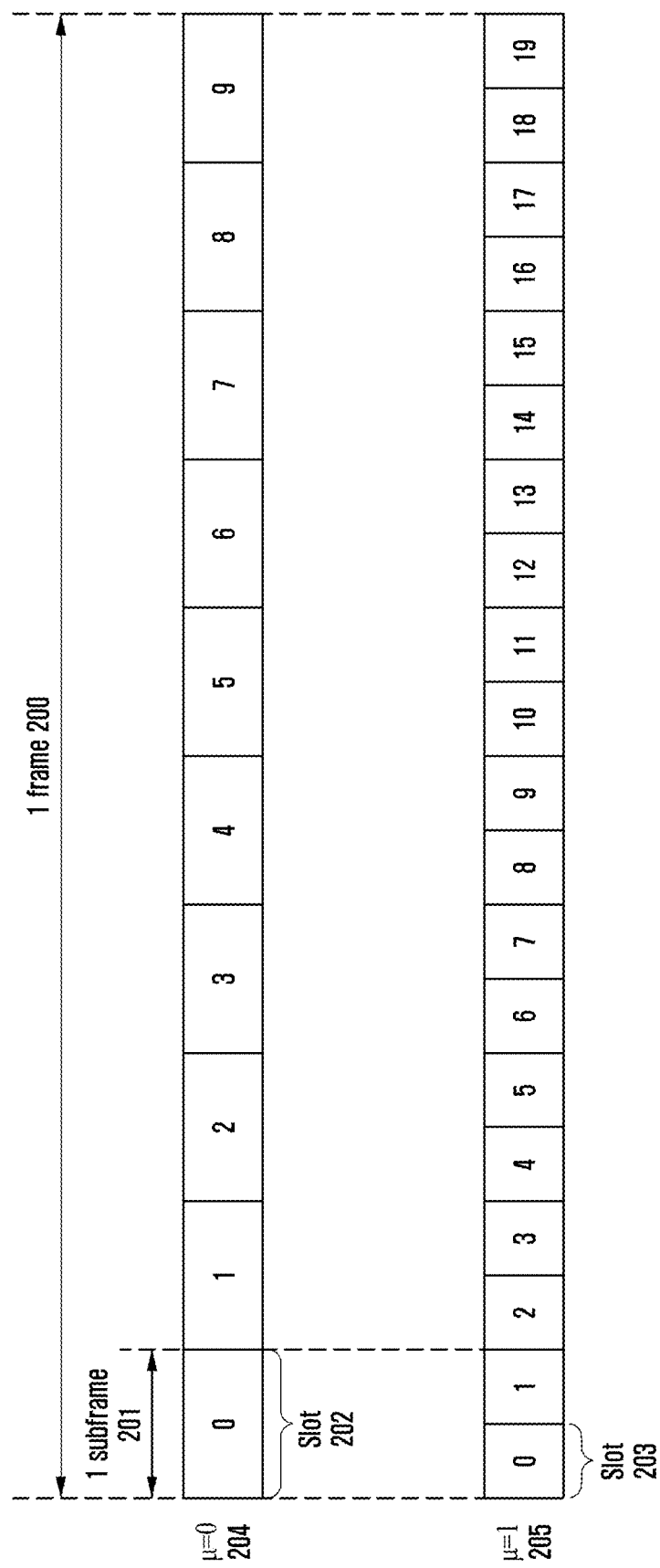
FIG. 2 illustrates a frame, a subframe, and a slot structure in a wireless communication system according to an embodiment of the disclosure.

FIG. 2 illustrates a slot structure considered in a 5G system.

Referring to FIG. 2, an example of a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the number of symbols for one slot ($N_{symb}^{slot}$=14)). One subframe 201 may include one or multiple slots 202 and 203, and the number of slots 202 and 203 per one subframe 201 may differ according to configuration value μ 204 or 205 for a subcarrier spacing. In the example of FIG. 2, a case in which the subcarrier spacing configuration value is μ=0 (indicated by reference numeral 204) and μ=1 (indicated by reference numeral 205) is illustrated. If μ=0 (indicated by reference numeral 204), one subframe 201 may include one slot 202, and if μ=1 (indicated by reference numeral 205), one subframe 201 may include two slots 203. That is, the number of slots per one subframe ($N_{slot}^{subframe,\mu}$) may differ according to a subcarrier spacing configuration value μ, and accordingly, the number of slots per one frame ($N_{slot}^{frame,\mu}$) may differ. According to each subcarrier spacing configuration μ, $N_{slot}^{subframe,\mu}$ and $N_{slot}^{frame,\mu}$ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, the bandwidth part (BWP) configuration in a 5G communication system will be described in detail with reference to the drawings.

Figure 3:
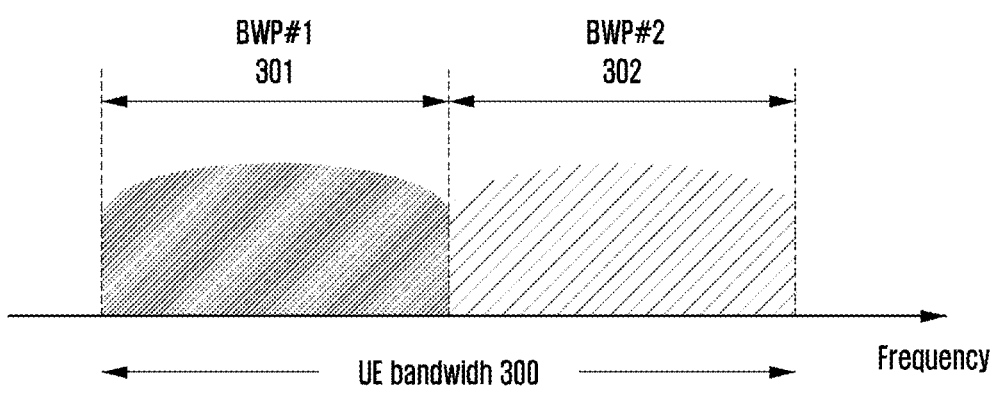
FIG. 3 illustrates an example of configuration a bandwidth part in a wireless communication system according to an embodiment of the disclosure.

FIG. 3 illustrates an example of configuration about a BWP in a 5G communication system.

Referring to FIG. 3, an example, in which a UE bandwidth 300 is configured by two BWPs, that is, BWP #1 301 and BWP #2 302, is shown. The base station may configure one or multiple BWPs for the UE, and may configure pieces of information as shown in Table 2 below for each bandwidth part.

TABLE 2

| | |
|---|---|
| BWP ::= | SEQUENCE { |
| bwp-Id | BWP-Id, |
| (Bandwidth part identifier) | |
| locationAndBandwidth | INTEGER (1..65536), |
| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

An embodiment of the disclosure is not limited to the above example, and in addition to the configuration information, various parameters related to a BWP may be configured in the UE and some pieces of information may be omitted. The pieces of information may be transmitted by the base station to the UE via higher layer signaling, for example, radio resource control (RRC) signaling. At least one BWP among the configured one or multiple BWPs may be activated. Whether to activate the configured BWP may be semi-statically transmitted from the base station to the UE via RRC signaling or may be dynamically transmitted through downlink control information (DCI).

According to some embodiments, a UE before radio resource control (RRC) connection may be configured with an initial bandwidth part (BWP) for initial access from a base station through a master information block (MIB). More specifically, the UE may receive configuration information about a search apace and a control resource set (CORESET) through which the PDCCH for reception of system information required for initial access (which may correspond to remaining system information (RMSI) or system information block 1 (SIB 1)) may be transmitted through the MIB in an initial access operation. The control resource set (CORESET) and search space, which are configured through the MIB, may be regarded as identity (ID) 0, respectively. The base station may notify the UE of configuration information, such as frequency allocation information, time allocation information, and numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identifier (ID) of the initial BWP may be regarded as zero.

The configuration of the BWP supported by 5G may be used for various purposes.

According to some embodiments, a case, in which a bandwidth supported by the UE is less than a system bandwidth, may be supported through the BWP configuration. For example, the base station configures, in the UE, a frequency location (configuration information 2) of the BWP to enable the UE to transmit or receive data at a specific frequency location within the system bandwidth.

Further, according to some embodiments, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

In addition, according to some embodiments, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channel of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data to be transmitted or received has occurred, the UE may transmit or receive data in a BWP of 100 MHz according to an indication of the base station.

In a method of configuring the BWP, the UEs before the RRC connection may receive configuration information about the initial bandwidth part through the master information block (MIB) in the initial connection operation. More specifically, the UE may be configured with a control resource set (CORESET) for a downlink control channel through which downlink control information (DCI) for scheduling a system information block (SIB) may be transmitted from a MIB of a physical broadcast channel (PBCH). The bandwidth of the control resource set configured through the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

[Bandwidth Part (BWP) Switch]

When one or more BWPs have been configured for a UE, a base station may indicate the UE to change (or switch, transition) the BWP by using a bandwidth part indicator field in DCI. As an example, in FIG. 3, when the currently activated BWP of the UE is BWP #1 301, the base station may indicate BWP #2 302 to the UE by using the BWP indicator in DCI, and the UE may perform a BWP switch to the BWP #2 302 indicated by the BWP indicator in the received DCI.

As described above, since the DCI-based BWP change may be indicated by the DCI scheduling the PDSCH or PUSCH, when receiving a request to switch the BWP, the UE should smoothly receive or transmit the PDSCH or PUSCH, which is scheduled by the DCI, without difficulty in the switched BWP. To this end, the standard stipulates the requirements for a delay time ($T_{BWP}$) required when switching the BWP, and may be defined, for example, as shown in Table 3 below.

TABLE 3

| | NR Slot | BWP switch delay $T_{BWP}$ (slots) | |
|---|---|---|---|
| μ | length (ms) | Type 1 Note 1 | Type 2 Note 1 |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP switch delay time support type 1 or type 2 depending on UE capability. The UE may report a BWP delay time type that is supportable to the base station.

When the UE receives the DCI including the BWP switch indicator in slot n according to the requirements for the BWP switch delay time, the UE may complete a switch to a new BWP indicated by the BWP switch indicator at a time not later than slot n+$T_{BWP}$, and may perform transmission and reception with respect to a data channel scheduled by the corresponding DCI in the switched new BWP. When the base station intends to schedule the data channel to the new BWP, the base station may determine a time domain resource assignment for the data channel by considering the BWP switch delay time ($T_{BWP}$) of the UE. That is, when the base station schedules the data channel to the new BWP, the base station may schedule the corresponding data channel after the BWP switch delay time according to the method for determining time domain resource assignment for the data channel. Therefore, the UE may not expect the DCI indicating the BWP switch to indicate a slot offset (K0 or K2) value less than the BWP switch delay time ($T_{BWP}$).

If the UE receives the DCI (for example, DCI format 1_1 or 0_1) indicating the BWP switch, the UE may not perform transmission or reception during a time interval from a third symbol of the slot in which the PDCCH including the DCI is received to a start time of the slot indicated by the slot offset (K0 or K2) value indicated by the time domain resource assignment indicator field in the DCI. For example, if the UE has received the DCI indicating the BWP switch in slot n and the slot offset value indicated by the DCI is K, the UE may not perform transmission or reception from the third symbol of the slot n to the symbol prior to slot n+K (i.e., the last symbol of slot n+K−1).

[SS/PBCH Block]

Next, a synchronization signal (SS)/PBCH block in 5G will be described.

The SS/PBCH block may refer to a physical layer channel block including a primary SS (PSS), a secondary SS (SSS), and a PBCH. Specifically, the SS/PBCH block is as follows:
  PSS: A signal that serves as a reference for downlink time/frequency synchronization and provides some information of a cell ID.
  SSS: A signal that serves as a reference for downlink time/frequency synchronization, and provides the remaining cell ID information that is not provided by the PSS. In addition, the SSS may serve as a reference signal for demodulation of the PBCH.
  PBCH: A channel that provides essential system information required for transmission or reception of a data channel and a control channel of a UE. The essential system information may include search space related control information indicating radio resource mapping information of a control channel, scheduling control information for a separate data channel for transmission of system information, and the like.

The SS/PBCH block includes a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may obtain the MIB from the PBCH, and may be configured with the control resource set (CORESET) #0 (which may correspond to the control resource set having the CORESET index of 0) therefrom. The UE may monitor the control resource set #0 under the assumption that a demodulation reference signal (DMRS) transmitted in the selected SS/PBCH block and the control resource set #0 is quasi-co-located (QCLed). The UE may receive system information based on downlink control information transmitted from the control resource set #0. The UE may obtain, from the received system information, configuration information related to a random access channel (RACH) required for initial access. The UE may transmit a physical RACH (PRACH) to the base station by considering the selected SS/PBCH index, and the base station having received the PRACH may obtain information about an SS/PBCH block index selected by the UE. The base station may know which block is selected among the SS/PBCH blocks by the UE, and may know that the control resource set #0 associated therewith is monitored.

[DRX]

Figure 6:
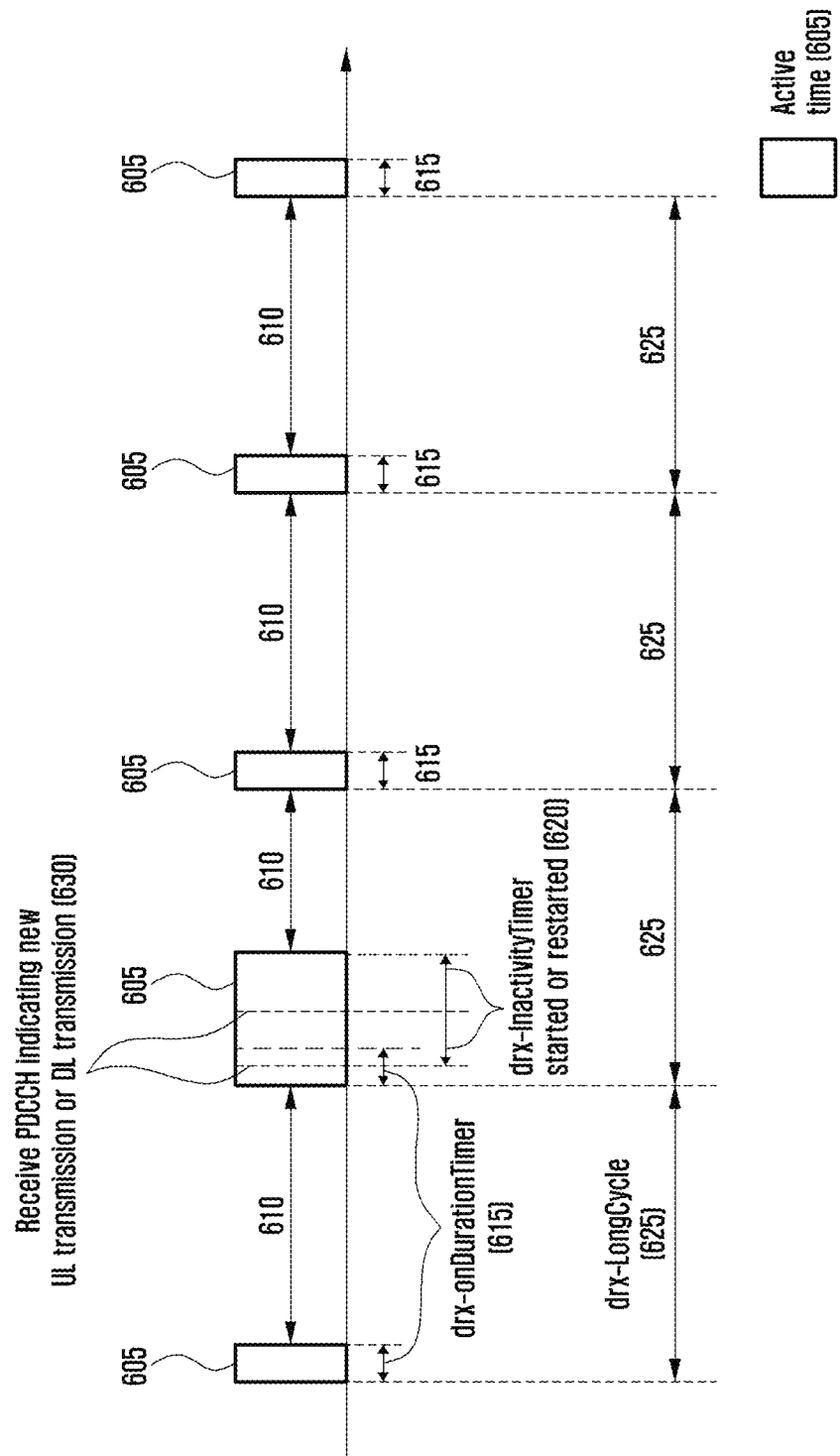
FIG. 6 illustrates an example of DRX operation in a wireless communication system according to an embodiment of the disclosure.

FIG. 6 illustrates discontinuous reception (DRX).

The discontinuous reception (DRX) is an operation in which the UE that is using a service discontinuously receives data in an RRC connected state in which a radio link is established between the base station and the UE. When the DRX is applied, the UE turns on a receiver at a specific time point to monitor a control channel and turns off the receiver when no data is received during a predetermined period, and thus the power consumption of the UE may be reduced. The DRX operation may be controlled by a MAC layer device based on various parameters and a timer.

Referring to FIG. 6, an active time 605 is a time when the UE wakes up every DRX cycle and monitors the PDCCH. The active time 605 may be defined as follows.
  drx-onDurationTimer, drx-InactivityTimer, drx-RetransmissionTimerDL, drx-RetransmissionTimerUL, or ra-ContentionResolutionTimer is running;
  a Scheduling Request is sent on PUCCH and is pending; or
  a PDCCH indicating a new transmission addressed to the C-RNTI of the MAC entity has not been received after successful reception of a random access response for the random access preamble not selected by the MAC entity among the contention-based random access preamble.

drx-onDurationTimer, drx-Inactivity Timer, drx-RetransmissionTimerDL, drx-RetransmissionTimerUL, ra-ContentionResolutionTimer, and the like are timers, the values of which are configured by the base station, and have a function of configuring the UE to monitor the PDCCH in a situation in which a predetermined condition is satisfied.

drx-onDurationTimer 615 is a parameter for configuring a minimum time for which the UE is awake in a DRX cycle. drx-InactivityTimer 620 is a parameter for configuration of a time for which the UE is additionally awake when receiving a PDCCH indicating new UL transmission or DL transmission (indicated by reference numeral 630). drx- RetransmissionTimerDL is a parameter for configuring a maximum time for which the UE is awake so as to receive DL retransmission in a DL HARQ procedure. The drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerUL may be configured as, for example, the time, the number of subframes, the number of slots, and the like. ra-ContentionResolutionTimer is a parameter for monitoring the PDCCH in a random access procedure.

inActive time 610 is a time configured not to monitor the PDCCH during the DRX operation, and/or a time configured not to receive the PDCCH, and the remaining time excluding the active time 605 from the entire time of performing the DRX operation may become the inActive time 610. When the PDCCH is not monitored for the active time 605, the UE may enter a sleep or inActive state to reduce power consumption.

The DRX cycle refers to a cycle in which the UE wakes up and monitors the PDCCH. That is, the DRX cycle refers to on duration occurrence period or a time interval until the UE monitors the PDCCH and then monitors the next PDCCH. There are two types of DRX cycles, that is, short DRX cycle and long DRX cycle. The short DRX cycle may be optionally applied.

A long DRX cycle 625 is a longer cycle between the two DRX cycles configured in the UE. The UE starts the drx-onDurationTimer 615 again at a time point at which the long DRX cycle 625 has elapsed from the start point (e.g., start symbol) of the drx-onDurationTimer 615 while operating in long DRX. When operating in the long DRX cycle 625, the UE may start the drx-onDurationTimer 615 in a slot after drx-SlotOffset in a subframe satisfying Equation 1 below. The drx-SlotOffset refers to a delay before the start of the drx-onDurationTimer 615. The drx-SlotOffset may be configured as, for example, the time, the number of slots, and the like.

[(SFN×10)+subframe number] modulo (drx-LongCycle)=drx-StartOffset  Equation 1

Here, the drx-LongCycleStartOffset may include the long DRX cycle 625 and drx-StartOffset and may be used to define a subframe to start the long DRX cycle 625. The drx-LongCycleStartOffset may be configured as, for example, the time, the number of subframes, the number of slots, and the like.

[PDCCH: DCI]

Next, downlink control information (DCI) in a 5G system will be described in detail.

In the 5G system, scheduling information about uplink data (or physical uplink shared channel (PUSCH) or downlink data (or physical downlink shared channel (PDSCH)) is transmitted from a base station to a UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a PDCCH which is a physical downlink control channel after channel coding and modulation is performed thereon. A cyclic redundancy check (CRC) may be attached to a DCI message payload, and the CRC may be scrambled by a radio network temporary identifier (RNTI) corresponding to the identification information of the UE. Different RNTIs may be used according to the purpose of the DCI message, for example, a UE-specific data transmission, a power adjustment command, or a random access response. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may know that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI. The DCI format 0_0 in which the CRC is scrambled by the C-RNTI may include, for example, pieces of information such as Table 4 below.

TABLE 4

Identifier for DCI formats - [1] bit
Frequency domain resource assignment -[⌈log$_2$ ($N_{RB}^{UL, BWP}$ ($N_{RB}^{UL, BWP}$ + 1)/2)⌉] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH- [2] bits
Uplink (UL)/Supplementary UL (SUL) indicator- 0 or 1 bit DCI format 0_1 may be used as a non-fallback DCI for scheduling a PUSCH. Here, a CRC may be scrambled by a C-RNTI. The DCI format 0_1 in which the CRC is scrambled by the C-RNTI may include, for example, pieces of information of Table 5 below.

TABLE 5

- Carrier indicator—0 or 3 bits
- UL/SUL indicator—0 or 1 bit
- Identifier for DCI formats—[1] bits
- Bandwidth part indicator—0, 1 or 2 bits
- Frequency domain resource assignment
  • For resource allocation type 0, ⌈$N_{RB}^{UL,BWP}$/P⌉ bits
  • For resource allocation type 1, ⌈log$_2$ ($N_{RB}^{UL,BWP}$ ($N_{RB}^{UL,BWP}$ + 1)/2)⌉ bits
- Time domain resource assignment—1, 2, 3, or 4 bits
- Virtual resource block (VRB)-to-physical resource block (PRB) mapping—0 or 1 bit, only for resource allocation type 1.

TABLE 5-continued

- 0 bit if only resource allocation type 0 is configured;
- 1 bit otherwise.
- Frequency hopping flag—0 or 1 bit, only for resource allocation type 1.
  - 0 bit if only resource allocation type 0 is configured;
  - 1 bit otherwise.
- Modulation and coding scheme—5 bits
- New data indicator—1 bit
- Redundancy version—2 bits
- HARQ process number—4 bits
- 1st downlink assignment index—1 or 2 bits
  - 1 bit for semi-static HARQ-ACK codebook;
  - 2 bits for dynamic HARQ-ACK codebook with single HARQ-ACK codebook.
- 2nd downlink assignment index—0 or 2 bits
  - 2 bits for dynamic HARQ-ACK codebook with two HARQ-ACK sub-codebooks;
  - 0 bit otherwise.
- TPC command for scheduled PUSCH—2 bits

- SRS resource indicator $-\left[\log_2\left(\sum_{k=1}^{L_{max}}\binom{N_{SRS}}{k}\right)\right]$ or $\lceil\log_2(N_{SRS})\rceil$ bits
  - $\left[\log_2\left(\sum_{k=1}^{L_{max}}\binom{N_{SRS}}{k}\right)\right]$ bits for non-codebook based PUSCH transmission;
  - $\lceil\log_2(N_{SRS})\rceil$ bits for codebook based PUSCH transmission.
- Precoding information and number of layers—up to 6 bits
- Antenna ports—up to 5 bits
- SRS request—2 bits
- Channel state information (CSI) request—0, 1, 2, 3, 4, 5, or 6 bits
- Code block group (CBG) transmission information—0, 2, 4, 6, or 8 bits
- Phase tracking reference signal (PTRS)-Demodulation reference signal (DMRS) association—0 or 2 bits.
- beta_offset indicator—0 or 2 bits
- DMRS sequence initialization—0 or 1 bit DCI format 1_0 may be used as a fallback DCI for scheduling a PDSCH. Here, a CRC may be scrambled by a C-RNTI. The DCI format 1_0 in which the CRC is scrambled by the C-RNTI may include, for example, the following pieces of information of Table 6 below.

TABLE 6

Identifier for DCI formats - [1] bit
Frequency domain resource assignment -$\lceil\log_2(N_{RB}^{DL,BWP}(N_{RB}^{DL,BWP}+1)/2)\rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used as a non-fallback DCI for scheduling a PDSCH. Here, a CRC may be scrambled by a C-RNTI. The DCI format 1_1 in which the CRC is scrambled by the C-RNTI may include, for example, pieces of information of Table 7 below.

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL,BWP}/P\rceil$ bits
For resource allocation type 1, $\lceil\log_2(N_{RB}^{DL,BWP}(N_{RB}^{DL,BWP}+1)/2)\rceil$ bits -continued Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power channel state information reference signal (ZP CSI-RS) trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
Code block group (CBG) flushing out information - 0 or 1 bit
DMRS sequence initialization - 1 bit

[PDCCH: CORESET, REG, CCE, Search Space]

Hereinafter, a downlink control channel in a 5G communication system will be described in more detail with reference to the drawings.

Figure 4:
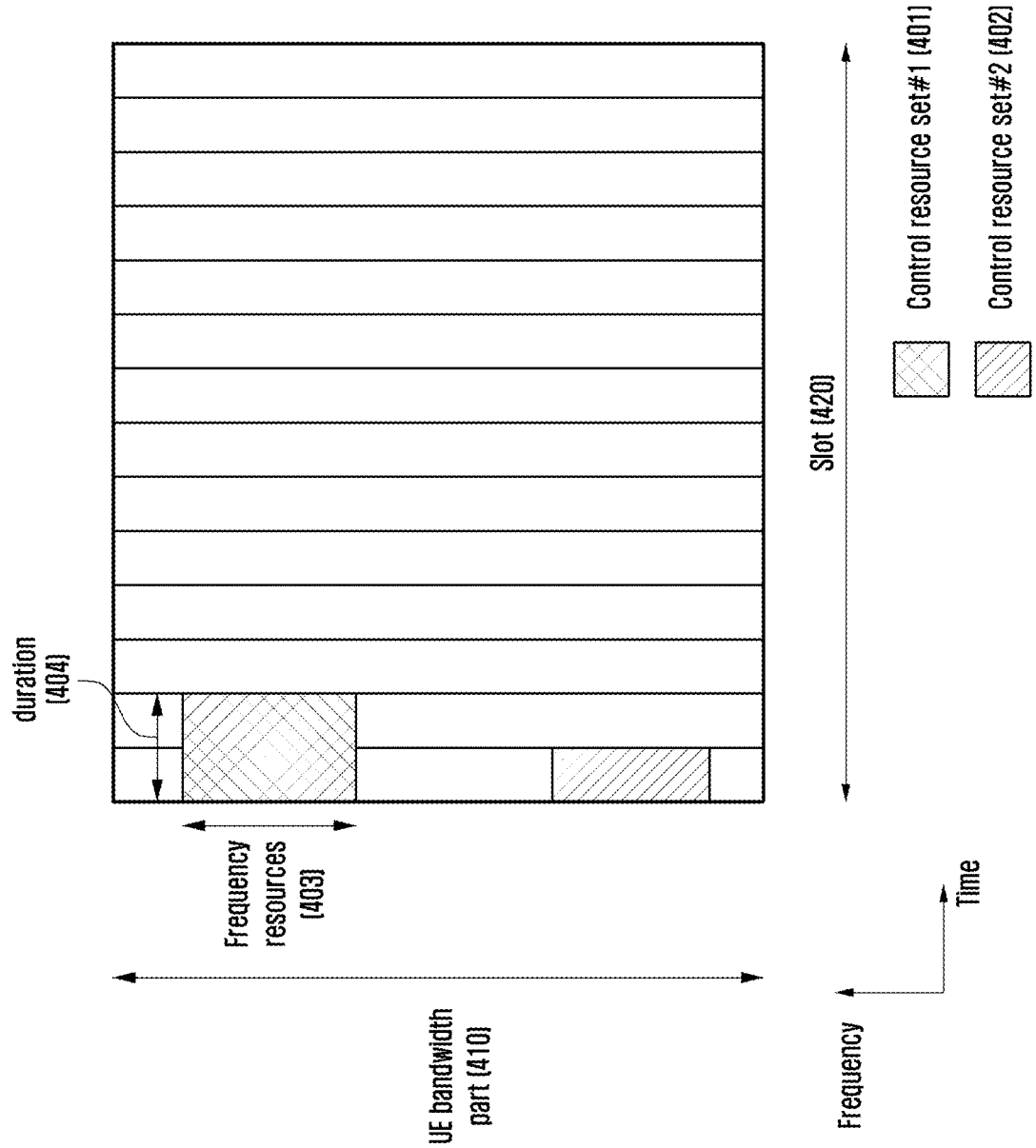
FIG. 4 illustrates an example of configuration of a control resource set of a downlink control channel in a wireless communication system according to an embodiment of the disclosure.

FIG. 4 illustrates an example of a control resource set (CORESET) through which a downlink control channel is transmitted in a 5G wireless communication system. FIG. 4 illustrates an example in which a UE BWP 410 is configured in a frequency domain and two control resource sets (control resource set #1 401 and control resource set #2 402) are configured in one slot 420 in a time domain. The control resource sets 401 and 402 may be configured in a specific frequency resource 403 within the entire UE BWP 410 in the frequency domain. The control resource set may be configured with one or multiple OFDM symbols in the time domain, and this may be defined as a control resource set duration 404. Referring to an example illustrated in FIG. 4, the control resource set #1 401 is configured with the control resource set duration of two symbols, and the control resource set #2 402 is configured with the control resource set duration of one symbol.

The above described control resource set in 5G may be configured for the UE by the base station via higher layer signaling (e.g., system information, master information block (MIB), radio resource control (RRC) signaling). Configuration of the control resource set for the UE may be understood as providing information such as a control resource set identity, a frequency location of the control resource set, a symbol length of the control resource set, and the like. The configuration information may include, for example, pieces of information of Table 8 below.

TABLE 8

```
ControlResourceSet ::=               SEQUENCE {
  -- Corresponds to L1 parameter 'CORESET-ID'
  controlResourceSetId               ControlResourceSetId,
  (Control resource set Identity)
  frequencyDomainResources           BIT STRING (SIZE (45)),
  (Frequency domain resource allocation information)
  duration                           INTEGER
(1..maxCoReSetDuration),
  (Time domain resource allocation information)
  cce-REG-MappingType                CHOICE {
  (CCE-to-REG mapping type)
    interleaved                     SEQUENCE{
      reg-BundleSize
      ENUMERATED {n2, n3, n6},
      (REG bundle size)
      precoderGranularity
      ENUMERATED {sameAsREG-bundle, allContiguousRBs},
      interleaverSize
      ENUMERATED {n2, n3, n6}
        (Interleaver size)
      shiftIndex
      INTEGER(0..maxNrofPhysicalResourceBlocks-1)
                                     OPTIONAL
        (Inverter Shift))
    },
    nonInterleaved                   NULL
  },
  tci-StatesPDCCH                    SEQUENCE(SIZE
(1..maxNrofTCI-StatesPDCCH)) OF TCI-StateId
    OPTIONAL,
    (QCL configuration information)
    tci-PresentInDCI                 ENUMERATED {enabled}
      OPTIONAL,          -- Need S
}
```

In Table 8, tci-StatesPDCCH (simply referred to as transmission configuration indication (TCI) state) configuration information may include information about one or multiple synchronization signal (SS)/physical broadcast channel (PBCH) block (that is, synchronization signal block (SSB)) indices having a quasi-co-located (QCLed) relationship with a DMRS transmitted in the corresponding control resource set or a channel state information reference signal (CSI-RS) index.

Figure 5A:
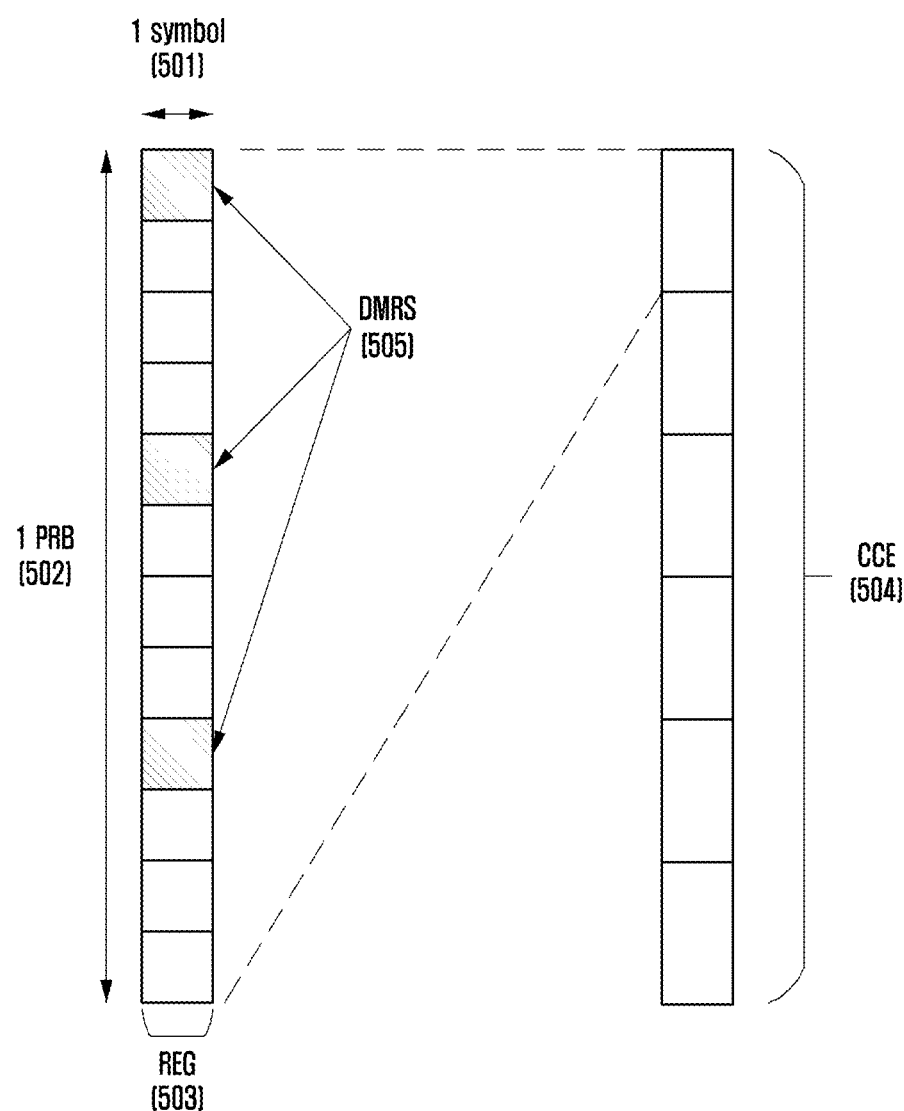
FIG. 5A illustrates a structure of a downlink control channel in a wireless communication system according to an embodiment of the disclosure.

FIG. 5A illustrates an example of a basic unit of time and frequency resources configuring a downlink control channel that can be used in 5G. Referring to FIG. 5A, the basic unit of time and frequency resources configuring a control channel may be referred to as a resource element group (REG) 503. The REG 503 may be defined by one OFDM symbol 501 in a time domain and one physical resource block (PRB) 502, that is, 12 subcarriers, in a frequency domain. The base station may concatenate the REG 503 to configure a downlink control channel allocation unit.

As shown in FIG. 5A, when a basic unit to which a downlink control channel is allocated in 5G is referred to as a control channel element (CCE) 504, one CCE 504 may include multiple REGs 503. When describing the REG 503 illustrated in FIG. 5A as an example, the REG 503 may include 12 resource elements (REs), and when one CCE 504 includes six REGs 503, one CCE 504 may include 72 REs. When the downlink control resource set is configured, the corresponding region may include multiple CCEs 504. A specific downlink control channel may be transmitted after being mapped to one or more CCEs 504 according to an aggregation level (AL) in the control resource set. The CCEs 504 in the control resource set are distinguished by numbers. Here, the numbers of the CCEs 504 may be assigned according to a logical mapping scheme.

Referring to FIG. 5A, the basic unit of the downlink control channel, that is, the REG 503 may include both REs to which DCI is mapped and a region to which a DMRS 505 which is a reference signal for decoding the DCI is mapped. As illustrated in FIG. 5A, three DMRSs 505 may be transmitted in one REG 503. The number of CCEs required for transmission of the PDCCH may be 1, 2, 4, 8, or 16 according to the aggregation level (AL). A different number of CCEs may be used to implement link adaptation of the downlink control channel. For example, if AL=L, one downlink control channel may be transmitted through L CCEs. The UE needs to detect a signal in a state in which the UE does not know information about the downlink control channel, and a search space representing a set of CCEs has been defined for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. A predetermined group of UEs or all the UEs may examine the common search space of the PDCCH so as to receive cell common control information such as dynamic scheduling of system information or a paging message. For example, PDSCH scheduling allocation information for transmission of the SIB including cell operator information and the like may be received by examining the common search space of the PDCCH. In a case of the common search space, since a predetermined group of UEs or all the UEs need to receive the PDCCH, the common search space may be defined as a set of previously appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured for the UE by the base station via higher layer signaling (e.g., SIB, MIB, RRC signaling, etc.). For example, the base station may configure, in the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the configuration information for the search space of the PDCCH may include the following pieces of information of Table 9 below.

The base station may configure the search space set 1 in the UE so that DCI format A scrambled by an X-RNTI is monitored in the common search space. The base station may configure the search space set 2 in the UE so that DCI format B scrambled by a Y-RNTI is monitored in the UE-specific search space.

TABLE 9

```
SearchSpace ::=                                  SEQUENCE {
    -- Identity of the search space. SearchSpaceId = 0 identifies the SearchSpace
configured via PBCH (MIB) or ServingCellConfigCommon.
        searchSpaceId                            SearchSpaceId,
        (Search space identity)
        controlResourceSetId                     ControlResourceSetId,
        (Control resource set identity)
        monitoringSlotPeriodicityAndOffset       CHOICE {
        (Monitoring slot level period)
        sl1
        NULL,
        sl2
        INTEGER (0..1),
        sl4
        INTEGER (0..3),
        sl5                                      INTEGER
(0..4),
        sl8
        INTEGER (0..7),
        sl10                                     INTEGER
(0..9),
        sl16                                     INTEGER
(0..15),
        sl20                                     INTEGER
(0..19)
        }
    OPTIONAL,
    duration(Monitoring length)   INTEGER (2..2559)
        monitoringSymbolsWithinSlot              BIT STRING (SIZE
(14))
    OPTIONAL,
    (Monitoring symbol in slot)
        nrofCandidates                           SEQUENCE{
        (number of PDCCH candidates for each aggregation level)
            aggregationLevel1                    ENUMERATED {n0,
n1, n2, n3, n4, n5, n6, n8},
            aggregationLevel2                    ENUMERATED {n0,
n1, n2, n3, n4, n5, n6, n8},
            aggregationLevel4                    ENUMERATED {n0,
n1, n2, n3, n4, n5, n6, n8},
            a ggregationLevel8                   ENUMERATED {n0,
n1, n2, n3, n4, n5, n6, n8},
            aggregationLevel16                   ENUMERATED {n0,
n1, n2, n3, n4, n5, n6, n8}
        },
        searchSpaceType                          CHOICE {
        (Search space type)
            -- Configures this search space as common search space (CSS) and DCI
formats to monitor.
        common
        SEQUENCE {
        (Common search space)
        }
        ue-Specific                              SEQUENCE {
        (UE-specific search space)
            -- Indicates whether the UE monitors in this USS for DCI formats 0-
0 and 1-0 or for formats 0-1 and 1-1.
            formats
            ENUMERATED {formats0-0-And-1-0, formats0-1-And-1-1},
            ...
        }
```

The base station may configure one or more search space sets for the UE according to configuration information. According to some embodiments, the base station may configure search space set 1 and search space set 2 in the UE.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI;

DCI format 2_0 with CRC scrambled by SFI-RNTI;

DCI format 2_1 with CRC scrambled by INT-RNTI;

DCI format 2_2 with CRC scrambled by TPC-PUSCH-RNTI, TPC-PUCCH-RNTI;

DCI format 2_3 with CRC scrambled by TPC-SRS-RNTI.

In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI;

DCI format 1_0/1_1 with CRC scrambled by C-RNTI, CS-RNTI, TC-RNTI.

The specified RNTIs may follow the definitions and usages described below.

C-RNTI (Cell RNTI): For UE-specific PDSCH scheduling.

Temporary Cell RNTI (TC-RNTI): For UE-specific PDSCH scheduling.

Configured Scheduling RNTI (CS-RNTI): For semi-statically configured UE-specific PDSCH scheduling.

Random access RNTI (RA-RNTI): For PDSCH scheduling in random access operation.

Paging RNTI (P-RNTI): For scheduling of PDSCH through which paging is transmitted.

System information RNTI (SI-RNTI): For PDSCH scheduling in which system information is transmitted.

Interruption RNTI (INT-RNTI): For notifying of whether to puncture PDSCH.

Transmit power adjustment for PUSCH RNTI (TPC-PUSCH-RNTI): For indication of power adjustment command for PUSCH.

Transmit Power adjustment for PUCCH RNTI (TPC-PUCCH-RNTI): For indication of power adjustment command for PUCCH.

Transmit Power adjustment for SRS RNTI (TPC-SRS-RNTI): For indication of power adjustment command for SRS.

The above-described specified DCI formats may follow the definitions shown in Table 10 below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by the following Equation 2.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{Equation 2}$$

L: Aggregation level $n_{CI}$: Carrier index $N_{CCE,p}$: Total number of CCEs existing in the control resource set p $n_{s,f}^\mu$: Slot index $M_{p,s,max}^{(L)}$: Number of PDCCH candidates of aggregation level L $m_s, nCI=0, \ldots, M_{p,s,max}^{(L)}-1$: PDCCH candidate group index of aggregation level L $i=0, \ldots, L_{-1}$ $Y_{p,n_{s,f}^\mu} = (A_p \cdot Y_{p,n_{s,f}^\mu-1}) \bmod D$, $Y_{p,-1} = n_{RNTI} \neq 0$, $A_p = 39827$ for pmod3=0, $A_p = 39829$ for pmod3=1, $A_p = 39839$ for pmod3=2, $D = 65537$ $n_{RNTI}$: UE identifier The $Y_{p,n_{s,f}^\mu}$ value may correspond to zero in the common search space.

In a case of the UE-specific search space, the $Y_{p,n_{s,f}^\mu}$ value may correspond to a value that changes according to the UE identity (C-RNTI or ID configured by the base station for the UE) and the time index.

In 5G, multiple search space sets may be configured with different parameters (e.g., parameters in Table 9), and accordingly, the set of search space sets monitored by the UE may differ at each time point. For example, if search space set #1 is configured with the X-slot period, search space set #2 is configured with the Y-slot period, and X and Y are different, the UE may monitor both search space set #1 and space set #2 in a specific slot, and may monitor one of search space set #1 and search space set #2 in a specific slot.

[PDCCH: Scrambling ID]

Next, a scrambling ID of a downlink control channel in a 5G system will be described in detail. The scrambling sequence generator of the downlink control channel may be initialized as shown in Equation 3 below.

$$c_{init} = (n_{RNTI} \cdot 2^{16} + n_{ID}) \bmod 2^{31} \quad \text{Equation 3}$$

In Equation 3, in a case of the UE-specific search space, $n_{ID}$ has an integer value between 0 and 65535, is configured through pdcch-DMRS-ScramblindID, which is higher layer signaling, and ifpdcch-DMRS-ScramblindID is not configured, $n_{ID}$ has the same value as the cell ID. In a case of the UE-specific search space in Equation 3, if pdcch-DMRS-ScramblindID is configured, $n_{RNTI}$ has the same value as C-RNTI, and if pdcch-DMRS-ScramblindID is not configured, $n_{RNTI}$ has the value of 0.

[PDCCH DMRS: Scrambling ID]

Next, a scrambling ID of DMRS of a downlink control channel in a 5G system will be described in detail. The scrambling sequence generator of DMRS of the downlink control channel may be initialized as shown in Equation 4 below.

$$c_{init} = (2^{17}(N_{symb}^{slot} n_{s,f}^\mu + l + 1)(2N_{ID}+1) + 2N_{ID}) \bmod 2^{31} \quad \text{Equation 4}$$

In Equation 4, $N_{ID}$ has the value configured through pdcch-DMRS-ScramblindID, which is higher layer signaling, and if pdcch-DMRS-ScramblindID is not configured, $n_{ID}$ has the same value as the cell ID. In Equation 4, $n_{s,f}^\mu$ and l denote a slot index and an OFDM symbol index, respectively. Accordingly, it can be seen that the scrambling sequence of the PDCCH DMRS is initialized for every slot and every OFDM symbol.

[PDCCH: Span]

A UE may perform, for each subcarrier spacing, UE capability reporting for a case of having multiple PDCCH monitoring occasions in a slot, and in this case, the term "span" may be used. "Span" denotes consecutive symbols in which the UE can monitor a PDCCH in the slot, and each PDCCH monitoring occasion is within one span. Span may be expressed as (X,Y), where x denotes the minimum number of symbols that need to be separated between the first symbols of two consecutive spans, and Y denotes the number of consecutive symbols in which the UE can monitor the PDCCH within one span. Here, the UE may monitor the PDCCH in an interval from the first symbol of the span to the Y symbol within the span.

Figure 5B:
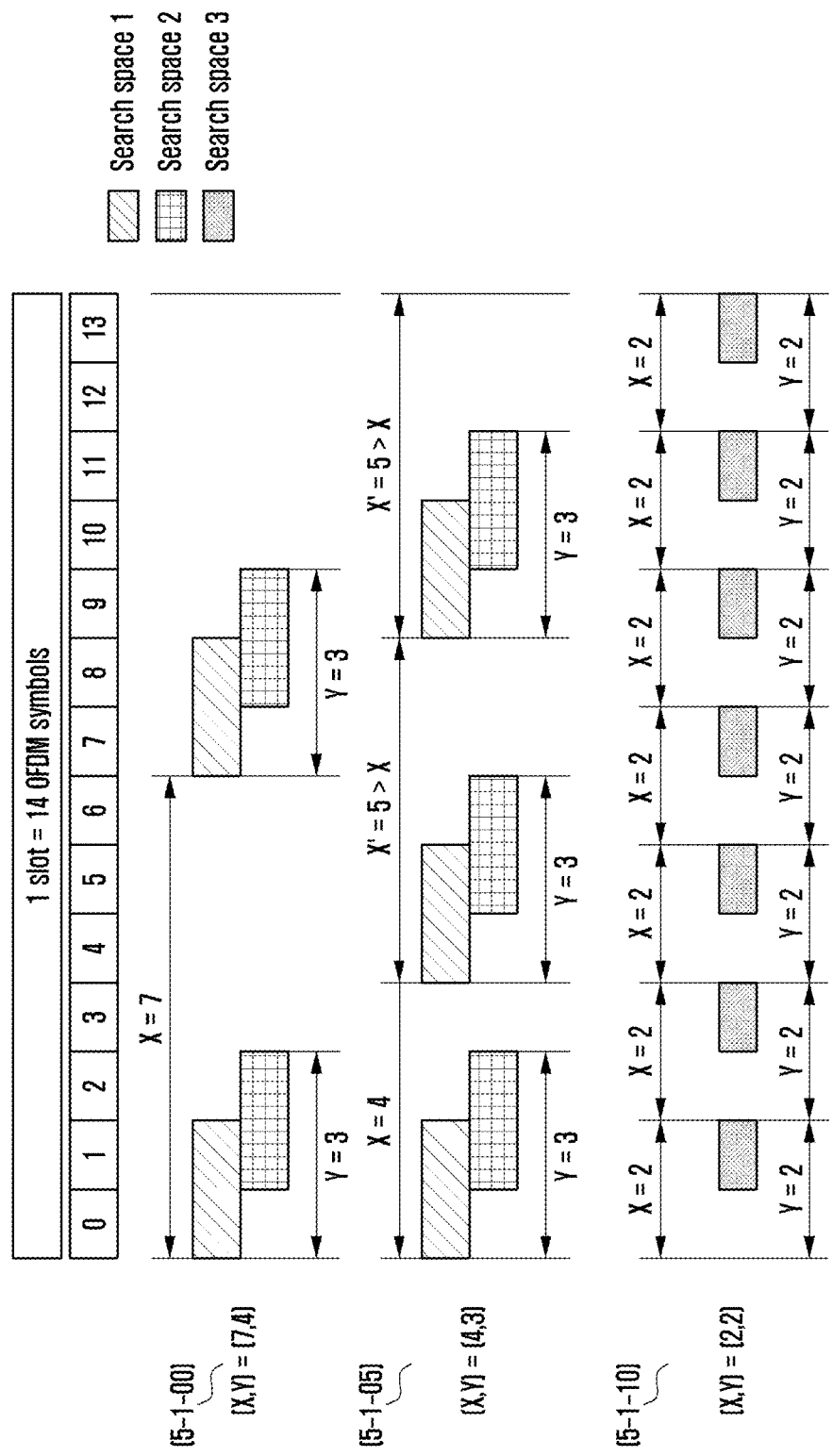
FIG. 5B illustrates, through a span, a case in which a UE may have multiple PDCCH monitoring occasions within a slot in a wireless communication system according to an embodiment of the disclosure.

FIG. 5B illustrates, through a span, a case in which a UE may have multiple PDCCH monitoring occasions within a slot in a wireless communication system. Span can be expressed as (X,Y)=(7,4), (4,3), and (2,2), and this three cases are indicated by reference numerals (5-1-00), (5-1-05), and (5-1-10), respectively, in FIG. 5B. As an example, (5-1-00) represents a case in which two spans that can be expressed by (7,4) exist in a slot. The interval between the first symbols of two spans is expressed as X=7, PDCCH monitoring occasions may exist within a total of Y symbols (Y=3) from the first symbol of each span, and search spaces 1 and 2 may exist within Y symbols (Y=3). As another example, (5-1-05) represents a case in which a total of three spans that can be expressed as (4,3) exist in a slot, and the interval between the second and third spans is shown to be separated by X' symbols (X'=5) greater than X=4.

[PDCCH: UE Capability Report]

The slot position in which the above-described common search space and UE-specific search space are located is indicated by the monitoringSlotPeriodicityAndOffset parameter in Table 9, and the symbol position in a slot is indicated by a bitmap through the monitoringSymbolsWithinSlot parameter in Table 9. On the other hand, the symbol position in a slot in which the UE can monitor the search space may be reported to the base station through the following UE capabilities.

UE capability 1 (hereinafter referred to as FG 3-1). This UE capability denotes, as shown in Table 11 below, if one monitoring occasion (MO) for the type 1 and type 3 common search space or UE-specific search space exists in a slot, UE capability capable of monitoring the MO when the corresponding MO occasion is located within the first 3 symbols in a slot. This UE capability is a mandatory capability that all UEs supporting NR should support, and whether this capability is supported is not explicitly reported to the base station.

TABLE 11

| Index | Feature group | Components | Field name in TS 38.331 |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD | n/a |

TABLE 11-continued

| Index | Feature group | Components | Field name in TS 38.331 |
|---|---|---|---|
| | | 6) Processing one unicast DCI scheduling DL and 2 unicast DCI scheduling UL per slot per scheduled CC for TDD | |

UE capability 2 (hereinafter referred to as FG 3-2). This UE capability denotes, as shown in Table 12 below, if a monitoring occasion (MO: monitoring occasion) for a common search space or a UE-specific search space exists in a slot, UE capability capable of monitoring regardless of the location of the start symbol of the MO. This UE capability may be optionally supported by the UE, and whether this capability is supported is explicitly reported to the base station.

TABLE 12

| Index | Feature group | Components | Field name in TS 38.331 |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter referred to as FG 3-5, 3-5a, and 3-5b). As shown in Table 13 below, this UE capability indicates a pattern of a MO that the UE can monitor when multiple monitoring occasions (MOs) for a common search space or a UE-specific search space exist in a slot. The above-described pattern includes an interval X between start symbols between different MOs, and a maximum symbol length Y for one MO. The combination of (X,Y) supported by the UE may be one or multiple {(2,2), (4,3), and (7,3)}. This UE capability is optionally supported by the UE, and whether this capability is supported and a combination of (X, Y) described above are explicitly reported to the base station.

TABLE 13

| Index | Feature group | Components | Field name in TS 38.331 |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions { 3-5. withoutDCI-Gap 3-5a. withDCI-Gap } |
| 3-5a | For type 1 CSS with dedicated RRC configuration, type 3 CSS, and UE-SS, monitoring occasion can be any OFDM symbol(s) of a slot for | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz | |

TABLE 13-continued

| Index | Feature group | Components | Field name in TS 38.331 |
|---|---|---|---|
| | Case 2 with a DCI gap | 4OFDM symbols for 30 kHz<br>7OFDM symbols for 60 kHz<br>with NCP<br>11OFDM symbols for 120 kHz<br>Up to one unicast DL DCI and up to one unicast UL DCI in a monitoring occasion except for the monitoring occasions of FG 3-1.<br>In addition for TDD the minimum separation between the first two UL unicast DCIs within the first 3 OFDM symbols of a slot can be zero OFDM symbols. | |
| 3-5b | All PDCCH Monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), $0 <= l <= 13$ is generated, where $b(l) = 1$ if symbol l of any slot is part of a monitoring occasion, $b(l) = 0$ otherwise. The first span in the span pattern begins at the smallest l for which $b(l) = 1$. The next span in the span pattern begins at the smallest l not included in the previous span(s) for which $b(l) = 1$. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH | |

TABLE 13-continued

| Index | Feature group | Components | Field name in TS 38.331 |
|---|---|---|---|
| | | monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether the above-described UE capability 2, and/or UE capability 3 is supported and related parameters to the base station. The base station may perform time-domain resource allocation for the common search space and the UE-specific search space based on the reported UE capability. When performing the resource allocation, the base station may prevent the UE from locating the MO in a location that cannot be monitored.

[PDCCH: BD/CCE Limit]

When multiple search space sets are configured for a UE, the following conditions may be considered in a method for determining a search space set configured to be monitored by the UE.

If the UE is configured with the value of monitoringCapabilityConfig-r16, which is higher layer signaling, as r15monitoringcapability, the UE defines the number of PDCCH candidates that can be monitored and the maximum value of the number of CCEs configuring the entire search space (here, the entire search space refers to the entire CCE set corresponding to the union area of multiple search space sets) for each slot. Further, if the value of monitoringCapabilityConfig-r16 is configured with r16monitoringcapability, the UE defines the number of PDCCH candidates that can be monitored and the maximum value of the number of CCEs configuring the entire search space (here, the entire search space refers to the entire CCE set corresponding to the union area of multiple search space sets) for each span.

[Condition 1: Limit the Maximum Number of PDCCH Candidates]

As described above, according to the configuration value of higher layer signaling, $M^\mu$, which is the maximum number of PDCCH candidate groups that the UE can monitor, may be defined by the following Table 14 if the same is defined on a slot basis in a cell configured with a subcarrier spacing of $15 \cdot 2^\mu$ kHz, and if the same is defined on a span basis, Mµ may be defined by the following Table 15.

TABLE 14

| µ | Maximum number of PDCCH candidates per slot and per serving cell ($M^\mu$) |
|---|---|
| 0 | 44 |
| 1 | 36 |
| 2 | 22 |
| 3 | 20 |

TABLE 15

| | Maximum number $M^\mu$ of monitored PDCCH candidates per span for combination (X, Y) and per serving cell | | |
|---|---|---|---|
| µ | (2, 2) | (4, 3) | (7, 4) |
| 0 | 14 | 28 | 44 |
| 1 | 12 | 24 | 36 |

[Condition 2: Limit the Maximum Number of CCEs]

As described above, according to the configuration value of higher layer signaling, $C^\mu$, which is the maximum number of CCEs configuring the entire search space (here, the entire search space denotes the entire set of CCEs corresponding to the union region of multiple search space sets), may be defined by the following Table 16 if the same is defined on a slot basis in a cell configured with a subcarrier spacing of $15 \cdot 2^\mu$ kHz, and if the same is defined on a span basis, $C^\mu$ may be defined by the following Table 17.

TABLE 16

| µ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

| | Maximum number $C^\mu$ of non-overlapped CCEs per span for combination (X, Y) and per serving cell | | |
|---|---|---|---|
| µ | (2, 2) | (4, 3) | (7, 4) |
| 0 | 18 | 36 | 56 |
| 1 | 18 | 36 | 56 |

For the convenience of description, a situation in which both conditions 1 and 2 are satisfied at a specific time point is defined as "condition A". Therefore, not satisfying condition A may refer to not satisfying at least one of the above conditions 1 and 2.

[PDCCH: Overbooking]

According to the configuration of the search space sets of the base station, a case in which condition A is not satisfied at a specific time point may occur. If condition A is not satisfied at a specific time point, the UE may select and monitor only some of the search space sets configured to satisfy condition A at the corresponding time point, and the base station may transmit PDCCH to the selected search space sets.

A method of selecting some search spaces in the entire configured search space set may conform to the following method.

If condition A for PDCCH is not satisfied at a specific time point (slot), the UE (or base station) may select a search space set, in which a search space type is configured to be a common search space, from among search space sets existing at a corresponding time point, preferentially over a search space set in which a search space type is configured to be a UE-specific search space.

If all search space sets configured to be common search spaces are selected (i.e., if condition A is satisfied even after all search spaces configured to be common search spaces are selected), the UE (or base station) may select the search space sets configured to have UE-specific search spaces. Here, if there are multiple search space sets configured to be UE-specific search spaces, a search space set having a low search space set index may have a higher priority. In consideration of the priority, the UE-specific search space sets may be selected within a range in which condition A is satisfied.

[QCL, TCI State]

In the wireless communication system, one or more different antenna ports (or different antenna ports may be replaced by one or more channels, signals, and combinations thereof, but in the description of the disclosure below, uniformly referred to as different antenna ports for convenience of explanation) may be associated with each other by a quasi co-location (QCL) configuration. The TCI state is for announcing a QCL relationship between a PDCCH (or PDCCH DMRS) and another RS or channel, and a certain reference antenna port A (reference RS #A) and another target antenna port B (target RS #B) are QCLed denotes that the UE is allowed to apply some or all of the large-scale channel parameters estimated from the antenna port A to the channel measurement from the antenna port B. QCL is required to correlate different parameters, depending on situatons, such as 1) time tracking affected by average delay and delay spread, 2) frequency tracking affected by Doppler shift and Doppler spread, 3) radio resource management (RRM) affected by average gain, and 4) beam management (BM) affected by spatial parameters. Accordingly, NR supports four types of QCL relationships as shown in Table 18 below.

TABLE 18

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters, such as angle of arrival (AoA), power angular spectrum (PAS) of AoA, angle of departure (AoD), PAS of AoD, transmit/receive channel correlation, transmit/receive beamforming, and spatial channel correlation.

The QCL relationship can be configured for the UE through the RRC parameters TCI-State and QCL-Info as shown in Table 19 below. Referring to Table 19, the base station configures one or more TCI states for the UE and informs the UE of up to two QCL relationships (qcl-Type1, qcl-Type2) for RS referring to the ID of the TCI state, that is, target RS. Here, pieces of QCL information (QCL-Info) included in each TCI state includes the serving cell index and BWP index of the reference RS indicated by the corresponding QCL information, the type and ID of the reference RS, and the QCL type as shown in Table 18 above.

TABLE 19

```
TCI-State ::=                            SEQUENCE {
  tci-StateId                            TCI-StateId,
  (ID of corresponding TCI state)
  qcl-Type1                              QCL-Info,
  (QCL information of first reference RS of RS (target RS) referring to
corresponding TCI sate ID)
  qcl-Type2                              QCL-Info
                               OPTIONAL,  -- Need R
  (QCL information of second reference RS of RS (target RS) referring to
corresponding TCI sate ID)
  ...
}
QCL-Info ::=                             SEQUENCE {
  cell                                   ServCellIndex
     OPTIONAL,            -- Need R
  (Serving cell index of reference RS indicated by corresponding QCL
information)
  bwp-Id                                 BWP-Id
     OPTIONAL, -- Cond CSI-RS-Inclicated
  (BWP index of reference RS indicated by corresponding QCL
information)
  reference Signal                       CHOICE {
     csi-rs                              NZP-CSI-RS-
ResourceId,
     ssb                                 SSB-Index
     (One of CSI-RS and SSB ID indicated by corresponding QCL
information)
  },
  qcl-Type                               ENUMERATED {typeA,
typeB, typeC, typeD},
  ...
}
```

Figure 7:
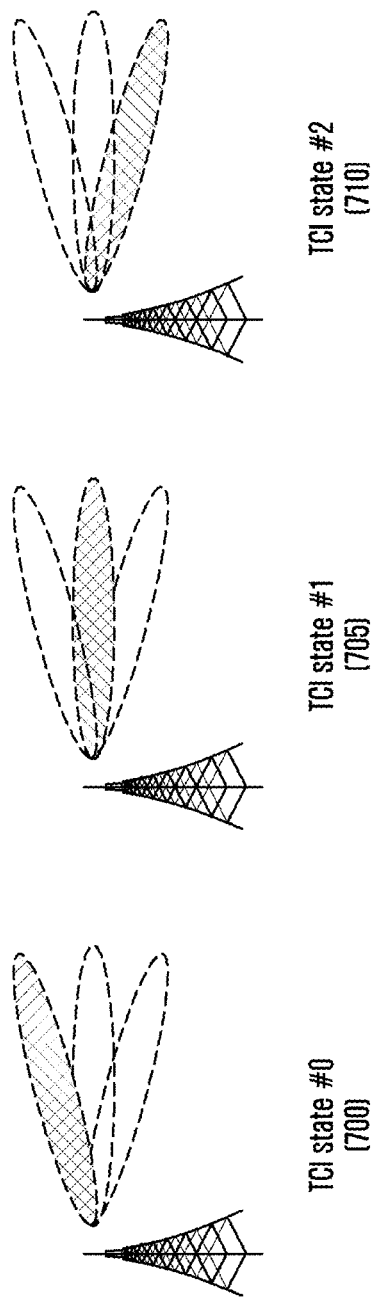
FIG. 7 illustrates an example of base station beam allocation according to a TCI state configuration in a wireless communication system according to an embodiment of the disclosure.

FIG. 7 illustrates an example of base station beam allocation according to TCI state configuration. Referring to FIG. 7, a base station may transmit information regarding N different beams to a UE through N different TCI states. For example, if N=3 as shown in FIG. 7, the base station may allow qcl-Type2 parameters included in three TCI states 700, 705, and 710 to be associated with CSI-RS or SSB corresponding to different beams, and to be configured with QCL type D, and thus may provide notification that antenna ports referring to the different TCI states 700, 705, and 710 are associated with different spatial Rx parameters, that is, different beams.

Tables 20 to 24 below show valid TCI state configurations according to target antenna port types.

Table 20 shows valid TCI state configuration when the target antenna port is CSI-RS for tracking (TRS). The TRS refers to an NZP CSI-RS, in which a repetition parameter is not configured and trs-Info is configured to be true, among CSI-RSs. Configuration 3 in Table 20 may be used for aperiodic TRS.

TABLE 20

| Valid TCI state Configuration | DL RS 1 | qcl-Typ1 | DL RS 2 (if configured) | qcl-Type2 (if configured) |
| --- | --- | --- | --- | --- |
| 1 | SSB | QCL-TypeC | SSB | QCL-TypeD |
| 2 | SSB | QCL-TypeC | CSi-RS (BM) | QCL-TypeD |
| 3 | TRS (periodic) | QCL-TypeA | TRS (same as DL RS 1) | QCL-TypeD |

Table 21 shows valid TCI state configuration when the target antenna port is CSI-RS for CSI. The CSI-RS for CSI refers to an NZP CSI-RS, in which a parameter (e.g., a repetition parameter) indicating repetition is not configured and trs-Info is not configured to be true, among CSI-RSs.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 22 shows a valid TCI state configuration when a target antenna port is CSI-RS for beam management (BM, which has the same meaning as CSI-RS for L1 RSRP reporting). The CSI-RS for BM denotes an NZP CSI-RS, in which a repetition parameter is configured and has a value of On or Off, and trs-Info is not configured to be true, among CSI-RSs.

TABLE 22

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCl-TypeA | CSI-RS (BM) | QCl-TypeD |
| 3 | SS/PBCH Block | QCL-TypeC | SS/PBCH Block | QCl-TypeD |

Table 23 shows valid TCI state configuration when a target antenna port is a PDCCH DMRS.

TABLE 23

| Valid Ta state Configuration | DL RS 1 | qcl-Type1 | DLRS 2 (if configured) | qcl-Type2 (if configured) |
|---|---|---|---|---|
| 1 | TRS | QCl-TypeA | TRS (same as DL RS 1) | QCL-TypeD |
| 1 | TRS | QCl-TypeA | CSI-RS (BM) | QCL-TypeD |
| 3 | CSI-RS (CSI) | QCl-TypeA | CSI-RS (same as DL RS 1) | QCL-TypeD |

Table 24 shows a valid TCI state configuration when the target antenna port is a PDSCH DMRS.

TABLE 24

| Valid TCI state Configuration | DL RS 1 | qcl-Type1 | DL RS 2 (If configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration method according to Tables 20 to 24, a target antenna port and a reference antenna port for each stage are configured to be "SSB" →"TRS"→"CSI-RS for CSI, CSI-RS for BM, PDCCH DMRS, or PDSCH DMRS". Accordingly, it is possible to link the statistical characteristics that can be measured from the SSB and the TRS to each of antenna ports to help the reception operation of a UE.

[PDCCH: TCI State]

Specifically, TCI state combinations applicable to a PDCCH DMRS antenna port are shown in Table 25 below. In Table 25, the fourth row is a combination assumed by the UE before RRC configuration, and configuration after RRC is not possible.

TABLE 25

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
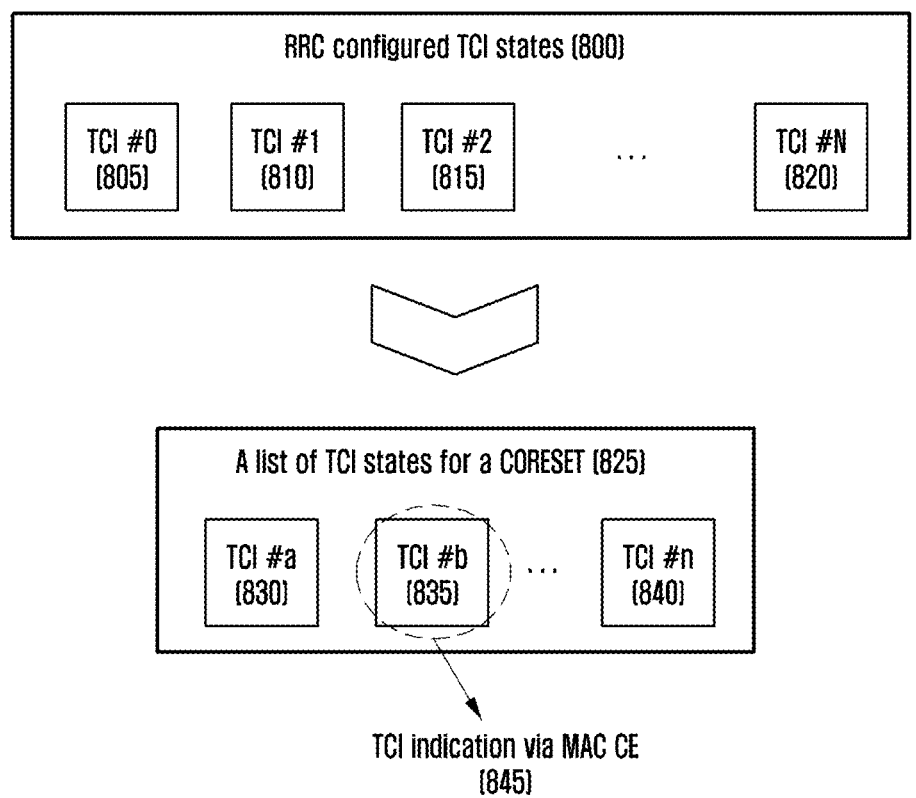
FIG. 8 illustrates an example of a TCI state allocation method for a PDCCH in a wireless communication system according to an embodiment of the disclosure.

In NR, a hierarchical signaling method as shown in FIG. 8 is supported for dynamic allocation of a PDCCH beam. Referring to FIG. 8, a base station may configure N TCI states 805, 810, . . . , and 820 for a UE via RRC signaling 800, and may configure some of the TCI states as TCI states for a CORESET (indicated by reference numeral 825). Thereafter, the base station may indicate one of the TCI states 830, 835, and 840 for the CORESET to the UE via MAC CE signaling (indicated by reference numeral 845). Thereafter, the UE may receive a PDCCH based on beam information included in a TCI state indicated by the MAC CE signaling.

FIG. 9 illustrates a TCI indication MAC CE signaling structure for the PDCCH DMRS. Referring to FIG. 9, the TCI indication MAC CE signaling for the PDCCH DMRS is configured by 2 bytes (16 bits), and includes a serving cell ID 915 formed of 5 bits, a CORESET ID 920 formed of 4 bits, and a TCI state ID 925 formed of 7 bits.

Figure 10:
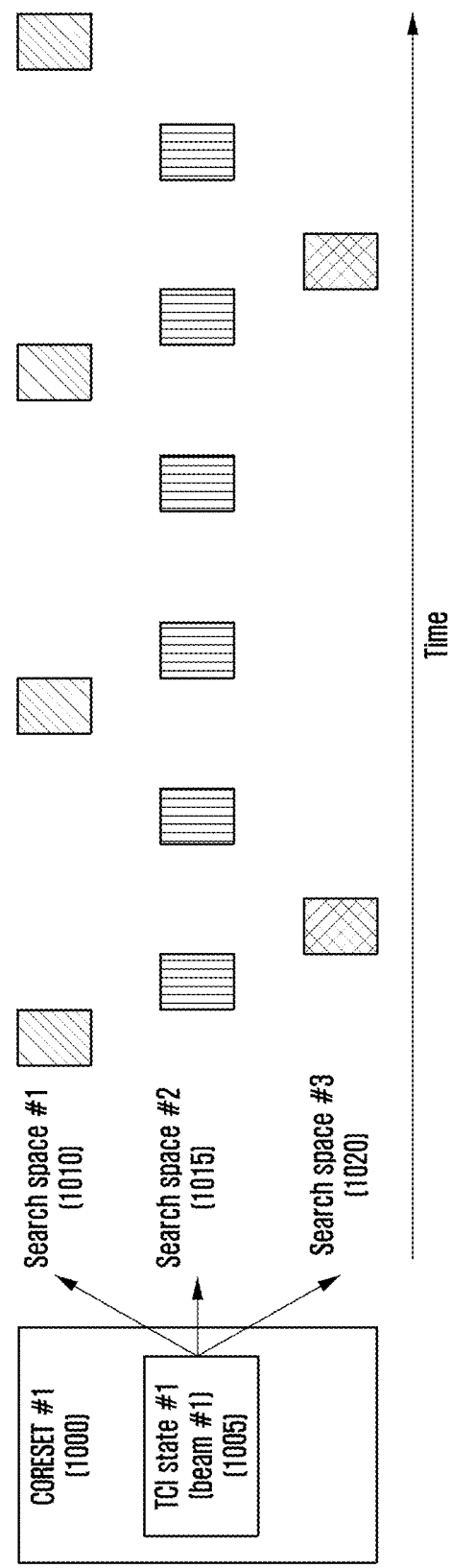
FIG. 10 illustrates an example of CORESET and search space beam configuration in a wireless communication system according to an embodiment of the disclosure.

FIG. 10 illustrates an example of CORESET and search space beam configuration according to the above description. Referring to FIG. 10, the base station may indicate one in a list of TCI states included in a CORESET 1000 configuration through MAC CE signaling (indicated by reference numeral 1005). Thereafter, before another TCI state is indicated to the corresponding CORESET through another MAC CE signaling, the UE considers that the same QCL information (beam #1) 1005 is applied to one or more search spaces 1010, 1015, and 1020 connected to the CORESET. According to the above-described PDCCH beam allocation method, it is difficult to indicate a beam change faster than the MAC CE signaling delay, and has an advantage in that the same beam is applied to respective CORESETs at once regardless of search space characteristics, flexible PDCCH beam operation is difficult. Hereinafter, embodiments of the disclosure provide a more flexible PDCCH beam configuration and operation method. Hereinafter, in describing an embodiment of the disclosure, several distinguished examples are provided for convenience of description, but these are not mutually exclusive and can be applied by appropriately combining with each other depending on the situation.

The base station may provide, to the UE, configuration of one or multiple TCI states for a specific control resource set, and may activate one of the configured TCI states through a MAC CE activation command. For example, {TCI state #0, TCI state #1, and TCI state #2} are configured as the TCI state in the control resource set #1, and the base station may transmit, to the UE, a command of activating to assume the TCI state #0 as the TCI state for the control resource set #1 through the MAC CE. Based on the activation command for the TCI state received by the MAC CE, the UE may correctly receive the DMRS of the corresponding control resource set based on QCL information in the activated TCI state.

For the control resource set (control resource set #0) in which the index is configured to be 0, if the UE does not receive the MAC CE activation command for the TCI state of the control resource set #0, the UE may assume that DMRS transmitted in the control resource set #0 is QCLed with an SS/PBCH block identified during the initial access procedure or non-contention-based random access procedure that is not triggered by a PDCCH command.

In relation to the control resource set (control resource set #X) in which the index is configured to be a value other than 0, if the UE has not received the TCI state for the control resource set #X, or the UE is configured with one or more TCI states but has not received the MAC CE activation command for activating one of the TCI states, the UE may assume that DMRS transmitted in the control resource set #X is QCLed with an SS/PBCH block identified during the initial access procedure.

[PDSCH: Frequency Resource Allocation]

Figure 11:
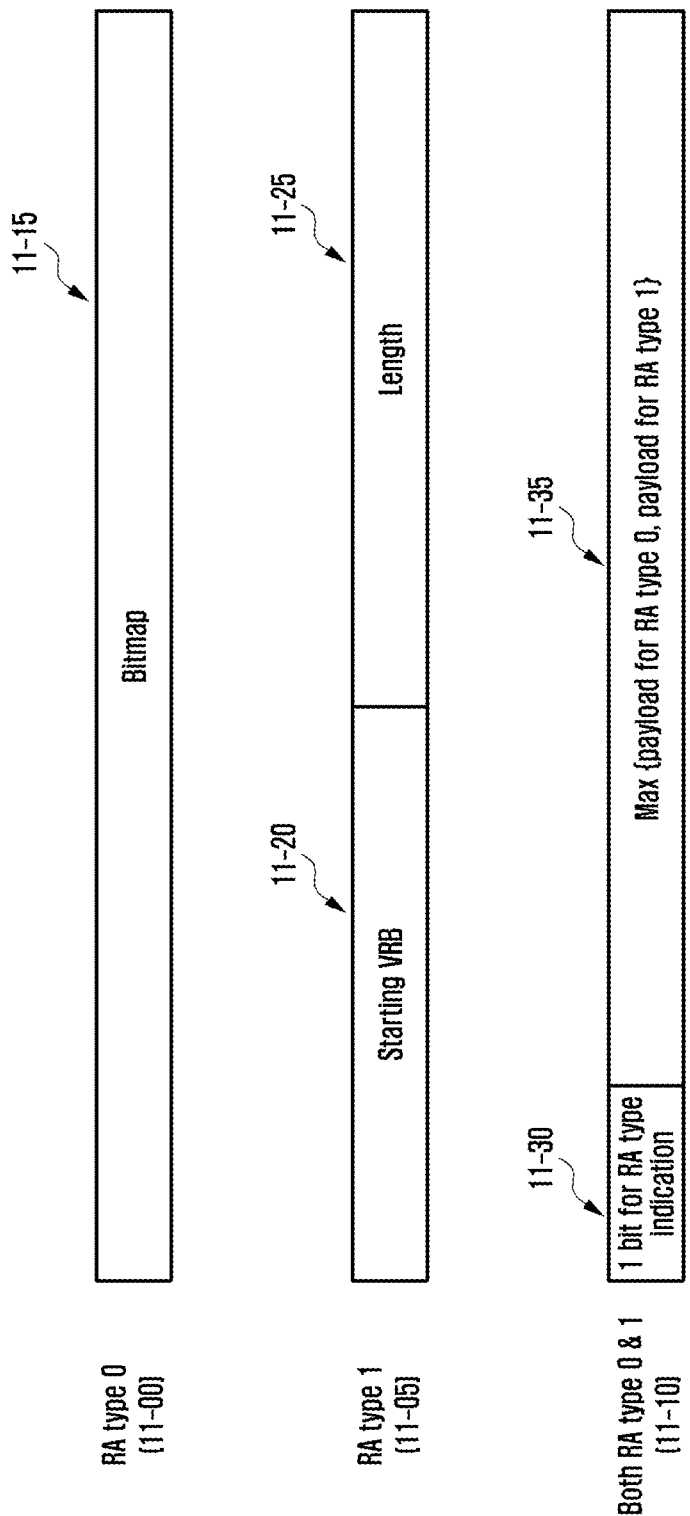
FIG. 11 illustrates an example of frequency-domain resource allocation of a PDSCH in a wireless communication system according to an embodiment of the disclosure.

FIG. 11 illustrates an example of frequency-domain resource allocation of a physical downlink shared channel (PDSCH) in a wireless communication system according to an embodiment of the disclosure.

FIG. 11 shows three frequency-domain resource allocation methods of type 0 (11-00), type 1 (11-05), and dynamic switch (11-10) configurable through a higher layer in an NR wireless communication system.

Referring to FIG. 11, if a UE is configured to use only resource type 0 via higher layer signaling (indicated by reference numeral 11-00), some downlink control information (DCI) for allocation of PDSCH to the corresponding UE includes a bitmap formed of NRBG bits. Conditions for this will be described again later. In this case, NRBG denotes the number of resource block groups (RBGs) determined as shown in Table 26 below according to a BWP size allocated by a BWP indicator and a higher layer parameter rbg-Size, and data is transmitted to RBG indicated as "1" in the bitmap.

TABLE 26

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (indicated by reference numeral 11-05), some DCI for allocation of the PDSCH to the UE includes frequency-domain resource allocation information configured by $\lceil \log_2(N_{RB}^{DL,BWP}(N_{RB}^{DL,BWP}+1)/2 \rceil$ bits. Conditions for this will be described again later. Through this information, the base station may configure a starting VRB 11-20 and the length of frequency-domain resources 11-25 continuously allocated therefrom.

If the UE is configured to use both resource type 0 and resource type 1 via higher layer signaling (indicated by reference numeral 11-10), some DCI for allocation of PDSCH to the UE includes frequency-domain resource allocation information configured by bits of a greater value 11-35 among a payload 11-15 for configuration of resource type 0 and payloads 11-20 and 11-25 for configuration of resource type 1, a condition for which will be described later. Here, one bit is added to the most significant bit (MSB) of the frequency-domain resource allocation information in the DCI, if the corresponding bit has a value of "0", 0 indicates that resource type 0 is used, and if the corresponding bit has a value of "1", 1 indicates that resource type 1 is used.

[PDSCH Time-Domain Resource Allocation]

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). For PDSCH, a table including maxNrofDL-Allocations=16 entries may be configured, and for PUSCH, a table including maxNrofUL-Allocations=16 entries may be configured. In an embodiment, the time-domain resource allocation information may include PDCCH-to-PDSCH slot timing (corresponding to a time interval in slot units between a time point at which a PDCCH is received and a time point at which a PDSCH scheduled by the received PDCCH is transmitted, and denoted by K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information such as Table 27 or Table 28 below may be transmitted from the base station to the UE.

TABLE 27

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::= SEQUENCE {
  k0                              INTEGER(0..32) OPTIONAL, --Need S
(PDCCH-to-PDSCH timing, unit of slots)
  mappingType           ENUMERATED {typeA, typeB},
(PDSCH mapping type)
  startSymbolAndLength    INTEGER (0..127)

TABLE 27-continued

PDSCH-TimeDomainResourceAllocationList information element (Start symbol and length of PDSCH)
}

TABLE 28

PUSCH-TimeDomainResourceAllocation information element

```
PUSCH-TimeDomainResourceAllocationList ::=   SEQUENCE (SIZE(1..maxNrofUL-
Allocations)) OF PUSCH-TimeDomainResourceAllocation
PUSCH-TimeDomainResourceAllocation ::= SEQUENCE {
    k2 INTEGER(0..32)                         OPTIONAL, -- Need S
(PDCCH-to-PUSCH timing, unit of slots)
    mappingType                               ENUMERATED {typeA, typeB},
(PUSCH mapping type)
    startSymbolAndLength                      INTEGER (0..127)
(Start symbol and length of PUSCH)
}
```

The base station may notify one of the entries in the above-described table representing the time-domain resource allocation information to the UE via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 12:
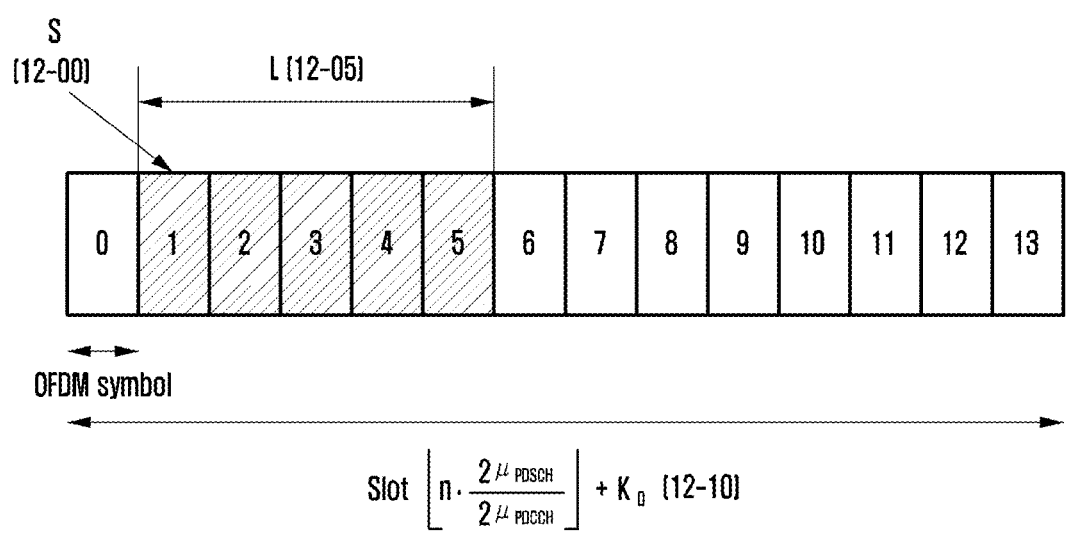
FIG. 12 illustrates an example of time-domain resource allocation of a PDSCH in a wireless communication system according to an embodiment.

FIG. 12 illustrates an example of time-domain resource allocation of a PDSCH in a wireless communication system according to an embodiment of the disclosure.

Referring to FIG. 12, a base station may indicate a time-domain position of a PDSCH resource according to a start position 12-00 and a length 12-05 of an OFDM symbol in a slot dynamically indicated based on the subcarrier spacing (SCS) ($\mu_{PDSCH}$, $\mu_{PDCCH}$) of a data channel and a control channel configured using a higher layer, a scheduling offset (K0) value, and DCI.

Figure 13:
FIG. 13 illustrates an example of time-domain resource allocation according to subcarrier spacings of a data channel and a control channel in a wireless communication system according to an embodiment.

FIG. 13 illustrates an example of time-domain resource allocation according to the subcarrier spacings of a data channel and a control channel in a wireless communication system according to an embodiment of the disclosure.

Referring to FIG. 13, if a data channel and a control channel have the same subcarrier spacing (13a-00, $\mu_{PDSCH}=\mu_{PDCCH}$), since a data slot number and a control slot number are the same, a base station and a UE may generate a scheduling offset adjusted according to predetermined slot offset K0. On the other hand, when the subcarrier spacing of the data channel and the subcarrier spacing of the control channel are different (13a-05, $\mu_{PDSCH}\neq\mu_{PDCCH}$), since a data slot number and a control slot number are different, the base station and the UE may gnerate a scheduling offset adjusted according to the predetermined slot offset K0 based on the subcarrier spacing of the PDCCH.

[UE Capability Report]

In LTE and NR, the UE may perform a procedure of reporting the UE-supported capability to the corresponding base station while being connected to the serving base station. In the description below, this is referred to as a UE capability report.

The base station transmits a UE capability enquiry message requesting a capability report to the UE which is in a connected state. The message may include a UE capability request for each radio access technology (RAT) type of the base station. The request for each RAT type may include supported frequency band information and the like. Further, the UE capability enquiry message may make a request for UE capability for each of multiple RAT types through one RRC message container transmitted by the base station, or the base station may transmit multiple UE capability enquiry messages including a UE capability request for each RAT type to the UE. That is, the UE capability enquiry may be repeated multiple times, and the UE may configure a UE capability information message corresponding to the repeated UE capability enquiry and make multiple reports of the UE capability information message. In the next generation telecommunication system, a UE capability request for multi-RAT dual connectivity (MR-DC) including NR, LTE, and E-UTRA-NR dual connectivity (EN-DC) may be made. Further, in general, the UE capability enquiry message is transmitted initially after the UE establishes a connection with a base station. However, the UE capability enquiry message may be requested under any condition if the base station needs.

In the above operation, the UE, which has received a request for a UE capability report from the base station, configures a UE capability according to frequency band information and a RAT type, which are requested by the base station. A method for configuring a UE capability by a UE in the NR system may be summarized as follows:

1. If the UE receives lists of LTE, and/or NR frequency bands according to a UE capability request from a base station, the UE configures a band combination (BC) of EN-DC and NR stand-alone (SA). That is, the UE configures a candidate BC list for EN-DC and NR SA, based on frequency bands requested, through FreqBandList, from the base station. Further, the bands are prioritized in the order described in the FreqBandList.
2. If the base station requests the UE capability report by setting the "eutra-nr-only" flag or the "eutra" flag, matters relating to NR SA BCs among the configured BC candidate list are completely removed by the UE. This may occur only if the LTE base station (eNB) requests "eutra" capability.
3. Thereafter, the UE removes fallback BCs from the candidate BC list configured in the above operation. Here, the fallback BCs refer to BCs which is obtainable by removing a band corresponding to at least one SCell band from a random BC, and a fallback BC is omittable because a BC before removing a band corresponding to at least one SCell may already cover the fallback BC.

This operation is further applied to MR-DC, i.e., LTE bands. The BCs remaining after performing this operation are included in the final "candidate BC list".

4. The UE selects BCs to be reported by selecting BCs suitable for the requested RAT type from the final "candidate BC list". In this operation, the UE configures the supportedBandCombinationList in a predetermined order. That is, the UE configures BCs and a UE capability to report according to a predetermined order of RAT type (nr→eutra-nr→eutra). Further, the UE configures featureSetCombination for the configured supportedBandCombinationList and configures a list of "candidate feature set combinations" from a candidate BC list from which a list of fallback BCs (including the same or lower level capabilities) has been removed. The above "candidate feature set combinations" include all of feature set combinations for NR and EUTRA-NA BC, and may be obtained from feature set combinations of containers of UE-NR-Capabilities and UE-MRDC-Capabilities.

5. Further, if the requested RAT type is EUTRA-NR and makes some influence, featureSetCombinations is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

[CA/DC]

Figure 14:
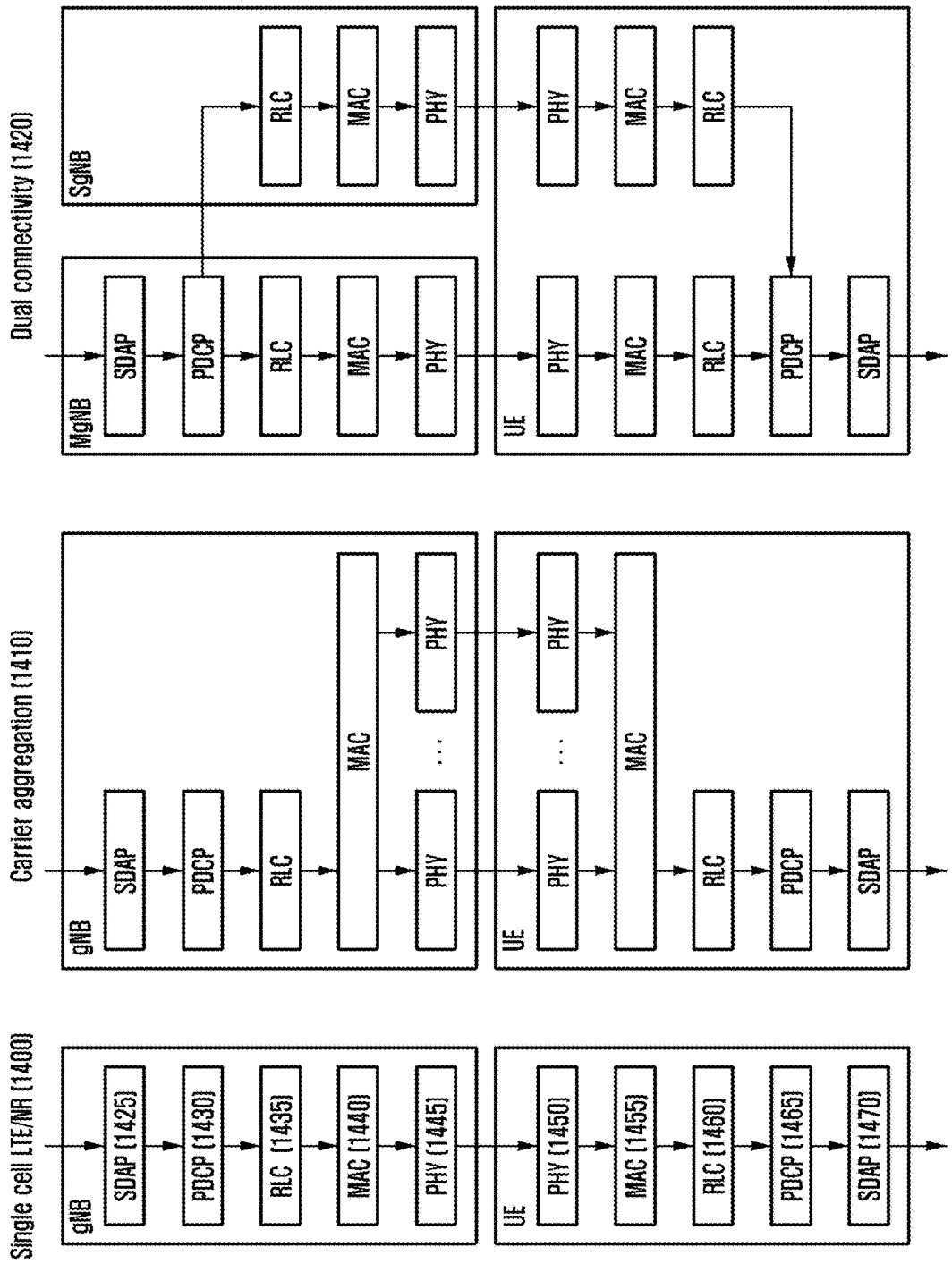
FIG. 14 illustrates a protocol structure of a base station and a UE in a single cell, carrier aggregation, and dual connectivity situation in a wireless communication system according to an embodiment of the disclosure.

FIG. 14 illustrates a radio protocol structure of a base station and a UE in a single cell, carrier aggregation, and dual connectivity situation in a wireless communication system according to an embodiment of the disclosure.

Referring to FIG. 14, the radio protocol of the next generation mobile communication system includes, for each of a UE and an NR base station, NR service data adaptation protocols (NR SDAPs) 1425 and 1470, NR packet data convergence protocols (NR PDCPs) 1430 and 1465, and NR radio link controls (NR RLCs) 1435 and 1460, and NR medium access control (NR MACs) 1440 and 1455.

The main functions of the NR SPAPs 1425 and 1470 may include some of the following functions:
   Transfer of user plane data
   Mapping between a QoS flow and a data bearer (DRB) for both DL and UL
   Marking QoS flow ID in both DL and UL packets
   Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The main functions of the NR PDCPs 1430 and 1465 may include some of the following functions:
   Header compression and decompression: ROHC only
   Transfer of user data
   In-sequence delivery of higher layer PDUs
   Out-of-sequence delivery of higher layer PDUs
   PDCP PDU reordering for reception
   Duplicate detection of lower layer SDUs
   Retransmission of PDCP SDUs
   Ciphering and deciphering
   Timer-based SDU discard in uplink In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 1435 and 1460 may include some of the following functions:
   Transfer of higher layer PDUs
   In-sequence delivery of higher layer PDUs
   Out-of-sequence delivery of higher layer PDUs
   Error Correction through ARQ
   Concatenation, segmentation and reassembly of RLC SDUs
   Re-segmentation of RLC data PDUs
   Reordering of RLC data PDUs
   Duplicate detection
   Protocol error detection
   RLC SDU discard
   RLC re-establishment The in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1440 and 1455 may be connected to multiple NR RLC layer devices configured in one UE, and the main functions of the NR MAC may include some of the following functions:

Mapping between logical channels and transport channels
Multiplexing/de-multiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1445 and 1450 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The detailed structure of the radio protocol structure may be variously changed according to a carrier (or cell) operating method. For example, when the base station performs single carrier (or cell)-based data transmission to the UE, the base station and the UE use a protocol structure, which has a single structure for each layer, such as 1400. On the other hand, when the base station transmits data to the UE based on carrier aggregation (CA) using multiple carriers in a single TRP, the base station and the UE has a single structure up to RLC but uses a protocol structure of multiplexing a PHY layer through a MAC layer, such as 1410. As another example, when the base station transmits data to the UE based on dual connectivity (DC) using multiple carriers in multiple TRP, the base station and the terminal have a single structure up to RLC, but uses a protocol structure of multiplexing a PHY layer through a MAC layer, such as 1420.

[NC-JT]

According to an embodiment of the disclosure, non-coherent joint transmission (NC-JT) may be used for the UE to receive a PDSCH from multiple TRPs.

Unlike the conventional communication system, the 5G wireless communication system can support not only a service requiring a high transmission rate, but also a service having a very short transmission delay and a service requiring a high connection density. In a wireless communication network including multiple cells, transmission and reception points (TRPs), or beams, coordinated transmission between respective cells, TRPs, and/or beams may satisfy various service requirements by increasing the strength of a signal received by the UE or efficiently performing interference control between respective cells, TRPs, and/or beams.

Joint transmission (JT) is a representative transmission technology for the above-described coordinated communication, and which performs signal transmission to one UE through multiple different cells, TRPs, and/or beams to increase the throughput or the strength of a signal received by the UE. Here, channels between the respective cells, TRPs, and/or beams and the UE may have significantly different characteristics. In particular, non-coherent joint transmission (NC-JT) supporting non-coherent precoding between cells, TRPs, and/or beams, individual precoding may require individual precoding, MCS, resource allocation, TCI indication, and the like according to link-specific channel characteristic between each cell, TRP, and/or beams and the UE.

The above-described NC-JT transmission may be applied to at least one channel among a downlink data channel (physical downlink shared channel (PDSCH)), a downlink control channel (physical downlink control channel (PDCCH)), an uplink data channel (physical uplink shared channel (PUSCH)), and an uplink control channel (physical uplink control channel (PUCCH)). During PDSCH transmission, transmission information such as precoding, MCS, resource allocation, and TCI is indicated by DL DCI, and in order to perform NC-JT transmission, the transmission information needs to be independently indicated for each cell, TRP, and/or beam. This is a major factor that increases the payload required for DL DCI transmission, which may adversely affect the reception performance of PDCCH for transmission of DCI. Therefore, it is necessary to carefully design a tradeoff between the amount of DCI information and the control information reception performance for JT support of PDSCH.

Figure 15:
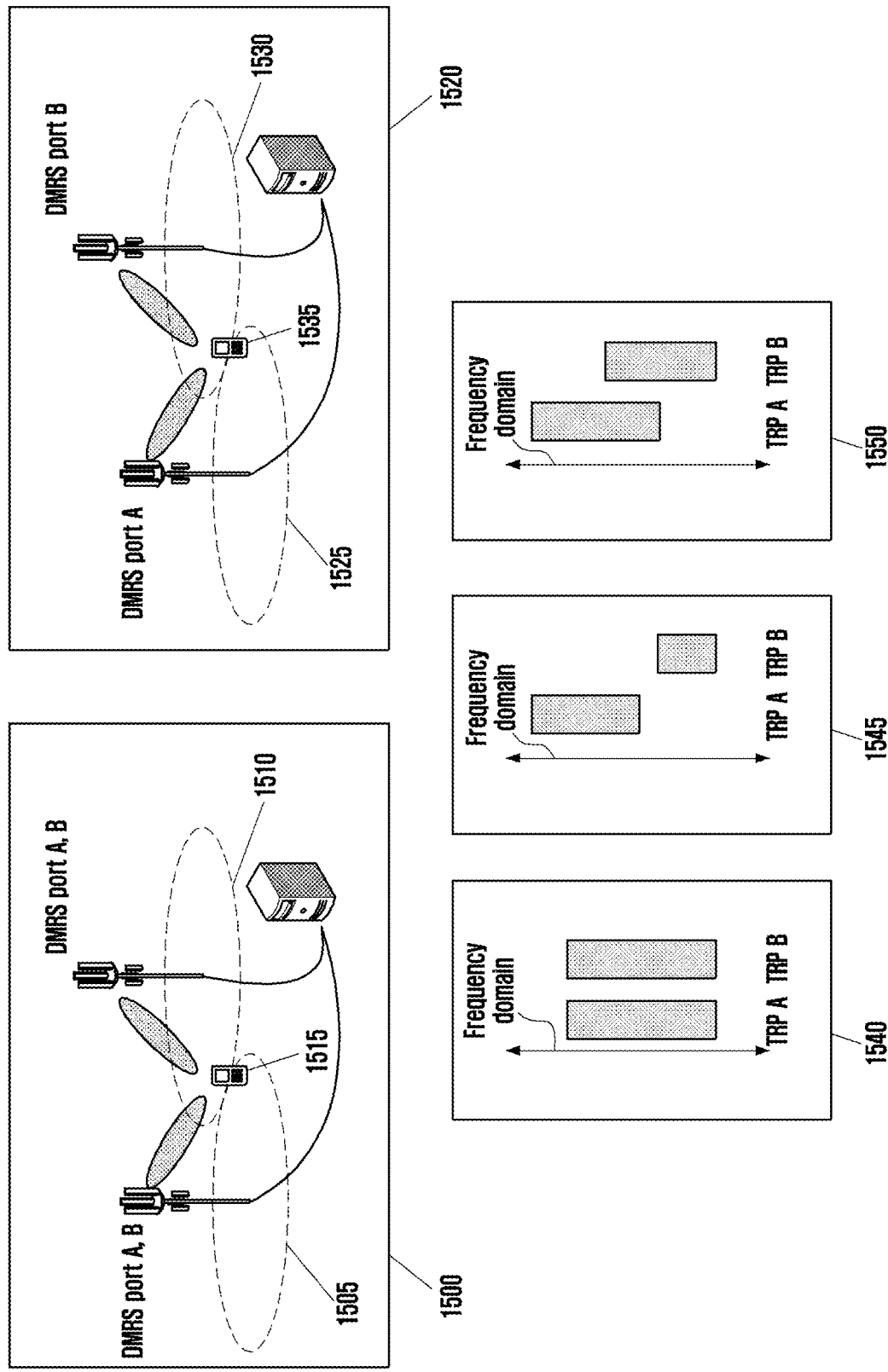
FIG. 15 illustrates an example of an antenna port configuration and resource allocation for cooperative communication in a wireless communication system according to an embodiment of the disclosure.

FIG. 15 illustrates an example of an antenna port configuration and resource allocation for PDSCH transmission using cooperative communication in a wireless communication system according to an embodiment of the disclosure.

Referring to FIG. 15, an example for PDSCH transmission is illustrated according to a joint transmission (JT) scheme, and examples of radio resource allocation for each TRP are illustrated.

In FIG. 15, an example (indicated by reference numeral 1500) of coherent joint transmission (C-JT) supporting coherent precoding between cells, TRPs, and/or beams is shown.

In a case of C-JT, TRP A 1505 and TRP B 1510 may transmit single data (PDSCH) to the UE 1515, and multiple TRPs may perform joint precoding. This may refer that the same DMRS ports are used for the same PDSCH transmission in TRP A 1505 and TRP B 1510. For example, TRP A 1505 and TRP B 1510 may transmit DRMS to the UE through DMRS port A and DMRS B, respectively. In this case, the UE may receive one DCI information for receiving one PDSCH demodulated based on the DMRS transmitted through the DMRS ports A and B.

In FIG. 15, an example (indicated by reference numeral 1520) of non-coherent joint transmission (NC-JT) supporting non-coherent precoding between respective cells, TRPs, and/or beams is shown.

In a case of NC-JT, a PDSCH is transmitted to the UE 1535 for each cell, TRP, and/or beam, and individual precoding may be applied to each PDSCH. Each cell, TRP, and/or beam may be used for transmission of a different PDSCH or a different PDSCH layer to the UE to improve throughput compared to single cell, TRP, and/or beam transmission. In addition, each cell, TRP, and/or beam may repeatedly transmit the same PDSCH to the UE to improve reliability compared to single cell, TRP, and/or beam transmission. For convenience of explantion, a cell, a TRP, and/or a beam is hereinafter collectively referred to as a TRP.

Here, when all the frequency and time resources used for PDSCH transmission by multiple TRPs are the same (indicated by reference numeral 1540), when the frequency and time resources used by multiple TRPs do not overlap at all (indicated by reference numeral 1545), and when some of the frequency and time resources used by multiple TRPs overlap (indicated by reference numeral 1550), various radio resource allocations may be considered.

In order to simultaneously allocate a plurality of PDSCHs to one UE for NC-JT support, DCI of various types, structures, and relationships may be considered.

Figure 16:
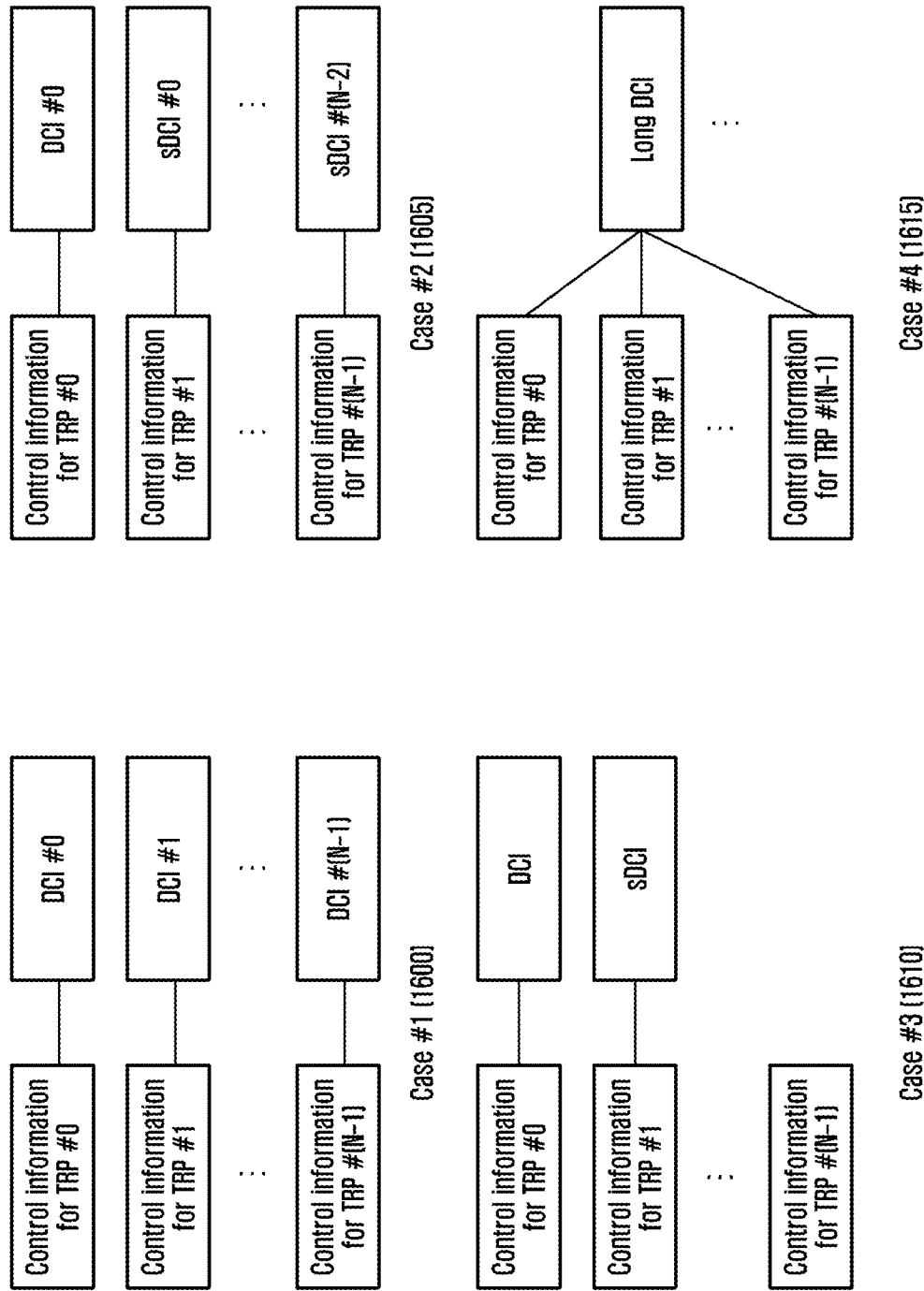
FIG. 16 illustrates an example of configuration of downlink control information (DCI) for cooperative communication in a wireless communication system according to an embodiment of the disclosure.

FIG. 16 illustrates an example configuration of downlink control information (DCI) for NC-JT for transmission of a different PDSCH or a different PDSCH layer to the UE by each TRP in a wireless communication system according to an embodiment of the disclosure.

Referring to FIG. 16, case #1 (1600) illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which control information for PDSCHs transmitted from (N−1) additional TRPs and control information for PDSCHs transmitted in the serving TRP are transmitted independently from each other. That is, the UE may acquire control information for PDSCHs transmitted from different TRPs (TRP #0 to TRP #(N−1)) through pieces of independent DCI (DCI #0 to DCI #(N−1)). The format between pieces of independent DCI may be the same or different from each other, and the payload between DCIs may also be the same or different from each other. In the above-described case #1, the freedom degree for control or allocation of each PDSCH can be completely guaranteed, but when each piece of DCI is transmitted from a different TRP, a coverage difference for each DCI may occur, and reception performance may deteriorate.

Case #2 (1605) illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which each piece of control information (DCI) for PDSCH transmitted from (N−1) additional TRPs is transmitted and the each piece of DCI is dependent on control information for PDSCH transmitted from the serving TRP.

For example, in a case of DCI #0, which is control information for the PDSCH transmitted from the serving TRP (TRP #0), all information elements of DCI format 1_0, DCI format 1_1, and DCI format 1_2 are included, but shortened DCI (hereinafter, sDCI)) (sDCI #0 to sDCI #(N−2)), which is control information for PDSCHs transmitted from cooperative TRP (TRP #1 to TRP #(N−1)) may include only some of the information elements of DCI format 1_0, DCI format 1_1, DCI format 1_2. Therefore, in a case of sDCI for transmission of control information for PDSCHs transmitted from cooperative TRPs, the payload may be small compared to normal DCI (nDCI) for transmission of control information related to PDSCH transmitted from the serving TRP and thus it is possible to include reserved bits compared to nDCI.

In case #2 described above, the degree of freedom for control or allocation of each PDSCH may be limited according to the contents of the information element included in the sDCI, or since the reception performance of sDCI is superior to that of nDCI, the probability of occurrence of a coverage difference for each DCI may be lowered.

Case #3 (1610) illustrates, in a situation in which different (N−1) PDSCHs are transmitted from (N−1) additional TRPs (TRP #1 to TRP #(N−1)) other than a serving TRP (TRP #0) used when transmitting a single PDSCH, an example in which one piece of control information for PDSCHs of (N−1) additional TRPs is transmitted and this DCI is dependent on control information for PDSCHs transmitted from the serving TRP.

For example, in a case of DCI #0, which is control information for the PDSCH transmitted from the serving TRP (TRP #0), all information elements of DCI format 1_0, DCI format 1_1, and DCI format 1_2 are included, and in a case of control information for PDSCHs transmitted from cooperative TRP (TRP #1 to TRP #(N−1)), only some of the information elements of DCI format 1_0, DCI format 1_1, and DCI format 1_2 may be included in one "secondary" DCI (sDCI) and transmitted. For example, the sDCI may include at least one of HARQ-related information such as frequency domain resource assignment, time domain resource assignment, and MCS of cooperative TRPs. In addition, in a case of information not included in the sDCI, such as a bandwidth part (BWP) indicator or a carrier indicator, it may follow DCI (DCI #0, normal DCI, nDCI) of the serving TRP.

In case #3 (1610), the freedom degree for control or allocation of each PDSCH may be limited according to the contents of the information element included in the sDCI. However, it is possible to adjust the reception performance of sDCI, and the complexity of DCI blind decoding of the UE may be reduced compared to case #1 (1600) or case #2 (1605).

Case #4 (1615) illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which control information for PDSCHs transmitted from (N−1) additional TRPs is transmitted through the same DCI (long DCI (LDCI)) as control information for PDSCHs transmitted from the serving TRP. That is, the UE may obtain control information for PDSCHs transmitted from different TRPs (TRP #0 to TRP #(N−1)) through single DCI. In case #4 (1615), the complexity of DCI blind decoding of the UE may not increase, but the degree of freedom of PDSCH control or allocation may be low, such that the number of cooperative TRPs is limited according to the long DCI payload limitation.

In the following descriptions and embodiments, sDCI may refer to various pieces of supplementary DCI such as shortened DCI, secondary DCI, or normal DCI (DCI format 1_0 to 1_1 described above) including PDSCH control information transmitted in the cooperative TRP. If not specified, the description is similarly applicable to the various pieces of supplementary DCI.

In the following description and embodiments, case #1 (1600), case #2 (1605), and case #3 (1610) in which at least one DCI (PDCCH) is used for NC-JT support are classified into multiple PDCCH-based NC-JTs, and case #4 (1615) in which single DCI (PDCCH) is used for NC-JT support can be classified into a single PDCCH-based NC-JT. In multiple PDCCH-based PDSCH transmission, a CORESET in which DCI of a serving TRP (TRP #0) is scheduled and a CORESET in which DCI of a cooperative TRPs (TRP #1 to TRP #(N−1)) are scheduled can be distinguished. As a method for distinguishing CORESETs, there may be a method for distinguishing through a higher layer indicator for each CORESET, a method for distinguishing through a beam configuration for each CORESET, and the like. In addition, in a single PDCCH-based NC-JT, single DCI schedules a single PDSCH having a plurality of layers instead of scheduling a plurality of PDSCHs, and the above-mentioned plurality of layers may be transmitted from a plurality of TRPs. Here, a connection relationship between a layer and a TRP for transmission of the layer may be indicated through a transmission configuration indicator (TCI) indication for the layer.

In the embodiments of the disclosure, "cooperative TRP" may be replaced by various terms including a "cooperative panel" or a "cooperative beam" when actually used.

In embodiments of the disclosure, the expression that "NC-JT is applied" is used herein for convenience of explanation, but it may be variously interpreted to fit the context, such as "the UE simultaneously receives one or more PDSCHs in one BWP", "the UE simultaneously receives PDSCHs based on two or more transmission configuration indicator (TCI) indications in one BWP", "a PDSCH received by the UE is associated with one or more DMRS port group", and the like.

In the disclosure, a radio protocol architecture for NC-JT may be variously used depending on TRP development scenarios. For example, when there is no or little backhaul delay between cooperative TRPs, it is possible to use a structure based on MAC layer multiplexing similar to S10 of FIG. 11 (CA-like method). On the other hand, when the backhaul delay between cooperative TRPs is so large that the backhaul delay cannot be ignored (e.g., when 2 ms or more is required for information exchange such as CSI, scheduling, HARQ-ACK, and the like between cooperative TRPs), similar to S20 of FIG. 11, it is possible to secure characteristics robust to delay by using an independent structure for each TRP from the RLC layer (DC-like method).

A UE supporting C-JT/NC-JT may receive a C-JT/NC-JT related parameter or setting value from a higher layer configuration, and may set an RRC parameter of the UE based on the received parameter or value. For higher layer configuration, the UE may utilize a UE capability parameter, for example, tci-StatePDSCH. Here, the UE capability parameter, for example, tci-StatePDSCH may define TCI states for the purpose of PDSCH transmission, and the number of TCI states may be configured to be 4, 8, 16, 32, 64, and 128 in FR1, may be configured to be 64 and 128 in FR2, and up to eight states, which can be indicated by 3 bits of the TCI field of DCI through a MAC CE message, among the configured numbers. The maximum value of 128 denotes a value indicated by maxNumberConfiguredTCIstatesPerCC in the tci-StatePDSCH parameter included in capability signaling of the UE. As such, a series of configuration processes from higher layer configuration to MAC CE configuration may be applied to a beamforming indication or a beamforming change command for at least one PDSCH in one TRP.

[Multi-DCI Based Multi-TRP]

According to an embodiment of the disclosure, a downlink control channel for NC-JT transmission may be configured based on multi-PDCCH.

In NC-JT based on multiple PDCCHs, when performing transmission of DCI for PDSCH scheduling of each TRP, there may be a CORESET or search space distinguished for each TRP. A CORSET or search space for each TRP may be configured as at least one of the following cases.

Higher layer index configuration by CORESET: The CORESET configuration information configured as a higher layer may include an index value, and a TRP for transmission of a PDCCH in the corresponding CORESET may be distinguished by the index value for each configured CORESET. That is, in the set of CORESETs having the same higher layer index value, it may be considered that the same TRP transmits a PDCCH or that a PDCCH for scheduling a PDSCH of the same TRP is transmitted. The above-described index for each CORESET may be referred to as CORESETPoolIndex, and it may be considered that the PDCCH is transmitted from the same TRP with regard to CORESETs in which the same CORESETPoolIndex value is configured. In a case of CORESET in which the CORESETPoolIndex value is not configured, it may be considered that the default value of CORESETPoolIndex has been configured, and the above-described default value may be 0.

Multiple PDCCH-Config configurations: Multiple PDCCH-Configs in one BWP are configured, and each PDCCH-Config may include PDCCH configuration for each TRP. That is, one PDCCH-Config may include a list of TRP-specific CORESET and/or a list of search spaces by TRP, one or more CORESETs and one or more search spaces included in one PDCCH-Config may be considered to correspond to a specific TRP.

CORESET beam/beam group configuration: The TRP corresponding to the corresponding CORESET may be distinguished through a beam or beam group configured for each CORESET. For example, when the same TCI state is configured in multiple CORESETs, the corresponding CORESETs may be considered to be transmitted through the same TRP or it may be considered that the PDCCH for scheduling the PDSCH of the same TRP is transmitted in the corresponding CORESET.

Search space beam/beam group configuration: A beam or beam group is configured for each search space, and through this, TRP for each search space may be distinguished. For example, when the same beam/beam group or TCI state is configured in multiple search spaces, it may be considered that the same TRP transmits the PDCCH in the search space, or that the PDCCH for scheduling the PDSCH of the same TRP is transmitted in the search space.

By dividing the CORESET or search space for each TRP as described above, PDSCH and HARQ-ACK information may be classified for each TRP, and thus, an independent HARQ-ACK codebook for each TRP may be generated and independent PUCCH resources may be used.

The above configuration may be independent for each cell or for each BWP. For example, while two different CORESETPoolIndex values are configured in PCell, the CORESETPoolIndex value may not be configured in a specific SCell. Here, it may be considered that NC-JT transmission is configured in the PCell, whereas NC-JT transmission is not configured in SCell in which the CORESETPoolIndex value is not configured.

[Single-DCI-Based Multi-TRP]

According to another embodiment of the disclosure, a downlink beam for NC-JT transmission may be configured based on single-PDCCH.

In single PDCCH-based NC-JT, PDSCH transmitted by multi-TRP can be scheduled by one DCI. Here, the number of TCI states may be used as a method of indicating the number of TRPs for transmission of the corresponding PDSCH. That is, if the number of TCI states indicated in the DCI for scheduling the PDSCH is two, it may be considered as single PDCCH-based NC-JT transmission, and if the number of TCI states is one, it may be considered as single-TRP transmission. The TCI states indicated through the DCI may correspond to one or two TCI states among TCI states activated by MAC-CE. When the TCI states of DCI correspond to the two TCI states activated by MAC-CE, a correspondence relationship between the TCI codepoint indicated through the DCI and the TCI states activated by MAC-CE is established, and two TCI states activated by MAC-CE corresponding to the TCI codepoint may exist.

The above configuration may be independent for each cell or for each BWP. For example, a PCell may have a maximum of two activated TCI states corresponding to one TCI codepoint, whereas a specific SCell may have a maximum of one activated TCI state corresponding to one TCI codepoint. Here, it may be considered that NC-JT transmission is configured in the PCell, whereas NC-JT transmission is not configured in the above-described SCell.

Meanwhile, referring to the PDCCH and beam configuration related descriptions above, since PDCCH repetitive transmission is not supported in a general method, it is difficult to achieve the required reliability in a scenario requiring high reliability, such as URLLC. Accordingly, the disclosure proposes a method for improving PDCCH reception reliability of a UE by providing a PDCCH repetitive transmission method through multiple transmission points (TRP).

Hereinafter, for convenience of explanation in the disclosure, cells, transmission points, panels, beams and/or transmission directions, which can be distinguished through higher layer/L1 parameters such as TCI state or spatial relation information, or indicators such as cell ID, TRP ID, panel ID, etc., are unified and described as a transmission reception point (TRP). Therefore, in actual application, it is possible to appropriately replace TRP with one of the above terms.

Hereinafter, in the disclosure, when the UE determines whether cooperative communication is applied, it is possible to use various methods, such as, in which PDCCH(s) for allocation of PDSCH to which the cooperative communication is applied has a specific format, PDCCH(s) for allocation of PDSCH to which the cooperative communication is applied include a specific indicator indicating whether cooperative communication is applied, PDCCH(s) for allocation of PDSCH to which cooperative communication is applied is scrambled by a specific RNTI, or cooperative communication is assumed to be applied in a specific interval indicated by a higher layer. Hereinafter, for convenience of description, a case in which a UE receives a PDSCH to which cooperative communication is applied based on conditions similar to the above will be referred to as an NC-JT case.

On the other hand, a base station according to an embodiment of the disclosure is a subject that performs resource allocation of a UE, and may be at least one of a gNode B, a gNB, an eNode B, a Node B, a base station (BS), a radio access unit, a base station controller, or a node on a network. The UE may include a user equipment (UE), a mobile station (MS), a cellular phone, a smartphone, a computer, or a multimedia system capable of performing a communication function. Hereinafter, an embodiment of the disclosure will be described using a 5G system as an example, but the embodiment of the disclosure may be applied to other communication systems having a similar technical background or channel type. For example, LTE or LTE-A mobile communication and mobile communication technology developed after 5G may be included therein. Accordingly, the embodiments of the disclosure may be applied to other communication systems through some modifications within a range that does not significantly depart from the scope of the disclosure as determined by those of ordinary skill in the art. The contents of the disclosure are applicable to FDD and TDD systems.

In addition, in the description of the disclosure, if it is determined that a detailed description of a related function or configuration may unnecessarily obscure the subject matter of the disclosure, the detailed description thereof will be omitted. In addition, the terms to be described later are terms defined considering functions in the disclosure, which may vary according to intentions or customs of users and operators. Therefore, the definition should be made based on the content throughout this specification.

The contents of the disclosure are applicable to FDD and TDD systems. Hereinafter, in describing the disclosure, higher signaling (or higher layer signaling) is a signal transmission method in which signal transmission occurs from a base station to a UE by using a downlink data channel of a physical layer, or in which transmission occurs from a UE to a base station by using an uplink data channel of a physical layer, and may be referred to as RRC signaling, PDCP signaling, or medium access control (MAC) control element (MAC CE). Specifically, higher layer signaling may be signaling corresponding to at least one or a combination of one or more of the following signaling.

Master information block (MIB)
System information block (SIB) or SIB X (X=1, 2, . . . )
Radio resource control (RRC)
Medium access control (MAC) control element (CE)

In addition, L1 signaling may be signaling corresponding to at least one or a combination of one or more of signaling methods using the following physical layer channel or signaling.

Physical downlink control channel (PDCCH)
Downlink control information (DCI)
UE-specific DCI
Group common DCI
Common DCI
Scheduling DCI (for example, DCI used for scheduling downlink or uplink data)
Non-scheduling DCI (for example, DCI not for the purpose of scheduling downlink or uplink data)
Physical uplink control channel (PUCCH)
Uplink control information (UCI)

Meanwhile, in the disclosure, transmitting or receiving a PDCCH may be understood as performing transmission or reception of DCI through the PDCCH.

Further, in the disclosure, transmitting or receiving a PDSCH may be understood as performing transmission or reception of data through the PDSCH.

In addition, in the disclosure, transmitting or receiving a PUSCH may be understood as performing transmission or reception of data through the PUSCH.

Hereinafter, in the disclosure, determining the priority between A and B refers to selecting one having a higher priority according to a predetermined priority rule and performing an operation corresponding thereto or omitting or dropping an operation corresponding to one having a lower priority.

Hereinafter, in the disclosure, the above examples will be described through multiple embodiments, but these are not independent and it is possible that one or more embodiments may be applied simultaneously or in combination.

First Embodiment: Multi-TRP-Based PDCCH Repetitive Transmission Method

As an embodiment of the disclosure, a PDCCH repetitive transmission method considering multi-TRP will be described. The PDCCH repetitive transmission considering multi-TRP may include various methods according to application of each TCI state, which is to be applied when PDCCH transmission occurs in each TRP, to the above-mentioned various parameters used for PDCCH transmission. For example, various parameters used for PDCCH transmission to which different TCI states are to be applied may include a CCE, a PDCCH candidate group, a control resource set, a search space, and the like. In a case of PDCCH repetitive transmission considering multi-TRP, a soft combining method, a selection method, and the like may be considered as a reception method of the UE.

The PDCCH repetitive transmission through multi-TRP may include at least the following five methods, and the base station may configure at least one of the five methods for a UE through higher layer signaling, may indicate the same through L1 signaling, or may configure or indicate the same by combining higher layer signaling and L1 signaling. Meanwhile, the following methods are provided as examples and the disclosure is not limited thereto. That is, PDCCH repetitive transmission according to the disclosure may be performed based on a method obtained by combining the following methods.

[Method 1-1] Method of Repeatedly Transmitting Multiple PDCCHs having the Same Payload One method 1-1 is a method of repeatedly transmitting multiple pieces of control information having the same DCI format and payload. In each of the above-described control information, information for scheduling repeatedly transmitted PDSCHs, for example, {PDSCH #1, PDSCH #2, . . . , PDSCH #Y}, which are repeatedly transmitted over multiple slots may be indicated. The fact that each piece of repeatedly transmitted control information has the same payload may be expressed as that PDSCH scheduling information of each piece of control information, for example, the number of PDSCH repetitive transmissions, PDSCH resource allocation information on the time domain, for example, the number of PDSCH symbols and the slot offset (K_0) between control information and PDSCH #1, PDSCH resource allocation information on frequency domain, DMRS port allocation information, PDSCH-to-HARQ-ACK timing, PUCCH resource indicator, etc. are identical for the each piece of control information. The UE can improve the reception reliability of control information by soft combining pieces of repetitive transmission control information having the same payload.

For the above-described soft combining, the UE needs to know in advance the resource position of control information to be repeatedly transmitted, the number of repetitive transmissions, and the like. To this end, the base station may indicate in advance at least one of a time domain, a frequency domain, and a spatial domain resource configuration of the above-described repetitive transmission control information.

When control information is repeatedly transmitted on the time domain, control information may be repeatedly transmitted over different CORESETs, repeatedly transmitted over different search space set in one CORESET, or repeatedly transmitted over different PDCCH monitoring occasions in one CORESET and one search space set. A unit of repeatedly transmitted resource on the time domain (CORESET unit, search space set unit, PDCCH monitoring occasion unit) and a location of a repetitive transmission resource (PDCCH candidate index, etc.) may be indicated through higher layer configuration of the base station, and the like. Here, the number of repetitive transmissions of the PDCCH and/or the list and transmission pattern of TRPs participating in repetitive transmission may be explicitly indicated, and higher layer indication, MAC-CE/L1 signaling, and the like may be used as an explicit indication method. Here, the list of TRPs may be indicated in the form of the TCI state or QCL assumption described above.

When control information is repeatedly transmitted on the frequency domain, control information may be repeatedly transmitted over different CORESETs, repeatedly transmitted over different PDCCH candidates in one CORESET, or repeatedly transmitted for each CCE. The unit of a resource repeatedly transmitted on the frequency domain and the location of the repetitive transmission resource may be indicated through higher layer configuration of the base station, and the like. In addition, the number of repetitive transmissions and/or the list and transmission pattern of TRPs participating in repetitive transmission may be explicitly indicated, and a higher layer indication or MAC-CE/L1 signaling may be used as an explicit indication method. Here, the list of TRPs may be indicated in the form of the TCI state or the aforementioned QCL assumption.

When control information is repeatedly transmitted in the spatial domain, control information may be repeatedly transmitted over different CORESETs, or two or more TCI states may be configured in one CORESET and thus repetitive transmission may occur.

[Method 1-2] Method of Repeatedly Transmitting Multiple Pieces of Control Information that may have Different DCI Formats and/or Payloads One method 1-2 is a method of repeatedly transmitting multiple pieces of control information that may have different DCI formats and/or payloads. The control information schedules the repetitive transmission PDSCH, and the number of PDSCH repetitions indicated by each piece of control information may be different from each other. For example, PDCCH #1 may indicate information for scheduling {PDSCH #1, PDSCH #2, . . . , PDSCH #Y}, whereas PDCCH #2 indicates information for scheduling {PDSCH #2, PDSCH #Y}, . . . , and PDCCH #X may indicate information for scheduling {PDSCH Y}. The control information repetitive transmission method has an advantage in that the total delay time required for repetitive transmission of control information and PDSCH can be reduced compared to Method 1-1.

In the above-described method 1-2, the UE may not need to know in advance the resource position of the control information to be repeatedly transmitted and the number of repetitive transmissions, and the UE may independently decode and process each of the repeatedly transmitted control information. If the UE decodes multiple repetitive transmission control information for scheduling the same PDSCH, only the first repetitive transmission control information may be processed and the second and subsequent repetitive transmission control information may be ignored. Alternatively, the resource position of control information to be repeatedly transmitted and the number of repetitive transmissions may be indicated in advance, and the instruction method may be the same as the method described in Method 1-1.

[Method 1-3] Method of Repeatedly Transmitting Multiple Pieces of Control Information, Each of which may have a Different DCI Format and/or Payload One method 1-3 is a method for repeatedly transmitting multiple pieces of control information, each of which may have a different DCI format and/or payload. Here, each piece of control information repeatedly transmitted may have the same DCI format and the same payload. The method 1-3 is a method using the advantages of the method 1-1 and the method 1-2, and according to the method 1-3, the control information can be transmitted with high reliability compared to the method 1-2 while reducing a total delay time required for repetitive transmission of control information and PDSCH compared to the method 1-1.

In the method 1-3, soft combining of the method 1-1 and the individual decoding of the method 1-2 may be used to decode and soft combine the repeatedly transmitted control information. For example, the first transmitted control information, among repetitive transmissions for multiple pieces of control information, each of which may have a different DCI format and/or payload, may be decoded according to the method 1-2, and soft combining of repetitive transmission of the decoded control information may be performed according to the method 1-1 above.

Meanwhile, the base station may select and configure one of the method 1-1, method 1-2, or method 1-3 in order to perform control information repetitive transmission. The control information repetitive transmission method may be explicitly indicated by the base station to the UE through higher layer signaling. Alternatively, the control information repetitive transmission method may be indicated in combination with other configuration information. For example, the higher layer configuration indicating the PDSCH repetitive transmission method may be combined with an indication for control information repetitive transmission. When the PDSCH is indicated to be repeatedly transmitted using a frequency division multiplexing (FDM) method, it may be understood that the control information is repeatedly transmitted only using the method 1-1. This is because, according to the PDSCH repetitive transmission of the FDM scheme, there is no delay time reduction effect by the method 1-2. For a similar reason, when the PDSCH is indicated to be repeatedly transmitted using an intra-slot time division multiplexing (TDM) method, it may be understood that the control information is repeatedly transmitted using the method 1-1. On the other hand, when the PDSCH is indicated to be repeatedly transmitted using inter-slot TDM scheme, the above-described method 1-1, method 1-2, or method 1-3 for control information repetitive transmission may be selected through higher layer signaling or L1 signaling.

On the other hand, the base station may explicitly indicate units of control information repetitive transmission to the UE through a higher layer configuration or the like. Alternatively, the units of control information repetitive transmission may be indicated in combination with other configuration information. For example, a higher layer configuration indicating a PDSCH repetitive transmission method may be combined with the units of control information repetitive transmission. When the PDSCH is indicated to be repeatedly transmitted using the FDM scheme, it may be interpreted that the control information is repeatedly transmitted through FDM or space division multiplexing (SDM). The reason is that if control information is repeatedly transmitted such as through the inter-slot TDM scheme, there is no delay time reducing effect due to the PDSCH repetitive transmission using the FDM scheme. For a similar reason, when the PDSCH is indicated to be repeatedly transmitted in an intra-slot TDM scheme, it may be interpreted that the control information is repeatedly transmitted through TDM, FDM or SDM in the slot. On the other hand, when the PDSCH is indicated to be repeatedly transmitted using the inter-slot TDM scheme, inter-slot TDM, intra-slot TDM, FDM, or SDM may be selected, through higher layer signaling and the like, so as to repeatedly transmit control information.

[Method 1-4] PDCCH Transmission Method in which Respective TCI States are Applied to Different CCEs in the Same PDCCH Candidate According to one method 1-4, in order to improve reception performance of the PDCCH without PDCCH repetitive transmission, different TCI states referring to transmission from multi-TRP may be applied to different CCEs in a PDCCH candidate and transmitted. Although this method is not the PDCCH repetitive transmission, different CCEs in the PDCCH candidates are transmitted by applying different TCI states in each TRP, and thus this can be a method of acquiring spatial diversity in the PDCCH candidates. Different CCEs to which different TCI states are applied may be separated in a time or frequency dimension, and the UE needs to know in advance the location of resources to which different TCI states are applied. The UE may receive different CCEs to which different TCI states are applied in the same PDCCH candidate and decode the received CCEs independently or at once. Here, in order to apply respective TCI states to different CCEs in a specific PDCCH candidate, one or more TCI states are configured in the control resource set in which the corresponding PDCCH candidate may exist, or the one or more TCI states may be activated through MAC-CE.

[Method 1-5] PDCCH Transmission Method in which Multiple TCI States are Applied to All CCEs in the Same PDCCH Candidate (SFN Method)

According to one method 1-5, in order to improve reception performance of the PDCCH without PDCCH repetitive transmission, multiple TCI states may be applied to different CCEs in a PDCCH candidate and transmitted. Although this method is not the PDCCH repetitive transmission, this may be a method of acquiring spatial diversity through SFN transmission at the same CCE position in a PDCCH candidate group. The UE may receive CCEs of the same position to which different TCI states are applied in the same PDCCH candidate group, and may decode the received CCEs independently or at once using some or all of the plurality of TCI states. Here, in order to apply a plurality of TCI states to all CCEs in the same PDCCH candidate, one or more TCI states are configured in the control resource set in which the corresponding PDCCH candidate may exist, or the one or more TCI states may be activated through MAC-CE.

In addition, in order to perform multi-TRP-based PDCCH repetitive transmission, some configurations or operations between the above-described methods may be selectively joined/combined and applied.

Second embodiment: Soft Combining-Related UE Capability Report During PDCCH Repetitive Transmission A UE may report soft combining-related UE capability during PDCCH repetitive transmission to a base station, and in this regard, several methods may exist. Specific methods may exist as follows.

[UE capability reporting method 1] The UE may report, to the base station, a UE capability in the form of possible or impossible relating to only whether soft combining is possible during PDCCH repetitive transmission.

As an example, if the UE reports, as a UE capability, information indicating that soft combining is possible during PDCCH repetitive transmission to the base station, the base station may determine whether soft combining of the UE is possible, in the most flexible degree (for example, the UE determines that soft combining is possible at the level of log likelihood ratio (LLR)), and may notify the UE of the PDCCH repetitive transmission-related configuration as flexible as possible during PDCCH transmission-related configuration. Here, as an example related to PDCCH repetition configuration, the base station assumes that, with regard to the UE, soft combining between control resource sets or search spaces having different configurations, soft combining between PDCCH candidates having the same aggregation level, or soft combining between PDCCH candidates having different aggregation levels are possible, and may notify the UE of the corresponding configuration.

As another example, if the UE reports information indicating that soft combining is possible during PDCCH repetitive transmission to the base station as a UE capability, the base station may determine the level of soft combining possible for the UE most conservatively (for example, determine that soft combining by the UE is possible at the OFDM symbol level), and may notify the UE of the PDCCH repetitive transmission-related configuration in the most restrictive manner during PDCCH transmission-related configuration. Here, as an example related to PDCCH repetition configuration, the base station may assume that, with regard to the UE, soft combining between a plurality of control resource sets having the same configuration or soft combining between PDCCH candidates having the same aggregation level is possible, and may notify the UE of the corresponding configuration.

[UE capability reporting method 2] In order to express the operation of soft combining possible in the UE, as a UE capability, in more detail compared to the above-described UE capability reporting method 1, the UE may divide the possibility of soft combining during PDCCH repetitive transmission into levels and report the same as UE capability to the base station. For example, the UE may identify a signal level, to which soft combining can be applied for PDCCH repetitive transmission, among signal levels generated from the reception operation processes of the UE, and may report such information to the base station as a UE capability. For example, the UE may notify that soft combining is possible at the OFDM symbol level as a signal level to which soft combining can be applied, may notify that soft combining is possible at the modulation symbol level, and may notify that soft combining is possible at the LLR level. According to each signal level reported by the UE, the base station may provide notification of the appropriate configuration so that the UE can perform soft combining according to the reported UE capability.

[UE capability reporting method 3] The UE may transmit limitations required to enable soft combining on the UE side during PDCCH repetitive transmission to the base station as a UE capability. As an example, the UE may report to the base station that the configuration of each of control resource sets including two repeated PDCCHs should be the same. As another example, the UE may report to the base station that the two repeated PDCCH candidates need to have at least the same aggregation level.

[UE capability reporting method 4] When receiving PDCCH repetitive transmission from a base station, a UE may report information relating to a supported PDCCH repetitive transmission method through a UE capability. As an example, the UE may report, to the base station, information about supporting of the method 1-5 (SFN transmission method). As another example, the UE may report, to the base station, information about supporting of the intra-slot TDM, inter-slot TDM, or FDM scheme among the method 1-1 (a method of repeatedly transmitting multiple PDCCHs having the same payload). In particular, in a case of TDM, the UE may report the maximum value of the time interval between two repeated PDCCHs to the base station. As an example, if the UE reports the maximum value of the time interval between two repeated PDCCHs as 4 OFDM symbols, the base station should adjust the time interval between two repeated PDCCHs to 4 OFDM symbols or less when performing TDM-based PDCCH repetitive transmission to the UE based on the corresponding information.

The above-described UE capability reporting methods can be configured in a combination of two or more UE capability reporting methods in actual application. As an example, the UE may report that soft combining is possible at the LLR level by [UE capability reporting method 2], and at the same time, the UE may report that two repeated PDCCH candidates should have the same aggregation level by [UE capability reporting method 3], and may report the maximum value of the time interval between two repeated PDCCHs as 4 OFDM symbols while supporting PDCCH repetitive transmission TDMed by [UE capability reporting method 4]. In addition, applications based on a combination of various UE capability reporting methods are possible.

Third Embodiment: Configuration Method Related to PDCCH Repetitive Transmission and Explicit Linkage As an embodiment of the disclosure, a method for configuring PDCCH repetitive transmission for enabling soft combining during PDCCH repetitive transmission will be described. When a base station performs PDCCH repetitive transmission to a UE based on method 1-1 (method of repeatedly transmitting a plurality of PDCCHs having the same payload) among various PDCCH repetitive transmission methods, in order to reduce the number of blind decoding by considering whether soft combining by the UE is possible, the base station may configure information indicating that there is an explicit linkage or association between repeated PDCCH candidates via higher layer signaling, may indicate the same by L1 signaling, or may be configured and indicated with the same through a combination of layer signaling or L1 signaling. In more detail, various association methods may exist as follows.

There may be various configuration methods relating to PDCCH repetitive transmission and explicit linkage via higher layer signaling as follows.

[PDCCH Repetition Configuration Method 1] When Configuration Information Exists in Higher Layer Signaling PDCCH-Config A base station may configure PDCCH-repetition-config in PDCCH-config, which is higher layer signaling, in order to perform PDCCH repetitive transmission and explicit linkage-related configuration to the UE, and the PDCCH-repetition-config may include at least one of the following pieces of information. The information listed below is not necessarily included, and some pieces of information may be omitted and additional information may be included.

PDCCH repetitive transmission method—one of TDM, FDM, and SFN

Combination(s) of control resource set-search space to be used during PDCCH repetitive transmission Control resource set index(es)—OPTIONAL Search space index(es)—OPTIONAL Aggregation level(s) for explicit linkage—OPTIONAL PDCCH candidate index(s) for explicit linkage—OPTIONAL Frequency resources for explicit linkage—OPTIONAL Based on the above pieces of information, the base station may configure, for the UE, the PDCCH repetitive transmission by higher layer signaling. For example, if the PDCCH repetitive transmission method is configured through SFN, the control resource set index is configured to be "1" as a combination of control resource set-search space to be used in the PDCCH repetitive transmission, and if the search space index is not configured, the UE may expect that the PDCCH is repeatedly transmitted through the method 1-5 (SFN transmission method) in the control resource set having index 1. Here, the configured control resource set may be configured with one or multiple different TCI states via higher layer signaling, may be indicated with the same via L1 signaling or MAC-CE signaling, or may be configured or indicated with the same in a combination of higher layer signaling and L1 signaling or MAC-CE signaling. In addition, if the PDCCH repetitive transmission method is configured through SFN, the UE may not expect a search space index to be configured in a combination of the control resource set-search space to be used for PDCCH repetitive transmission.

As another example, the PDCCH repetitive transmission method is configured through TDM or FDM, a total of two combinations of control resource set-search space to be used in PDCCH repetitive transmission are configured, control resource set index 1 and search space index 1 are configured for the first combination of control resource set-search space, and control resource set index 2 and search space index 2 are configured for the second combination of control resource set-search space, the UE may expect that the PDCCH is repeatedly transmitted using two combinations of control resource set-search space using the TDM or FDM scheme through the method 1-1. Here, each configured control resource may be configured with one or multiple different TCI states via higher layer signaling, may be indicated with the same via L1 signaling or MAC-CE signaling, or may be configured or indicated with the same in a combination of higher layer signaling and L1 signaling or MAC-CE signaling. In addition, if the PDCCH repetitive transmission method is configured through TDM or FDM, the UE may expect that up to two combinations of control resource set-search space to be used during PDCCH repetitive transmission are configured, and may expect that both control resource set and search space indexes are configured in each combination thereof.

In addition, the above pieces of information may have updated values based on MAC-CE without RRC reconfiguration. If the base station does not configure the PDCCH-repetition-config for the UE, the UE does not expect the PDCCH to be repeatedly transmitted, and may expect PDCCH single transmission only. All of the above-described aggregation level, PDCCH candidate index, and frequency resources for explicit linkage may not be configured or at least one thereof may be configured according to an explicit linkage method to be described later.

[PDCCH Repetition Configuration Method 2] When Configuration Information Exists in Higher Layer Signaling for Search Space The base station may add higher layer signaling in searchSpace, which is higher layer signaling for the search space, in order to perform PDCCH repetitive transmission, and provided notification of the same to the UE. For example, a parameter called "repetition", which is an additional higher layer signaling, is configured to be "on" or "off" in searchSpace, and thus the corresponding search space is used for repetitive transmission. One or two search space in which "repetition" is configured to be "on" may exist for each bandwidth part. For example, when searchSpaceId is configured to be 1, controlResourceSetId is configured to be 1, and repetition is configured to be "on" in searchSpace, which is higher layer signaling for search space index 1, the UE may expect that PDCCH repetitive transmission is performed according to the method 1-5 (SFN transmission method) in the control resource set 1 connected to the search space 1.

As another example, searchSpaceId is configured to be 1, controlResourceSetId is configured to be 1, and repetition is configured to be on in searchSpace, which is higher layer signaling for search space index 1, and searchSpaceId is configured to be 2, controlResourceSetId is configured to be 2, and repetition is configured to be on in searchSpace, which is higher layer signaling for search space index 2, the UE may recognize that PDCCH repetitive transmission is performed through TDM or FDM by using the method 1-1 between a combination of control resource set 1+search space 1 and a combination of resource set 2+search space 2. TDM and FDM may be divided according to time and frequency configurations through higher layer signaling of control resource sets 1 and 2 and search spaces 1 and 2. In addition, in higher layer signaling for the search space in which repetition is configured to be on, the aggregation level or PDCCH candidate indexes for explicit linkage specified in [PDCCH repetition configuration method 1] may be configured, and according to an explicit linkage method to be described later, neither thereof may be configured, either one may be configured, or both may be configured.

In addition, in order to perform PDCCH repetitive transmission and explicit linkage-related configuration, some configurations or operations between the above-described methods may be selectively joined/combined and applied.

(3-1)th Embodiment: Single-TRP or Multi-TRP-Based PDCCH Repetitive Transmission Related Configuration Method As an embodiment of the disclosure, when a base station performs PDCCH repetitive transmission to a UE based on the method 1-1 (method of repeatedly transmitting a plurality of PDCCHs having the same payload) among various PDCCH repetitive transmission methods, the base station may be configured with a combination of control resource set-search space to be used during PDCCH repetitive transmission according to the [PDCCH repetition configuration method 1] above. In addition, the UE may receive PDCCH repetition-related configuration information in a search space to be used during PDCCH repetitive transmission according to the [PDCCH repetition configuration method 2] above. Here, the following cases may be considered.

[Case 1] When one control resource set having configured with one TCI state is connected to two different search spaces and configured.

As an example, a case, in which a UE is configured with search space 1 and search space 2 from a base station and configured with the same control resource set connected to each search space, can be considered. In this example, if the same control resource set (e.g., control resource set 1) is connected to each search space and configured, and one TCI state is configured in control resource set 1 or is activated through MAC-CE, the UE may receive a single TRP-based PDCCH repetitive transmission through the corresponding control resource set. For example, in both cases in which control resource set 1 is connected to search space 1 and transmitted and control resource set 1 is connected to search space 2 and transmitted, the UE may receive control resource set 1 under an assumption of the same one TCI state.

Here, the base station may configure, for the UE, the PDCCH repetitive transmission method via TDM through higher layer signaling, or may perform single TRP-based PDCCH repetitive transmission in an intra-slot or inter-slot TDM scheme by using pieces of configuration information of two different search spaces used for PDCCH repetitive transmission configured via higher layer signaling. Meanwhile, the base station may configure, for the UE, the monitoring slot period and slot offset, which are configuration information in two different search spaces, to be identical in two different search spaces, and may perform intra-slot TDM-based PDCCH repetitive transmission based on the two search spaces and one connected control resource set.

Here, if the number of PDCCH monitoring positions in the two search spaces within a slot is identical, the UE may assume that the PDCCH monitoring positions in the two search spaces within one slot have explicit linkage to each other. For example, based on the configuration information of the base station, the configuration information monitoringSymbolsWithinSlot of the search space 1 has "1000001000000", the configuration information monitoringSymbolsWithinSlot of the search space 2 has "0001000001000", and one control resource set connected to the two search spaces includes three OFDM symbols. Here, based on the configuration information, the UE may identify that the first PDCCH monitoring position for search space 1 is provided for 3 symbols (1 to 3) from the first OFDM symbol of the corresponding slot, and that the second PDCCH monitoring position for search space 1 is provided for 3 symbols (8 to 10) from the 8th OFDM symbol. In addition, the UE may identify, from the configuration information of the base station, that the first PDCCH monitoring position for search space 2 is provided for 3 symbols (4 to 6) from the fourth OFDM symbol of the corresponding slot, and that the second PDCCH monitoring position for search space 2 is provided for 3 symbols (11 to 13) from the 11th OFDM symbol.

Here, the UE may assume that the first PDCCH monitoring positions of the search space 1 and the search space 2 have explicit linkage to each other, and that the second PDCCH monitoring positions of the search space 1 and the search space 2 have explicit linkage to each other. For example, if two search spaces have the same number of PDCCH monitoring positions within one slot, the UE may recognize that the PDCCH monitoring positions have a one-to-one connection relationship in sequence.

As another example, if two search spaces have different numbers of PDCCH monitoring positions within one slot, the UE may assume that some PDCCH monitoring positions have explicit linkage to each other. For example, if search space 1 and search space 2 have N and M PDCCH monitoring positions, respectively, and N<M, the UE may assume that PDCCH monitoring positions 1 to N in the two search spaces have one-to-one connection relationship in the sequence of the indexes of the PDCCH monitoring positions 1 to N. In addition, the UE may assume that (N+1)-th to Mth PDCCH monitoring positions of search space 2 are used for single TRP-based single PDCCH transmission without having explicit linkage with the PDCCH monitoring positions of search space 1, may assume that the (N+1)-th to M-th PDCCH monitoring positions of search space 2 have explicit linkage with the first to (M−N)-th PDCCH monitoring positions of search space 1, respectively, or may assume that the (N+1)-th to M-th PDCCH monitoring positions in search space 2 have explicit linkage with the N-th PDCCH monitoring position of search space 1.

In addition, the base station may perform inter-slot PDCCH repetitive transmission based on a single TRP by configuring, for the UE, the monitoring slot period to be identical and the slot offset to be different in two different search spaces, in which the monitoring slot period and the slot offset are configuration information in two different search spaces. For example, when the slot period of search space 1 and search space 2 is configured to be 2, the slot offset of search space 1 is configured to be 1, and the slot offset of search space 2 is configured to be 2, the UE may expect that single TRP-based PDCCH repetitive transmission between two slots is to be performed. Here, the PDCCH monitoring positions in the two search spaces existing in each of the two slots may assume to have explicit linkage similarly to the method in which the PDCCH monitoring positions in the slot have explicit linkage therebetween.

In addition, the base station configures, for the UE, the monitoring slot period and the slot offset, which are configuration information in two different search spaces, to be different in the two different search spaces, and thus, in specific slots, two search spaces may be configured to have PDCCH monitoring positions, and in other slots, only one search space among two search spaces may be configured to have a monitoring position. For example, if the slot period of the search space 1 is 1 and the slot period of the search space 2 is 2, the UE may have a PDCCH monitoring position of the search space 1 in every slot, and may have PDCCH monitoring positions of the search space 1 and the search space 2 in every two slots. Here, the UE may assume that single TRP-based PDCCH single transmission is performed in a slot having only the PDCCH monitoring position of the search space 1, and that single TRP-based PDCCH repetitive transmission is performed in a slot having both the PDCCH monitoring positions of the search space 1 and the search space 2 (that is, every two slots).

[Case 2] When one control resource set having configured with two TCI states is connected to two different search spaces and configured.

As an example, a case, in which a UE is configured with search space 1 and search space 2 from a base station and configured with the same control resource set connected to each search space, can be considered. In this example, if the same control resource set (e.g., control resource set 1) is connected to each search space and configured, and two TCI states are configured in control resource set 1 or are activated through MAC-CE, the UE may receive a multi-TRP-based PDCCH repetitive transmission through the corresponding control resource set. For example, in a case in which control resource set 1 is connected to search space 1 and transmitted, the UE may receive control resource set 1 under an assumption of the first one TCI state, and in a case in which control resource set 1 is connected to search space 2 and transmitted, the UE may receive control resource set 1 under an assumption of the second one TCI state.

Here, the base station may configure, for the UE, the PDCCH repetitive transmission method via TDM through higher layer signaling, or may perform multi TRP-based PDCCH repetitive transmission in an intra-slot or inter-slot TDM scheme by using pieces of configuration information of two different search spaces used for PDCCH repetitive transmission configured via higher layer signaling. Meanwhile, the base station may configure, for the UE, the monitoring slot period and slot offset, which are configuration information in two different search spaces, to be identical in two different search spaces, and may perform intra-slot TDM-based PDCCH repetitive transmission based on the two search spaces and one connected control resource set.

Here, if the number of PDCCH monitoring positions in the two search spaces within a slot is identical, the UE may assume that the PDCCH monitoring positions in the two search spaces within one slot have explicit linkage to each other. For example, based on the configuration information of the base station, the configuration information monitoringSymbolsWithinSlot of the search space 1 has "10000001000000", the configuration information monitoringSymbolsWithinSlot of the search space 2 has "00010000001000", and one control resource set connected to the two search spaces includes three OFDM symbols. Here, based on the configuration information, the UE may identify that the first PDCCH monitoring position for search space 1 is provided for 3 symbols (1 to 3) from the first OFDM symbol of the corresponding slot, and that the second PDCCH monitoring position for search space 1 is provided for 3 symbols (8 to 10) from the 8th OFDM symbol. In addition, the UE may identify, from the configuration information of the base station, that the first PDCCH monitoring position for search space 2 is provided for 3 symbols (4 to 6) from the fourth OFDM symbol of the corresponding slot, and that the second PDCCH monitoring position for search space 2 is provided for 3 symbols (11 to 13) from the 11th OFDM symbol.

Here, the UE may assume that the first PDCCH monitoring positions of the search space 1 and the search space 2 have explicit linkage to each other, and that the second PDCCH monitoring positions of the search space 1 and the search space 2 have explicit linkage to each other. For example, if two search spaces have the same number of PDCCH monitoring positions within one slot, the UE may recognize that the PDCCH monitoring positions have a one-to-one connection relationship in sequence.

As another example, if two search spaces have different numbers of PDCCH monitoring positions within one slot, the UE may assume that some PDCCH monitoring positions have explicit linkage to each other. For example, if search space 1 and search space 2 have N and M PDCCH monitoring positions, respectively, and N<M, the UE may assume that PDCCH monitoring positions 1 to N in the two search spaces have one-to-one connection relationship in the sequence of the indexes of the PDCCH monitoring positions 1 to N. In addition, the UE may assume that (N+1)-th to Mth PDCCH monitoring positions of search space 2 are used for single TRP-based single PDCCH transmission without having explicit linkage with the PDCCH monitoring positions of search space 1, may assume that the (N+1)-th to M-th PDCCH monitoring positions of search space 2 have explicit linkage with the first to (M−N)-th PDCCH monitoring positions of search space 1, respectively, or may assume that the (N+1)-th to M-th PDCCH monitoring positions in search space 2 have explicit linkage with the N-th PDCCH monitoring position of search space 1.

Here, as described above, the first TCI state of the control resource set may be applied in the PDCCH monitoring position of the search space 1, the second TCI state may be applied in the PDCCH monitoring position of the search space 2, or the first TCI state and the second TCI state may be alternately applied with each other in the PDCCH monitoring positions of the search space 1 or the search space 2.

In addition, the base station may perform inter-slot PDCCH repetitive transmission based on a multi-TRP by configuring, for the UE, the monitoring slot period to be identical and the slot offset to be different in two different search spaces, in which the monitoring slot period and the slot offset are configuration information in two different search spaces. For example, when the slot period of search space 1 and search space 2 is configured to be 2, the slot offset of search space 1 is configured to be 1, and the slot offset of search space 2 is configured to be 2, the UE may expect that single TRP-based PDCCH repetitive transmission between two slots is to be performed. Here, the PDCCH monitoring positions in the two search spaces existing in each of the two slots may assume to have explicit linkage similarly to the method in which the PDCCH monitoring positions in the slot have explicit linkage therebetween.

In addition, the base station configures, for the UE, the monitoring slot period and the slot offset, which are configuration information in two different search spaces, to be different in the two different search spaces, and thus, in specific slots, two search spaces may be configured to have PDCCH monitoring positions, and in other slots, only one search space among two search spaces may be configured to have a monitoring position. For example, if the slot period of the search space 1 is 1 and the slot period of the search space 2 is 2, the UE may have a PDCCH monitoring position of the search space 1 in every slot, and may have PDCCH monitoring positions of the search space 1 and the search space 2 in every two slots. Here, the UE may assume that single TRP-based PDCCH single transmission is performed in a slot having only the PDCCH monitoring position of the search space 1, and that multi TRP-based PDCCH repetitive transmission is performed in a slot having both the PDCCH monitoring positions of the search space 1 and the search space 2 (that is, every two slots).

[Case 3] When two control resource sets having configured with the same TCI state are connected to two different search spaces, respectively, and configured.

As an example, a case, in which a UE is configured with search space 1 and search space 2 from a base station and configured with a different control resource set connected to each search space, can be considered. In this example, if a different control resource set is connected to each search space (for example, control resource set 1 and control resource set 2 are connected to the search space 1 and the search space 2, respectively), and the control resource set 1 and the control resource set 2 are configured with the same one TCI state or the TCI state is activated through MAC-CE, the UE may receive a single-TRP-based PDCCH repetitive transmission through the corresponding control resource set. For example, in both cases in which the control resource set 1 is connected to the search space 1 and transmitted and the control resource set 2 is connected to the search space 2 and transmitted, the UE may receive control resource set 1 and/or control resource set 2 under an assumption of the same one TCI state.

Here, the base station may configure, for the UE, the PDCCH repetitive transmission method via TDM through higher layer signaling, or may perform single TRP-based PDCCH repetitive transmission in an intra-slot or inter-slot TDM scheme by using pieces of configuration information of two different search spaces used for PDCCH repetitive transmission configured via higher layer signaling. Meanwhile, the base station may configure, for the UE, the monitoring slot period and slot offset, which are configuration information in two different search spaces, to be identical in the two different search spaces, and may perform intra-slot TDM-based PDCCH repetitive transmission based on the two search spaces and the connected two different control resource sets.

Here, if the number of PDCCH monitoring positions in the two search spaces within a slot is identical, the UE may assume that the PDCCH monitoring positions in the two search spaces within one slot have explicit linkage to each other. For example, based on the configuration information of the base station, the configuration information monitoringSymbolsWithinSlot of the search space 1 has "10000001000000", the configuration information monitoringSymbolsWithinSlot of the search space 2 has "00010000001000", and two control resource sets connected to the two search spaces include three OFDM symbols. Here, based on the configuration information, the UE may identify that the first PDCCH monitoring position for search space 1 is provided for 3 symbols (1 to 3) from the first OFDM symbol of the corresponding slot, and that the second PDCCH monitoring position for search space 1 is provided for 3 symbols (8 to 10) from the 8th OFDM symbol. In addition, the UE may identify, from the configuration information of the base station, that the first PDCCH monitoring position for search space 2 is provided for 3 symbols (4 to 6) from the fourth OFDM symbol of the corresponding slot, and that the second PDCCH monitoring position for search space 2 is provided for 3 symbols (11 to 13) from the 11th OFDM symbol.

Here, the UE may assume that the first PDCCH monitoring positions of the search space 1 and the search space 2 have explicit linkage to each other, and that the second PDCCH monitoring positions of the search space 1 and the search space 2 have explicit linkage to each other. For example, if two search spaces have the same number of PDCCH monitoring positions within one slot, the UE may recognize that the PDCCH monitoring positions have a one-to-one connection relationship in sequence.

As another example, if two search spaces have different numbers of PDCCH monitoring positions within one slot, the UE may assume that some PDCCH monitoring positions have explicit linkage to each other. For example, if search space 1 and search space 2 have N and M PDCCH monitoring positions, respectively, and N<M, the UE may assume that PDCCH monitoring positions 1 to N in the two search spaces have one-to-one connection relationship in the sequence of the indexes of the PDCCH monitoring positions 1 to N. In addition, the UE may assume that (N+1)-th to Mth PDCCH monitoring positions of search space 2 are used for single TRP-based single PDCCH transmission without having explicit linkage with the PDCCH monitoring positions of search space 1, may assume that the (N+1)-th to M-th PDCCH monitoring positions of search space 2 have explicit linkage with the first to (M−N)-th PDCCH monitoring positions of search space 1, respectively, or may assume that the (N+1)-th to M-th PDCCH monitoring positions of search space 2 have explicit linkage with the N-th PDCCH monitoring position of search space 1.

In addition, the base station may perform inter-slot PDCCH repetitive transmission based on a single TRP by configuring, for the UE, the monitoring slot period to be identical and the slot offset to be different in two different search spaces, in which the monitoring slot period and the slot offset are configuration information in the two different search spaces. For example, when the slot period of search space 1 and search space 2 is configured to be 2, the slot offset of search space 1 is configured to be 1, and the slot offset of search space 2 is configured to be 2, the UE may expect that single TRP-based PDCCH repetitive transmission between two slots is to be performed. Here, the PDCCH monitoring positions in the two search spaces existing in each of the two slots may assume to have explicit linkage similarly to the method in which the PDCCH monitoring positions in the slot have explicit linkage therebetween.

In addition, the base station configures, for the UE, the monitoring slot period and the slot offset, which are configuration information in two different search spaces, to be different in the two different search spaces, and thus, in specific slots, two search spaces may be configured to have PDCCH monitoring positions, and in other slots, only one search space among two search spaces may be configured to have a monitoring position. For example, if the slot period of the search space 1 is 1 and the slot period of the search space 2 is 2, the UE may have a PDCCH monitoring position of the search space 1 in every slot, and may have PDCCH monitoring positions of the search space 1 and the search space 2 in every two slots. Here, the UE may assume that single TRP-based PDCCH single transmission is performed in a slot having only the PDCCH monitoring position of the search space 1, and that single TRP-based PDCCH repetitive transmission is performed in a slot having both the PDCCH monitoring positions of the search space 1 and the search space 2 (that is, every two slots).

[Case 4] When two control resource sets having configured with different TCI states are connected to two different search spaces and configured.

As an example, a case, in which a UE is configured with search space 1 and search space 2 from a base station and configured with a different control resource set connected to each search space, can be considered. In this example, if a different control resource set is connected to each search space (for example, control resource set 1 and control resource set 2 are connected to the search space 1 and the search space 2, respectively), and the control resource set 1 and the control resource set 2 are configured with one different TCI state or the TCI state is activated through MAC-CE (for example, when TCI state 1 is configured in control resource set 1 or activated through MAC-CE and TCI state 2 is configured in control resource set 2 or activated through MAC-CE), the UE may receive a multi-TRP-based PDCCH repetitive transmission through the corresponding control resource set. For example, in a case in which control resource set 1 is connected to search space 1 and transmitted, the UE may receive control resource set 1 under an assumption of the first one TCI state, and in a case in which control resource set 2 is connected to search space 2 and transmitted, the UE may receive control resource set 2 under an assumption of the second one TCI state.

Here, the base station may configure, for the UE, the PDCCH repetitive transmission method via TDM through higher layer signaling, or may perform PDCCH repetitive transmission in an intra-slot or inter-slot TDM scheme by using pieces of configuration information of two different search spaces used for PDCCH repetitive transmission configured via higher layer signaling. Meanwhile, the base station may configure, for the UE, the monitoring slot period and slot offset, which are configuration information in two different search spaces, to be identical in the two different search spaces, and may perform intra-slot TDM-based PDCCH repetitive transmission based on the two search spaces and the connected two different control resource sets.

Here, if the number of PDCCH monitoring positions in the two search spaces within a slot is identical, the UE may assume that the PDCCH monitoring positions in the two search spaces within one slot have explicit linkage to each other. For example, based on the configuration information of the base station, the configuration information monitoringSymbolsWithinSlot of the search space 1 has "10000001000000", the configuration information monitoringSymbolsWithinSlot of the search space 2 has "00010000001000", and each of control resource sets connected to the two search spaces may include three OFDM symbols. Here, based on the configuration information, the UE may identify that the first PDCCH monitoring position for search space 1 is provided for 3 symbols (1 to 3) from the first OFDM symbol of the corresponding slot, and that the second PDCCH monitoring position for search space 1 is provided for 3 symbols (8 to 10) from the 8th OFDM symbol. In addition, the UE may identify, from the configuration information of the base station, that the first PDCCH monitoring position for search space 2 is provided for 3 symbols (4 to 6) from the fourth OFDM symbol of the corresponding slot, and that the second PDCCH monitoring position for search space 2 is provided for 3 symbols (11 to 13) from the 11th OFDM symbol.

Here, the UE may assume that the first PDCCH monitoring positions of the search space 1 and the search space 2 have explicit linkage to each other, and that the second PDCCH monitoring positions of the search space 1 and the search space 2 have explicit linkage to each other. For example, if two search spaces have the same number of PDCCH monitoring positions within one slot, the UE may recognize that the PDCCH monitoring positions have a one-to-one connection relationship in sequence.

As another example, if two search spaces have different numbers of PDCCH monitoring positions within one slot, the UE may assume that some PDCCH monitoring positions have explicit linkage to each other. For example, if search space 1 and search space 2 have N and M PDCCH monitoring positions, respectively, and N<M, the UE may assume that PDCCH monitoring positions 1 to N in the two search spaces have one-to-one connection relationship in the sequence of the indexes of the PDCCH monitoring positions 1 to N. In addition, the UE may assume that (N+1)-th to Mth PDCCH monitoring positions of search space 2 are used for single TRP-based single PDCCH transmission without having explicit linkage with the PDCCH monitoring positions of search space 1, may assume that the (N+1)-th to M-th PDCCH monitoring positions of search space 2 have explicit linkage with the first to (M−N)-th PDCCH monitoring positions of search space 1, respectively, or may assume that the (N+1)-th to M-th PDCCH monitoring positions of search space 2 have explicit linkage with the N-th PDCCH monitoring position of search space 1.

In addition, the base station may perform inter-slot PDCCH repetitive transmission based on a multi-TRP by configuring, for the UE, the monitoring slot period to be identical and the slot offset to be different in two different search spaces, in which the monitoring slot period and the slot offset are configuration information in the two different search spaces. For example, when the slot period of search space 1 and search space 2 is configured to be 2, the slot offset of search space 1 is configured to be 1, and the slot offset of search space 2 is configured to be 2, the UE may expect that PDCCH repetitive transmission between two slots is to be performed. Here, the PDCCH monitoring positions in the two search spaces existing in each of the two slots may assume to have explicit linkage similarly to the method in which the PDCCH monitoring positions in the slot have explicit linkage therebetween.

In addition, the base station configures, for the UE, the monitoring slot period and the slot offset, which are configuration information in two different search spaces, to be different in the two different search spaces, and thus, in specific slots, two search spaces may be configured to have PDCCH monitoring positions, and in other slots, only one search space among two search spaces may be configured to have a monitoring position. For example, if the slot period of the search space 1 is 1 and the slot period of the search space 2 is 2, the UE may have a PDCCH monitoring position of the search space 1 in every slot, and may have PDCCH monitoring positions of the search space 1 and the search space 2 in every two slots. Here, the UE may assume that single TRP-based PDCCH single transmission is performed in a slot having only the PDCCH monitoring position of the search space 1, and that multi-TRP-based PDCCH repetitive transmission is performed in a slot having both the PDCCH monitoring positions of the search space 1 and the search space 2 (that is, every two slots).

Meanwhile, with regard to the above-described combination(s) of control resource set-search space, it is assumed that up to two search spaces, control resource sets, or TCI states are configured for convenience of technology. However, even when two or more search spaces, control resource sets, or TCI states are configured, the methods described above may be applied. Further, in this case, the above-described methods may be selectively combined. In addition, although the above-described methods have been mainly described with regard to the TDM scheme, it may also be applied to a method in which PDCCH repetitive transmission occurs through the FDM scheme according to configuration information in the search space and the control resource set.

Fourth Embodiment: PDCCH Repetitive Transmission Configuration Method Considering Soft Combining During PDCCH Repetitive Transmission In a 5G wireless communication system, pieces of the PDCCH-related information may have different degrees of freedom to have a certain value. In particular, parameters existing to obtain inter-cell interference control, diversity performance improvement, or scheduling gain, etc. may have different values for each control resource set, each search space, every slot, or each OFDM symbol in a slot. Table 29 below shows that, with regard to PDCCH-related configuration information, the level of freedom the information has, or in what resource unit the information has randomness or can be initialized.

TABLE 29

| Parameter | | Higher layer configuration unit | Randomness and initialization resource unit |
|---|---|---|---|
| PDCCH scrambling sequence | pdcch-DMRS-ScramblingID | Control resource set | none |
| PDCCH DMRS scrambling sequence | pdcch-DMRS-ScramblingID | Control resource set | slot or OFDM symbol |
| Hashing function in search space (Equation 2) | Aggregation level Number of PDCCH candidates for each aggregation level Maximum number of PDCCH candidates for each aggregation level Number of CCEs $A_p$ | Search space Control resource set | slot |

TABLE 29-continued

| Parameter | | Higher layer configuration unit | Randomness and initialization resource unit |
|---|---|---|---|
| CCE-REG mapping type | REG bundle size Interleaver size $n_{shift}$ OFDM symbol length of control resource set Number of REGs of control resource set | Control resource set | none |

As an example in Table 29, the PDCCH scrambling sequence may have different values according to different control resource sets according to the higher layer signaling configuration, and the scrambling sequence for the PDCCH DMRS may have different values according to different control resource sets according to the higher layer signaling configuration, and additionally may have different values in different slots and different OFDM symbols. In addition, according to the higher layer configuration information in the control resource set or within the search space, the position on the frequency domain in which the control resource set exists, whether interleaving is performed, the units of precoding, the aggregation level of the search space, and the number of PDCCH candidates, and the position of the start symbol in the slot of the search space, the number of consecutively appearing slots, and the period of the slot may be freely configured for each control resource set and for each search space.

Based on the information configured by the base station with regard to PDCCH repetitive transmission, the UE may receive PDCCH repetitive transmission, and here, the UE may determine, depending on the UE capability or implementation, whether to perform individual single decoding with regard to PDCCH repetitive transmission, whether to perform soft combining, or at which level the soft combining is performed even if the same is performed. Therefore, the base station may need to configure some of the above-described PDCCH-related configuration information with limitations according to the soft combining-related capability of the UE.

Hereinafter, according to the [UE capability reporting method 1] and [UE capability reporting method 2] related to soft combining of the UE according to the details of the second embodiment, specific limitations of information to be configured via higher layer signaling from the base station to the UE will be described in detail. According to the [UE Capability reporting method 3], the UE reports the limitations, which are required by the UE during configuration of the PDCCH repetitive transmission, through the capability report, and thus it is natural that the base station can configure PDCCH repetitive transmission based on the corresponding limitations, a detailed description thereof will be omitted. According to the [UE capability reporting method 4] above, the UE reports a PDCCH repetitive transmission configuration method that is supported, through the capability report, a detailed description similar to [UE capability reporting method 3] will be omitted.

If the base station performs configuration so as not to match the information reported through [UE capability reporting method 1] to [UE capability reporting method 4], the UE may ignore the corresponding configuration and not receive both PDCCHs during PDCCH repetitive transmission, may select one of the PDCCHs and not receive the same, or may perform individual decoding only for each PDCCH like a single transmission even in case of PDCCH repetitive transmission.

(4-1)th Embodiment: PDCCH Repetitive Transmission Configuration Limitations According to UE Capability Reporting Method 1

According to the [UE capability reporting method 1], a UE may report, to the base station, a UE capability in the form of possible or impossible relating to only whether soft combining is possible during PDCCH repetitive transmission, and the base station may receive the corresponding UE capability and then may notify the UE of PDCCH repetition configuration related information as follows.
[Base Station Determination 1 According to UE Capability Reporting Method 1]

As an example, if the UE reports, as a UE capability, information indicating that soft combining is possible during PDCCH repetitive transmission to the base station, the base station may determine whether soft combining of the UE is possible in the most flexible degree (for example, the UE determines that soft combining is possible at the level of log likelihood ratio (LLR)), and may notify the UE of the PDCCH repetitive transmission-related configuration during PDCCH transmission-related configuration as flexible as possible. Here, as an example related to PDCCH repetition configuration, the base station assumes that, with regard to the UE, soft combining between control resource sets or search spaces having different configurations, soft combining between PDCCH candidates having the same aggregation level, or soft combining between PDCCH candidates having different aggregation levels are possible, and may notify the UE of the corresponding configuration. More specifically, since the base station assumes that the most flexible soft combining by the UE is possible, the base station may notify the UE of higher layer signaling with the highest degree of freedom for the pieces of information in Table 29 above.

If the base station intends to configure, for the UE, PDCCH repetitive transmission based on the intra-slot TDM scheme, the base station may configure the monitoring slot period and slot offset (e.g., monitoringSlotPeriodicityAndOffset), which are configuration information, and the number of consecutive slots for monitoring (e.g., duration) to be identical in different search spaces, and may configure the starting OFDM symbol position (e.g., monitoringSymbolsWithinSlot) of a control resource set in a slot to be not overlap on the OFDM symbols with regard to two search spaces according to the OFDM symbol length of each control resource set connected to the two search spaces. For example, monitoringSymbolsWithinSlot is configured to be "10000000000000" for search space 1, OFDM symbol length of control resource set 1 connected to search space 1 is 3, monitoringSymbolsWithinSlot for search space 2 is configured to be "00000100000000", and the OFDM symbol length of control resource set 2 connected to search space 1 is 3, the UE may expect that control resource set 1 connected to search space 1 exists in the first to third OFDM symbols in a slot monitoring the two search spaces, and control resource set 2 connected to search space 2 exists in the sixth to eighth OFDM symbols.

If the base station intends to configure, for the UE, PDCCH repetitive transmission based on the inter-slot TDM scheme, the base station may configure the monitoring slot period and slot offset (e.g., monitoringSlotPeriodicityAndOffset), which are configuration information, to be the same monitoring slot period while having different offsets in different search spaces, may configure the number of consecutive slots for monitoring (e.g., duration) to be identical or configure two repeated PDCCHs not to exist in the same slot by considering the monitoringSlotPeriodicityAndOffset, and may freely configure the start OFDM symbol position (e.g., monitoringSymbolsWithinSlot) of the control resource set in a slot without limitations.

If the base station intends to configure, for the UE, PDCCH repetitive transmission based on the FDM scheme, the base station may perform, with regard to two control resource sets configured to be used for PDCCH repetitive transmission, configuration such that frequency resource positions (e.g., frequencyDomainResources), which are higher layer configuration in the control resource set configuration, do not overlap each other. For example, by configuring a bitmap for frequencyDomainResources as a mutually exclusive bitmap in connection with the configuration information of two control resource sets, the base station may perform PDCCH repetitive transmission to the UE through the FDM scheme. For example, if a predetermined bitmap exists for frequencyDomainResources with regard to control resource set 1, frequencyDomainResources with regard to the remaining control resource set 2 may have a form in which bits are shifted in a specific direction with regard to frequencyDomainResources of control resource set 1. More specifically, if the frequencyDomainResources of the control resource set 1 is a bitmap having MSBs 1 to 5 as 1 and the remaining bits as 0, the frequencyDomainResources of the control resource set 2 may be a bitmap having MSBs 8 to 12 as 1 and the remaining bits as 0, and this may be recognized as a form in which the frequencyDomainResources of the control resource set 1 are shifted by 7.

[Base Station Determination 2 According to UE Capability Reporting Method 1]

As another example, if the UE reports information that soft combining is possible during PDCCH repetitive transmission to the base station as a UE capability, the base station may determine the level of soft combining possible for the UE most conservatively (for example, determine that soft combining by the UE is possible at the OFDM symbol level), and may notify the UE of the PDCCH repetitive transmission-related configuration during PDCCH transmission-related configuration in the most restrictive manner. Here, as an example related to PDCCH repetition configuration, the base station may assume that, with regard to the UE, soft combining between a plurality of control resource sets having the same configuration or soft combining between PDCCH candidates having the same aggregation levels is possible, and may notify the UE of the corresponding configuration. More specifically, the base station may assume that the most restrictive soft combining is possible for the UE, and thus has the lowest degree of freedom for the information in Table 29, and may notify the UE of higher layer signaling.

If the base station configures, for the UE, a PDCCH repetitive transmission method via TDM through higher layer signaling, and a combination of the control resource set+search space, in which the PDCCH repetitive transmission is to be performed, is also configured via higher layer signaling, the base station may need to provide limitations such that at least one of the following pieces of information with regard to information between two control resource sets is identical, so as to enable soft combining in the UE.

pdcch-DMRS-ScramblingID for each control resource set for PDCCH scrambling ID and PDCCH DMRS scrambling ID Aggregation level, which is higher layer configuration in a search space, the number of PDCCH candidates per aggregation level, and the maximum value of the number of PDCCH candidates per aggregation level Frequency resource positions (e.g., frequencyDomainResources), which are higher layer configuration in a control resource set, the number of OFDM symbols in a control resource set (e.g., duration), a CCE-REG mapping method of a control resource set (e.g., cce-REG-MappingType), a precoder application unit (e.g., precoderGranularity)

The information to be presented below may be information for which a specific constraint should exist, not simply the identical information.

If the base station intends to configure, for the UE, PDCCH repetitive transmission based on the intra-slot TDM scheme, the base station may configure the monitoring slot period and slot offset (e.g., monitoringSlotPeriodicityAndOffset), which are configuration information, and the number of consecutive slots for monitoring (e.g., duration) to be identical in different search spaces, and may configure the starting OFDM symbol position (e.g., monitoringSymbolsWithinSlot) of a control resource set in a slot to be not overlap on the OFDM symbols with regard to two search spaces according to the OFDM symbol length of each control resource set connected to the two search spaces. For example, monitoringSymbolsWithinSlot is configured to be "100000000000000" for search space 1, OFDM symbol length of control resource set 1 connected to search space 1 is 3, monitoringSymbolsWithinSlot for search space 2 is configured to be "000000100000000", and the OFDM symbol length of control resource set 2 connected to search space 1 is 3, the UE may expect that control resource set 1 connected to search space 1 exists in the first to third OFDM symbols in a slot for monitoring the two search spaces, and control resource set 2 connected to search space 2 exists in the sixth to eighth OFDM symbols. In addition, since the PDCCH DMRS scrambling sequence has randomness for each OFDM symbol, the UE may expect that, for the PDCCH DMRS scrambling sequence, the same pdcch-DMRS-ScramblingID value is to be configured with regard to the two control resource sets as described above. Further, the UE may use Equation 4 by redefining the same to a new function having information such as monitoringSymbolsWithinSlot as an input.

If the base station intends to configure, for the UE, PDCCH repetitive transmission based on the inter-slot TDM scheme, the base station may configure the monitoring slot period and slot offset (e.g., monitoringSlotPeriodicityAndOffset), which are configuration information, to be the same monitoring slot period while having different offsets in different search spaces, may configure the number of consecutive slots for monitoring (e.g., duration) to be identical or configure two repeated PDCCHs not to exist in the same slot by considering the monitoringSlotPeriodicityAndOffset, and may freely configure the start OFDM symbol position (e.g., monitoringSymbolsWithinSlot) of a control resource set in a slot without limitations. In addition, since the PDCCH DMRS scrambling sequence has randomness for each slot and for each OFDM symbol, the UE may expect that, for the PDCCH DMRS scrambling sequence, the same pdcch-DMRS-ScramblingID value is to be configured with regard to the two control resource sets as described above. Further, the UE may use Equation 4 by redefining the same as a new function having information, such as an OFDM symbol position expressed by monitoringSymbolsWithinSlot in a slot and a slot offset expressed by monitoringSlot- PeriodicityAndOffset, as an input. In addition, with regard to the hashing function for each search space expressed by Equation 2 above, since $Y_{p,n_{s,f}^\mu}$ has a value different for each slot according to $A_p$, index p of two different control resource sets, which can have the same $A_p$ value may be used for PDCCH repetitive transmission. For example, PDCCH repetitive transmission in an inter-slot TDM scheme can be performed using a combination of p that can have the same pmod3, for example, two control resource sets corresponding to p=0, 3 or p=1, 4.

If the base station configures, for the UE, a PDCCH repetitive transmission method by using FDM through higher layer signaling, and a combination of the control resource set+search space, in which the PDCCH repetitive transmission is to be performed, is also configured via higher layer signaling, the base station may need to provide limitations such that at least one of the following pieces of information with regard to information between two control resource sets is identical, so as to enable soft combining in the UE.
- pdcch-DMRS-ScramblingID for each control resource set for PDCCH scrambling ID and PDCCH DMRS scrambling ID
- Aggregation level, which is higher layer configuration in a search space, the number of PDCCH candidates per aggregation level, the maximum value of the number of PDCCH candidates per aggregation level, the monitoring slot period and slot offset (e.g., monitoringSlotPeriodicityAndOffset), the number of consecutive slots for monitoring (e.g., duration), and the starting OFDM symbol position (e.g., monitoringSymbolsWithinSlot) of a control resource set in a slot
- the number of OFDM symbols of control resource set in the control resource set (e.g., duration), a CCE-REG mapping method of a control resource set (e.g., cce-REG-MappingType), a precoder application unit (e.g., precoderGranularity)

Pieces of information to be shown below may be information for which a specific constraint should exist, not simply the identical information.

The base station may perform, with regard to two control resource sets configured to be used for PDCCH repetitive transmission, configuration such that frequency resource positions (e.g., frequencyDomainResources), which are higher layer configuration in the control resource set configuration, do not overlap each other. For example, by configuring a bitmap for frequencyDomainResources as a mutually exclusive bitmap in connection with the configuration information of two control resource sets, the base station may perform PDCCH repetitive transmission to the UE through the FDM scheme. For example, if a predetermined bitmap exists for frequencyDomainResources with regard to control resource set 1, frequencyDomainResources with regard to the remaining control resource set 2 may have a form in which bits are shifted in a specific direction with regard to frequencyDomainResources of control resource set 1. More specifically, if the frequencyDomainResources of the control resource set 1 is a bitmap having MSBs 1 to 5 as 1 and the remaining bits as 0, the frequencyDomainResources of the control resource set 2 may be a bitmap having MSBs 8 to 12 as 1 and the remaining bits as 0, and this may be recognized as a form in which the frequencyDomainResources of the control resource set 1 are shifted by 7.

In addition, when the PDCCH DMRS is mapped to the frequency position of each control resource set so that the scrambling sequence of the PDCCH DMRS of the two control resource sets is identical, the base station may adjust the PDCCH DMRS value mapped to the frequency position based on the frequencyDomainResources information of the two control resource sets.

(4-2)th Embodiment: PDCCH Repetitive Transmission Configuration Limitations According to UE Capability Reporting Method 2

A base station may provide limitations on PDCCH repetition configuration according to [UE capability reporting method 2] for reporting the soft combining possible level in a UE.

[Base Station Configuration for UE Capable of Soft Combining of OFDM Symbol Level]

If a UE has reported that soft combining at the OFDM symbol level is possible based on [UE capability reporting method 2], similarly to [Base station determination 1 according to UE capability reporting method 1] of the (4-1)th embodiment, the base station assumes that the most restrictive soft combining by the UE is possible, and thus may notify the UE of higher layer signaling while having the lowest degree of freedom with regard to the pieces of information in Table 29.

[Base Station Configuration for UE Capable of Soft Combining of Modulation Symbol Level]

If a UE has reported that soft combining at the modulation symbol level is possible based on [UE capability reporting method 2], the base station assumes that partially flexible soft combining by the UE is possible, and may notify the UE of higher layer signaling while having limitation conditions with regard to some of pieces of information of Table 29.

If the base station configures, for the UE, a PDCCH repetitive transmission method via TDM through higher layer signaling, and a combination of the control resource set+search space, in which the PDCCH repetitive transmission is to be performed, is also configured via higher layer signaling, the base station may need to provide limitations such that at least one of the following pieces of information with regard to information between two control resource sets is identical, so as to enable soft combining in the UE.
- pdcch-DMRS-ScramblingID for each control resource set for PDCCH scrambling ID and PDCCH DMRS scrambling ID
- Aggregation level, which is higher layer configuration in a search space, the number of PDCCH candidates per aggregation level, and the maximum value of the number of PDCCH candidates per aggregation level
- The number of OFDM symbols in a control resource set (e.g., duration)

Unlike the case of [base station configuration for UE capable of soft combining of OFDM symbol level], with regard to two control resource sets in which PDCCH repetitive transmission occurs, frequency resource positions (e.g., frequencyDomainResources), which are higher layer configuration in each control resource set, may have the same number of CCEs on the frequency domain but different locations, and a CCE-REG mapping method (e.g., cce-REG-MappingType) and a precoder application unit (e.g., precoderGranularity) of a control resource set may be differently configured.

Pieces of information to be shown below may be information for which a specific limitation should exist, not simply the identical information.

If the base station intends to configure, for the UE, PDCCH repetitive transmission based on the intra-slot TDM scheme, the base station may configure the monitoring slot period and slot offset (e.g., monitoringSlotPeriodicityAnd- Offset), which are configuration information, and the number of consecutive slots for monitoring (e.g., duration) to be identical in different search spaces, and may configure the starting OFDM symbol position (e.g., monitoringSymbolsWithinSlot) of a control resource set in a slot to be not overlap on the OFDM symbols with regard to two search spaces according to the OFDM symbol length of each control resource set connected to the two search spaces. For example, monitoringSymbolsWithinSlot is configured to be "10000000000000" for search space 1, OFDM symbol length of control resource set 1 connected to search space 1 is 3, monitoringSymbolsWithinSlot for search space 2 is configured to be "00000100000000", and the OFDM symbol length of control resource set 2 connected to search space 1 is 3, the UE may expect that control resource set 1 connected to search space 1 exists in the first to third OFDM symbols in a slot for monitoring the two search spaces, and control resource set 2 connected to search space 2 exists in the sixth to eighth OFDM symbols.

If the base station intends to configure, for the UE, PDCCH repetitive transmission based on the inter-slot TDM scheme, the base station may configure the monitoring slot period and slot offset (e.g., monitoringSlotPeriodicityAndOffset), which are configuration information, to be the same monitoring slot period while having different offsets in different search spaces, may configure the number of consecutive slots for monitoring (e.g., duration) to be identical or configure two repeated PDCCHs not to exist in the same slot by considering the monitoringSlotPeriodicityAndOffset, and may freely configure the start OFDM symbol position (e.g., monitoringSymbolsWithinSlot) of the control resource set in a slot without limitations.

If the base station configures, for the UE, a PDCCH repetitive transmission method by using FDM through higher layer signaling, and a combination of the control resource set+search space, in which the PDCCH repetitive transmission is to be performed, is also configured via higher layer signaling, the base station may need to provide limitations such that at least one of the following pieces of information with regard to information between two control resource sets is identical, so as to enable soft combining in the UE.

pdcch-DMRS-ScramblingID for each control resource set for PDCCH scrambling ID and PDCCH DMRS scrambling ID Aggregation level, which is higher layer configuration in a search space, the number of PDCCH candidates per aggregation level, the maximum value of the number of PDCCH candidates per aggregation level, the monitoring slot period and slot offset (e.g., monitoringSlotPeriodicityAndOffset), the number of consecutive slots for monitoring (e.g., duration), and the starting OFDM symbol position (e.g., monitoringSymbolsWithinSlot) of a control resource set in a slot the number of OFDM symbols of control resource set in the control resource set (e.g., duration)

Unlike the case of [base station configuration for UE capable of soft combining of OFDM symbol level], a CCE-REG mapping method of a control resource set (e.g., cce-REG-MappingType) and a precoder application unit (e.g., precoderGranularity) may be differently configured.

Pieces of information to be shown below may be information for which a specific constraint should exist, not simply the identical information.

The base station may perform, with regard to two control resource sets configured to be used for PDCCH repetitive transmission, configuration such that frequency resource positions (e.g., frequencyDomainResources), which are higher layer configuration in the control resource set configuration, do not overlap each other. For example, by configuring a bitmap for frequencyDomainResources as a mutually exclusive bitmap in connection with the configuration information of two control resource sets, the base station may perform PDCCH repetitive transmission to the UE through the FDM scheme. For example, if a predetermined bitmap exists for frequencyDomainResources with regard to control resource set 1, frequencyDomainResources with regard to the remaining control resource set 2 may have a form in which bits are shifted in a specific direction with regard to frequencyDomainResources of control resource set 1. More specifically, if the frequencyDomainResources of the control resource set 1 is a bitmap having MSBs 1 to 5 as 1 and the remaining bits as 0, the frequencyDomainResources of the control resource set 2 may be a bitmap having MSBs 8 to 12 as 1 and the remaining bits as 0, and this may be recognized as a form in which the frequencyDomainResources of the control resource set 1 are shifted by 7.

In addition, when the PDCCH DMRS is mapped to the frequency position of each control resource set so that the scrambling sequence of the PDCCH DMRS of the two control resource sets is identical, the base station may adjust the PDCCH DMRS value mapped to the frequency position based on the frequencyDomainResources information of the two control resource sets.

[Base Station Configuration for UE Capable of LLR Level Soft Combining]

If the UE has reported that soft combining at the LLR level is possible based on [UE capability reporting method 2], similarly to [Base station determination 2 according to UE capability reporting method 1] of the (4-1)th embodiment, the base station assumes that the most flexible soft combining by the UE is possible, and thus may notify the UE of higher layer signaling while having the highest degree of freedom with regard to the pieces of information of Table 29.

In addition, some configurations or operations between the above-described methods may be selectively joined/combined and applied in order to perform configuration of PDCCH repetitive transmission considering soft combining during PDCCH repetitive transmission.

Figure 17:
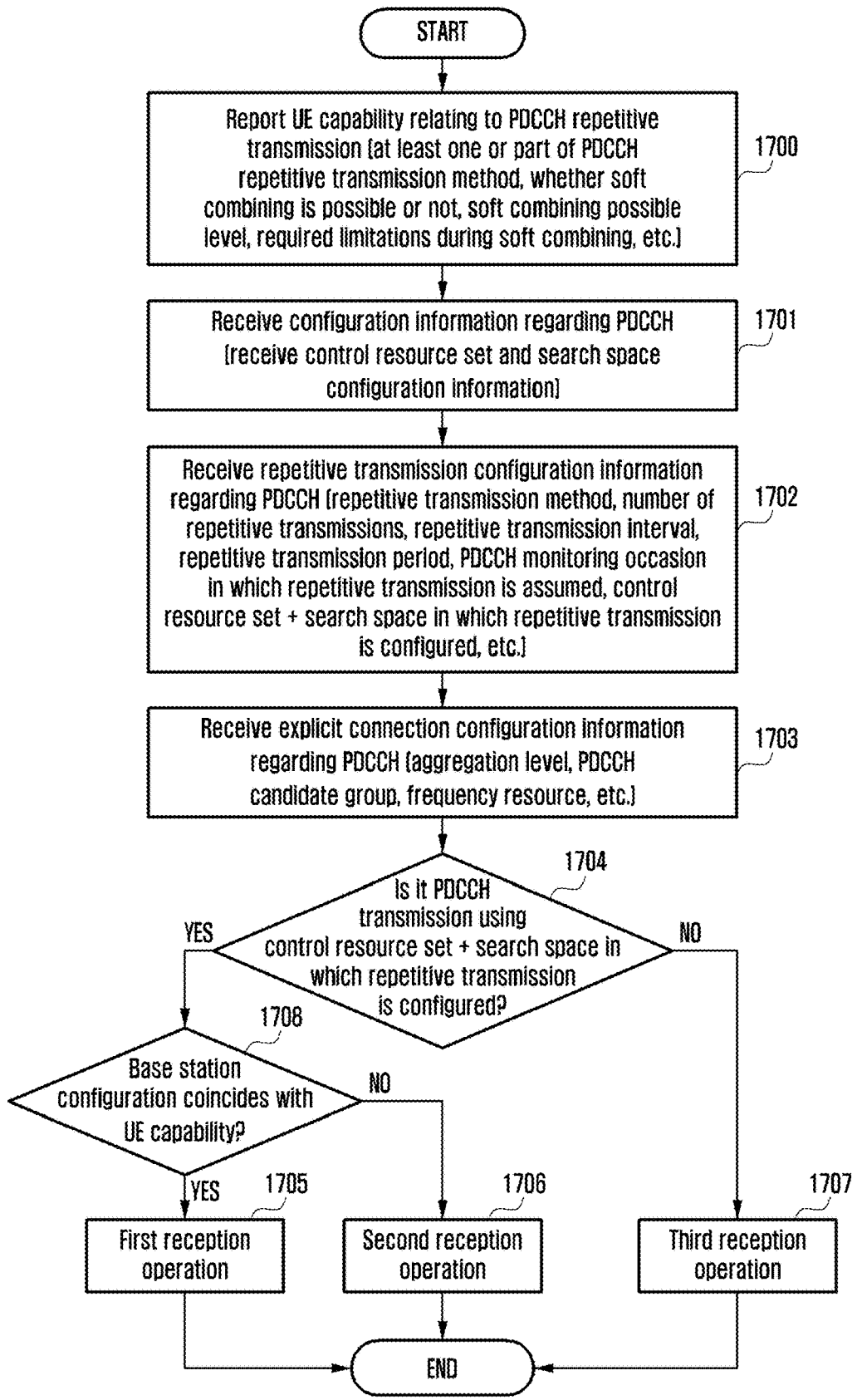
FIG. 17 illustrates a flowchart of a UE capability report during PDCCH repetitive transmission and a UE operation according to a PDCCH repetitive transmission configuration and an explicit connection configuration condition of a base station according to an embodiment of the disclosure.

FIG. 17 illustrates a flowchart of an operation of a UE according to a UE capability report and a PDCCH repetitive transmission configuration of a base station during PDCCH repetitive transmission according to an embodiment of the disclosure. This is for convenience of explanation, and according to configurations and/or definitions on the system, all of the operations described below are not necessarily included, and some operations may be omitted.

Referring to FIG. 17, the UE may report the UE capability related to PDCCH repetitive transmission to the base station in operation 1700. Here, the possible UE capability report may be at least one of a PDCCH repetitive transmission method supported by the UE (for example, it may be one of the methods 1-1 to 1-5) and the soft combining-related UE capability reporting method considered in the second embodiment (whether soft combining is possible, soft combining possible level, required limitations for soft combining, etc.) or a part thereof. In another embodiment, when the information on the UE capability is preconfigured for the corresponding UE, the operation 1700 may be omitted. In addition, when the information on the UE capability is equally applied as default information to UEs of a predetermined group, operation 1700 may be omitted.

Thereafter, the UE may receive the first configuration information for the PDCCH from the base station in operation 1701, and may additionally receive second configuration information for the PDCCH repetitive transmission in operation 1702. Here, the second configuration information may include information on at least one of a repetitive transmission method, the number of repetitive transmissions, a repetitive transmission interval, a repetitive transmission period, a PDCCH monitoring occasion in which repetitive transmission is assumed, whether linkage or association between repetitive transmissions can be checked, and information regarding control resource set+search space in which repetitive transmission is configured. In addition, the UE may additionally receive third configuration information in operation 1703. Here, the third configuration information may include information on at least one of an aggregation level, a PDCCH candidate group, and a frequency resource, or none of them may be configured according to the methods of the third embodiment. In addition, the UE may receive at least a part of the first configuration information to the third configuration information through L1 signaling, or may be possible to implicitly determine at least a part thereof based on other configuration information. In addition, the first to third configuration information may be included in one configuration information and provided to the UE.

Upon receiving the configuration information, the UE identifies that transmission is performed using multiple control resource sets+search spaces, in which repetitive transmission is configured from the base station, in operation 1704, and if the UE receives the PDCCH using a control resource set and/or search space other than the control resource set+search space in which repetitive transmission is configured, the process proceeds to operation 1707, the UE may operate using single PDCCH reception and single decoding (the third reception operation), which is the existing PDCCH reception operation. Meanwhile, if the UE receives the PDCCH using the control resource set+search space in which repetitive transmission is configured in operation 1704, the UE may compare the reported UE capability with the base station configuration in operation 1708 to determine that the base station configuration is a configuration method by which the UE can perform reception by reflecting the UE capability, for example, if it can be determined that the base station configuration matches the UE capability report, the process proceeds to operation 1705 to perform a first reception operation in operation 1705. The first reception operation may be understood as that the UE may determine that repetitive transmission of the PDCCH is performed according to the pieces of configuration information by the base station and use a single PDCCH reception method, which is an existing PDCCH reception operation, or that soft combining is performed between PDCCH candidates which are assumed to be capable of soft combining and to be explicitly connected to each other. Meanwhile, if it is determined in operation 1708 that the base station configuration does not match the UE capability report, the UE may perform a second reception operation in operation 1706. The second reception operation may be understood that, as described above, the UE ignores the configuration of the base station and does not receive both PDCCHs during PDCCH repetitive transmission, or selects either one of the two PDCCHs and not receive the same, or even if it is PDCCH repetitive transmission, only individual decoding for each PDCCH is performed like a single transmission.

Figure 18:
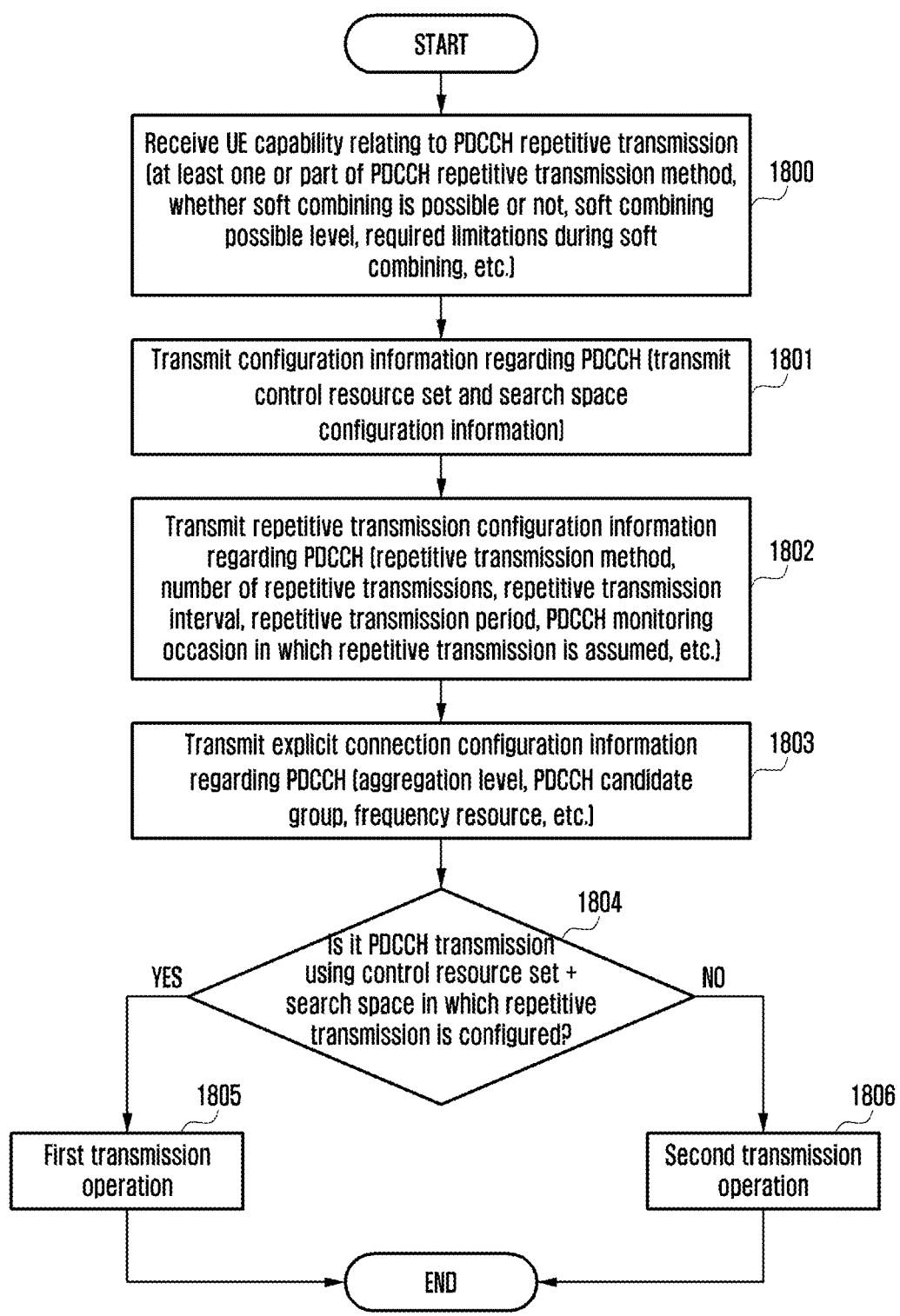
FIG. 18 illustrates a flowchart of a UE capability report during PDCCH repetitive transmission and a base station operation according to a PDCCH repetitive transmission configuration of a base station according to an embodiment of the disclosure.

FIG. 18 illustrates a flowchart of an operation of a base station according to a UE capability report and a PDCCH repetitive transmission configuration of a base station during PDCCH repetitive transmission according to an embodiment of the disclosure. This is for convenience of explanation, and according to configurations and/or definitions on the system, all of the operations described below are not necessarily to be included, and some operations may be omitted.

Referring to FIG. 18, the base station may receive the UE capability related to PDCCH repetitive transmission from the UE in operation 1800. Here, the possible UE capability report may be at least one of a PDCCH repetitive transmission method supported by the UE (for example, it may be one of the methods 1-1 to 1-5) and the soft combining-related UE capability reporting method considered in the second embodiment (whether soft combining is possible, soft combining possible level, required limitations for soft combining, etc.) or a part thereof. In another embodiment, when the information on the UE capability is preconfigured for the corresponding UE, the operation 1800 may be omitted. In addition, when the information on the UE capability is equally applied as default information to UEs of a predetermined group, operation 1800 may be omitted.

Thereafter, the base station may transmit the first configuration information for the PDCCH to the UE in operation 1801, and may additionally perform transmission of second configuration information for the PDCCH repetitive transmission in operation 1802. Here, the second configuration information may include information on at least one of a repetitive transmission method, the number of repetitive transmissions, a repetitive transmission interval, a repetitive transmission period, a PDCCH monitoring occasion in which repetitive transmission is assumed, whether linkage or association between repetitive transmissions can be checked, and information regarding control resource set+search space in which repetitive transmission is configured. In addition, the base station may additionally perform transmission of third configuration information in operation 1803. Here, the third configuration information may include information on at least one of an aggregation level, a PDCCH candidate group, and a frequency resource, or none of them may be configured according to the methods of the third embodiment. In addition, the base station may transmit at least a part of the first configuration information to the third configuration information through L1 signaling, or may be possible to implicitly determine at least a part thereof based on other configuration information. In addition, the first to third configuration information may be included in one configuration information and provided to the UE.

Upon transmitting the configuration information, the base station identifies that transmission is performed using multiple control resource sets+search spaces, in which repetitive transmission is configured, in operation 1804, and if the base station transmits the PDCCH using a control resource set and/or search space other than the control resource set+search space in which repetitive transmission is configured, the process proceeds to operation 1806, the base station may operate based on single PDCCH transmission (the second transmission operation), which is the existing PDCCH transmission operation. Meanwhile, if the base station transmits the PDCCH using the control resource set+search space in which repetitive transmission is configured in operation 1804, the process proceeds to operation 1805 and the base station may perform a first transmission operation in operation 1805. The first transmission operation may be understood as that the UE may determine that repetitive transmission of the PDCCH is performed according to the pieces of configuration information by the base station and use a single PDCCH reception method, which is an existing PDCCH reception operation, or may assume to perform soft combining between PDCCH candidates which are assumed to be capable of soft combining and to be explicitly connected to each other, and that the base station performs PDCCH repetitive transmission to the UE.

Fifth Embodiment: Operation Method of a Base Station and a UE when Multiple Different PDCCH Candidates Overlap>

As an embodiment of the disclosure, a detailed method for operations of a base station and a UE when multiple different PDCCH candidates overlap will be described. In the following (5-1)th embodiment, operations of a base station and a UE for a case in which multiple different PDCCH candidates for single transmission overlap are described, and in the (5-2)th embodiment, operations of a base station and a UE for a case in which a PDCCH candidate for single transmission and two PDCCH candidates for repetitive transmission overlap are described.

(5-1)th Embodiment: a Case in which Multiple Different PDCCH Candidates for Single Transmission Overlap>

In a case in which the first PDCCH candidate in the n-th search space and the second PDCCH candidate in the m-th search space are transmitted at the same CCE position, use the same scrambling (e.g., a specific RNTI), and have the same length of DCI bit size, wherein both the n-th and m-th search spaces are connected to the same control resource set, if n>m, the UE may not perform blind decoding (BD) counting for the first PDCCH candidate in the n-th search space. For example, when the first PDCCH candidate and the second PDCCH candidate are not completely distinguished from the viewpoint of the UE, the UE may perform BD only once. Further, in the above example, the UE may perform monitoring for the first PDCCH candidate and the second PDCCH candidate. Here, the monitoring may be understood as descrambling PDCCH data obtained by performing BD as an example, by a specific RNTI. In the above situation, the same scrambling is used, and thus the UE may not know a search space from which a PDCCH candidate is derived.

In addition, in a case in which the n-th PDCCH candidate and the m-th PDCCH candidate in the x-th search space are transmitted at the same CCE position, use the same scrambling (e.g., specific RNTI), have the same length of DCI bit size, and are transmitted from the same control resource set, if n<m, the UE may not perform BD counting for the n-th PDCCH candidate. For example, when the n-th and m-th PDCCH candidates are not completely distinguished from the viewpoint of the UE, the UE may perform BD only once. Further, in the above example, the UE may perform monitoring for the n-th and the m-th PDCCH candidate. Here, the monitoring may be understood as descrambling PDCCH data obtained by performing BD as an example, by a specific RNTI. In the above situation, the same scrambling is used, and thus the UE may not know a search space from which a PDCCH candidate is derived.

(5-2)th Embodiment: a Case in which a PDCCH Candidate for single Transmission and Two PDCCH Candidates for Repetitive Transmission Overlap According to an embodiment of the disclosure, operations of a base station and a UE for a case in which a PDCCH candidate for single transmission and two PDCCH candidates for repetitive transmission overlap will be described. In the embodiment, at least two situations may be considered as follows. The operations of the base station and the UE for each situation will be described in detail.

[Situation 5-2-1] a case in which one PDCCH candidate among two PDCCH candidates for repetitive transmission overlaps one PDCCH candidate for single transmission This situation may consider a case in which the a-th search space and the b-th search space have linkage with each other through higher layer signaling for PDCCH repetitive transmission and perform PDCCH repetitive transmission, and thus the first PDCCH candidate and the second PDCCH candidate are transmitted in the a-th search space and b-th search space, respectively, both the a-th search space and the b-th search space are connected to the same control resource set (e.g., the first control resource set) or connected to different control resource sets (e.g., the a-th search space is connected to the first control resource set and the b-th search space is connected to the second control resource set), and the c-th search space for single PDCCH transmission is connected to the first control resource set and transmits the third PDCCH candidate. Here, if the first PDCCH candidate transmitted in the first control resource set connected to the a-th search space and the third PDCCH candidate transmitted in the same first control resource set connected to the c-th search space are transmitted at the same CCE position, use the same scrambling (e.g., a specific RNTI), have the same length of DCI bit size, and are transmitted in the same control resource set, the UE may not perform BD counting for a third PDCCH candidate for single transmission. That is, when the first PDCCH candidate and the third PDCCH candidate are not completely distinguished from the viewpoint of the UE, the UE may perform BD counting, with regard to the two PDCCH candidates for repetitive transmission and one PDCCH candidate for single transmission, as many as the number of BD counts consumed for the two PDCCH candidates for repetitive transmission. Here, the number of BD counts consumed for the two PDCCH candidates for repetitive transmission may be reported as UE capability, and the value thereof may be, for example, 2 or 3. If the UE does not report the UE capability related to the number of BD counts to the base station, the base station may assume, for example, 2 or 3 as a default value for the number of BD counts consumed for the two PDCCH candidates for repetitive transmission of the corresponding UE. If the UE interprets information of a PDCCH that has successful in decoding, the UE may perform interpretation based on a reference PDCCH candidate that is considered during PDCCH repetitive transmission (e.g., when performing scheduling of a PDSCH or aperiodic CSI-RS, the UE may perform scheduling based on a PDCCH candidate that starts later in time among the two repeated PDCCH candidates.)

With regard to the above-described case, whether to perform monitoring for the third PDCCH candidate for single transmission may be determined considering the following methods.

The UE may perform monitoring for a third PDCCH candidate for single transmission regardless of a specific condition. Here, the specific condition may refer to a condition considering the number of BD counts consumed for two PDCCH candidates for repetitive transmission, which are reported as UE capability, whether the a-th to c-th search spaces are configured as a common search space or a UE-specific search space, and the number of control resource sets connected to the a-th and b-th search spaces connected via higher layer signaling.

The UE may not perform monitoring for a third PDCCH candidate for single transmission regardless of a specific condition. Here, the specific condition may refer to a condition considering the number of BD counts consumed for two PDCCH candidates for repetitive transmission, which are reported as UE capability, whether the a-th to c-th search spaces are configured as a common search space or a UE-specific search space, and the number of control resource sets connected to the a-th and b-th search spaces connected via higher layer signaling.

The UE may determine whether to perform monitoring for a third PDCCH candidate for single transmission according to the number of BD counts consumed for two PDCCH candidates for repetitive transmission reported as UE capability. If the number of BD counts consumed for two PDCCH candidates for repetitive transmission reported as UE capability is 3, the UE may perform monitoring on a third PDCCH candidate for single transmission. Alternatively, if the number of BD counts consumed for two PDCCH candidates for repetitive transmission reported as UE capability is 2, the UE may not perform monitoring for a third PDCCH candidate for single transmission.

The UE may determine whether to perform monitoring for a third PDCCH candidate for single transmission according to the number of BD counts consumed for two PDCCH candidates for repetitive transmission, which are reported as UE capability. If the number of BD counts consumed for two PDCCH candidates for repetitive transmission, which are reported as UE capability, is 3, the UE may not perform monitoring for a third PDCCH candidate for single transmission. Alternatively, if the number of BD counts consumed for two PDCCH candidates for repetitive transmission, which are reported as UE capability, is 2, the UE may perform monitoring for a third PDCCH candidate for single transmission.

The UE may perform monitoring for a third PDCCH candidate for single transmission when the number of BD counts consumed for two PDCCH candidates for repetitive transmission, which are reported as UE capability, is 3. Alternatively, when the number of BD counts consumed for two PDCCH candidates for repetitive transmission, which are reported as UE capability, is 2, the UE may report whether to perform monitoring for a third PDCCH candidate for single transmission as an additional UE capability. Here, the value reported as the additional UE capability may indicate whether monitoring is being performed or not, and if the additional UE capability is not reported, the base station may consider that the UE may not perform monitoring for the third PDCCH candidate as a default value. In addition, the value reported as the additional UE capability may indicate that monitoring is being performed, and if the additional UE capability is not reported, the base station may consider that the UE does not perform monitoring for the third PDCCH candidate as a default value.

The UE may perform monitoring for a third PDCCH candidate for single transmission when the number of BD counts consumed for two PDCCH candidates for repetitive transmission, which are reported as UE capability, is 3. Alternatively, when the number of BD counts consumed for two PDCCH candidates for repetitive transmission, which are reported as UE capability, is 2, and according to whether the above described a-th to c-th search spaces are configured as a UE-specific search space or a common search space, the UE may report whether to perform monitoring a third PDCCH candidate for single transmission as an additional UE capability. Here, the value reported as the additional UE capability may indicate whether monitoring is being performed or not, and if the additional UE capability is not reported, the base station may consider that the UE may perform monitoring for the third PDCCH candidate as a default value or may consider that the UE may not perform monitoring. In addition, the value reported as the additional UE capability may indicate that monitoring is being performed, and if the additional UE capability is not reported, the base station may consider that the UE does not perform monitoring for the third PDCCH candidate as a default value. In addition, in a case in which the number of BD counts consumed for two PDCCH candidates for repetitive transmission, which are reported as UE capability, is 2, and the c-th search space is a common search space, if the UE does not report to the base station whether to monitor the third PDCCH candidate for single transmission, as the additional terminal capability, the base station may consider that the UE performs monitoring for the third PDCCH candidate as a default value. In addition, in a case in which the number of BD counts consumed for two PDCCH candidates for repetitive transmission, which are reported as UE capability, is 2, and the c-th search space is a common search space, if the UE does not report to the base station whether to monitor the third PDCCH candidate for single transmission, as the additional terminal capability, the base station may consider that the UE does not perform monitoring for the third PDCCH candidate as a default value.

The UE may report to the base station, as an additional UE capability, whether to perform monitoring for a third PDCCH candidate for single transmission according to a specific condition. Here, the specific condition may refer to the number of BD counts consumed for two PDCCH candidates for repetitive transmission, which are reported as UE capability, whether the common search space of the a-th to c-th search space is configured as the UE-specific search space, the number of control resource sets connected to the a-th and b-th search spaces connected via higher layer signaling, and the number of search space pairs connected via higher layer signaling.

As an example, whether monitoring of a third PDCCH candidate for single transmission is performed may be reported as an additional UE capability according to the number of BD counts consumed for two PDCCH candidates for repetitive transmission, which are reported as UE capability. Here, the value reported as the additional UE capability may indicate whether monitoring is being performed or not, and in a case in which the additional UE capability is not reported, if the number of BD counts consumed for the two PDCCH candidates for repetitive transmission, which are reported as the UE capability, is 3 or 2, in both cases, the base station may consider that the UE does not perform monitoring for the third PDCCH candidate as a default. According to a case in which the number of BD counts consumed for the two PDCCH candidates for repetitive transmission, which are reported as the UE capability, is 3 and 2, the base station may consider that the UE has performed monitoring or not for the third PDCCH candidate, as a default, respectively. According to a case in which the number of BD counts consumed for the two PDCCH candidates for repetitive transmission, which are reported as the UE capability, is 3 and 2, the base station may consider monitoring not performed and performed by the UE for the third PDCCH candidate, as a default, respectively. If the number of BD counts consumed for the two PDCCH candidates for repetitive transmission, which are reported as the UE capability, is 3 and 2, in both cases, the base station may consider that the UE performs monitoring for the third PDCCH candidate as a default.

As an example, whether monitoring of a third PDCCH candidate for single transmission is performed may be reported as an additional UE capability depending on whether the a-th to c-th search spaces are configured as a common search space or a UE-specific search space. Here, the value reported as the additional UE capability may indicate whether monitoring is being performed or not. Here, the UE may report a total of four types of values according to cases in which 1) the a-th and b-th search spaces are UE-specific search spaces, and c-th search space is a common search space, 2) the a-th and b-th search spaces are common search spaces and the c-th search space is a UE-specific search space, 3) all of the a-th to c-th search spaces are common search spaces, 4) all of the a-th to the c-th search spaces are UE-specific search spaces, and the UE may report values only in some of these cases. If the additional UE capability is not reported, the base station may consider, as a default value, each of the four cases described above to be one of a case in which the UE performs monitoring for the third PDCCH candidate and a case in which the UE does not perform monitoring therefor. For example, with regard to two cases in which the c-th search space is a common search space, if additional UE capability is not reported, the base station may consider that the UE performs monitoring for a third PDCCH candidate for single transmission.

As an example, when the UE reports whether to perform monitoring on the third PDCCH candidate for single transmission as an additional UE capability, the UE may report the additional UE capability to the base station by considering both the number of BD counts consumed for two PDCCH candidates for repetitive transmission reported as the UE capability and whether the above described a-th to c-th search spaces are configured as a common search space or a UE-specific search space. For example, in a case in which the UE has reported that the number of BD counts consumed for two PDCCH candidates for repetitive transmission is 2, the a-th and b-th search spaces are UE-specific search spaces, and the c-th search space is a common search space, the UE may report, as an additional UE capability, to the base station that monitoring of the third PDCCH candidate is performed. In addition, in the above example, when the UE does not report the additional UE capability, the base station may consider that the UE does not perform monitoring for the third PDCCH candidate as a default value. Alternatively, with regard to another combination (for example, a combination of the number of BD counts consumed for two PDCCH candidates for repetitive transmission by different UEs and whether the a-th to c-th search spaces are configured as a UE-specific search space or a common search space), individual report thereof is possible as the additional UE capability, and if the additional UE capability for each combination is not reported, the base station may consider the same as one of a case in which the UE performs monitoring for the third PDCCH candidate and a case in which the UE does not perform monitoring therefor.

[Situation 5-2-2] When one PDCCH candidate among two PDCCH candidates for repetitive transmission overlaps one PDCCH candidate for single transmission, and the other PDCCH candidate among two PDCCH candidates for repetitive transmission overlaps one PDCCH candidate for single transmission.

This situation may consider a case in which the a-th search space and the b-th search space have a linkage with each other for PDCCH repetitive transmission via higher layer signaling, and perform PDCCH repetitive transmission so that the first PDCCH candidate and the second PDCCH candidate are transmitted in the a-th search space and b-th search space, respectively; both the a-th search space and the b-th search space are connected to the same control resource set (e.g., the first control resource set) or are connected to different control resource sets (e.g., the a-th search space is connected to the first control resource set and the b-th search space is connected to the second control resource set); the c-th search space for single PDCCH transmission is connected to the first control resource set and transmits a third PDCCH candidate; and the d-th search space is connected to the first control resource set (or is connected to the second control resource set when the above-described b-th search space is connected to the second control resource set) and transmits the fourth PDCCH candidate. Here, if the first PDCCH candidate transmitted in the first control resource set connected to the a-th search space and the third PDCCH candidate transmitted in the same first control resource set connected to the c-th search space are transmitted at the same CCE position, use the same scrambling (e.g., a specific RNTI), have the same length of DCI bit size, and are transmitted in the same control resource set, the UE does not perform BD counting for a third PDCCH candidate for single transmission. At the same time, if the second PDCCH candidate transmitted in the first control resource set (or the second control resource set) connected to the b-th search space and the fourth PDCCH candidates transmitted in the same first control resource set (or the second control resource set) connected to the d-th search space are transmitted at the same CCE position, use the same scrambling (e.g., a specific RNTI), have the same length of DCI bit size, and are transmitted in the same control resource set, the UE does not perform BD counting for a third PDCCH candidate and a third PDCCH candidate for single transmission. That is, when the first and third PDCCH candidates and the second and fourth PDCCH candidates are not completely distinguished from the viewpoint of the UE, BD counting for the two PDCCH candidates for repetitive transmission and two PDCCH candidates, each of which is subject to single transmission may be performed as many as the number of BD counts consumed for two PDCCH candidates for repetitive transmission. Here, the number of BD counts consumed for the two PDCCH candidates for repetitive transmission may be reported as UE capability, and the value thereof may be, for example, 2 or 3. If the UE does not report the UE capability related to the number of BD counts to the base station, the base station may assume 2 or 3 as a basic value for the number of BD counts consumed for the two PDCCH candidates for repetitive transmission of the corresponding UE.

This situation considers a case in which the first PDCCH candidate, which is one of the two PDCCH candidates for repetitive transmission, and a third PDCCH candidate for single transmission overlap, and at the same time, a second PDCCH candidate, which is one of two PDCCH candidates for repetitive transmission, and a fourth PDCCH candidate for single transmission overlap. Here, if the UE may perform individual decoding on the positions of the two overlapping PDCCH candidates so as to obtain information indicating that the decoded PDCCHs are the same or different from each other, and when interpreting the information in a PDCCH that has been successfully decoded, if the two decoded PDCCHs are the same, information interpretation can be performed based on a reference PDCCH candidate that is considered during PDCCH repetitive transmission (for example, when performing scheduling of a PDSCH or aperiodic CSI-RS, scheduling may be performed based on a PDCCH candidate that is started later in time among the two repeated PDCCH candidates). If the two PDCCHs are different, information in the PDCCH can be interpreted based on each PDCCH for single transmission. If the UE cannot perform individual decoding for positions of two overlapping PDCCH candidates or can perform individual decoding only for a part thereof, or if it is impossible to check whether the overlapping PDCCH candidates in two positions are identical, the UE can perform interpretation based on a reference PDCCH candidate considered during PDCCH repetitive transmission.

For the above-described case, the methods considered in [Situation 5-2-1] may be similarly considered as to whether to perform monitoring for the third PDCCH candidate for single transmission. Additionally, the UE may determine whether to perform monitoring for the third PDCCH candidate and the fourth PDCCH candidate by considering a condition in which a time position in which the first PDCCH candidate and the third PDCCH candidate overlap and a time position in which the second PDCCH candidate and the fourth PDCCH candidate overlap are the same or different, or may report whether monitoring is performed as additional UE capability through the above-described various methods. Here, it may be determined whether monitoring for the third PDCCH candidate and the fourth PDCCH candidate is differently performed, and whether the monitoring is differently performed may be reported as an additional UE capability.

In a case in which PDCCH candidates for single and repetitive transmission overlap, are transmitted at the same CCE position, use the same scrambling (e.g., specific RNTI), have the same length of DCI bit size, and are transmitted in the same control resource set, which are considered in [Situation 5-2-1] and [Situation 5-2-2] described above, the UE may report, to the base station, at least one of whether to allow overlapping situations between PDCCH candidates as an additional UE capability and when allowed, the number of overlapping PDCCH candidates allowed within a specific time resource (per OFDM symbol, per monitoring occasion, per slot, or per span). The UE may report, through the additional UE capability, the maximum number of overlapping times of PDCCH candidates allowed within a specific time resource in connection with each of [Situation 5-2-1] and [Situation 5-2-2]. The additional UE capability may be reported for each individual cell and may be reported for all cells. When reporting is performed for each individual cell, the additional UE capability may be reported for each numerology by considering the numerology of each cell, and when reporting is performed for all cells, the additional UE capability may be reported based on the smallest or largest numerology. Here, the reported value is possible from 0, and the UE has reported "0" may be understood as that [Situation 5-2-1] or [Situation 5-2-2] is not allowed. In addition, with regard to the additional UE capability, information on each combination of types of a search space in which repeated PDCCH candidates are transmitted and a search space in which a PDCCH candidate for single transmission is transmitted may be individually reported. For example, in case of [Situation 5-2-1], with regard to <search space 1, search space 2>, a total of four types of <common, common>, <common, UE-specific>, <UE-specific, common>, <UE-specific, UE-specific> may be possible, and search spaces 1 and 2 may correspond to repetitive transmission and single transmission, respectively. In case of [Situation 5-2-2], with regard to <search space 1, search space 2, and search space 3>, a total of eight types of <common, common, common>, <common, common, UE-specific>, <common, UE-specific, common>, <common, UE-specific, UE-specific>, <UE-specific, common, common>, <UE-specific, common, UE specific>, <UE-specific, UE specific, common>, <UE-specific, UE specific, UE-specific> may be possible, and search spaces 1, 2, and 3 may correspond to repetitive transmission, single transmission 1, and single transmission 2, respectively.

Meanwhile, between the embodiments and methods described above in the disclosure, each of configurations or operations may be selectively joined/combined and applied, and each of examples is for convenience of technology and the scope of the disclosure is not limited thereto.

Figure 19:
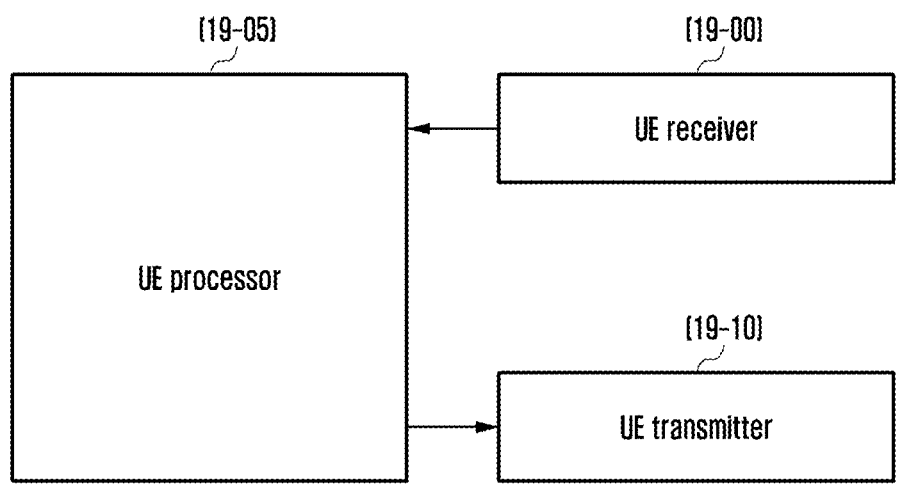
FIG. 19 illustrates a structure of a UE in a wireless communication system according to an embodiment of the disclosure.

FIG. 19 illustrates a structure of a UE in a wireless communication system according to an embodiment of the disclosure.

Referring to FIG. 19, the UE may include a transceiver, which refers to a UE receiver 19-00 and a UE transmitter 19-10, a memory (not shown), and a UE processor 19-05 (or a UE controller or processor). According to the communication method of the UE described above, the transceiver 19-00 and 19-10 of the UE, the memory, and the UE processor 19-05 may operate. However, the elements of the UE are not limited to the above-described examples. For example, the UE may include more or fewer elements than the aforementioned elements. In addition, the transceiver, the memory, and the processor may be implemented in the form of one chip.

The transceiver may transmit/receive a signal to/from the base station. Here, the signal may include control information and data. To this end, the transceiver may include an RF transmitter for up-converting and amplifying a frequency of a transmitted signal, and an RF receiver for low-noise amplifying and down-converting a received signal. However, this is only an exemplary embodiment of the transceiver, and the elements of the transceiver are not limited to the RF transmitter and the RF receiver.

In addition, the transceiver may receive a signal through a wireless channel and output the received signal to the processor, and may transmit a signal, which is output from the processor, through the wireless channel.

The memory may store programs and data necessary for the operation of the UE. In addition, the memory may store control information or data included in a signal transmitted and received by the UE. The memory may be configured as a storage medium, such as ROM, RAM, hard disk, CD-ROM, and DVD or a combination of storage media. In addition, multiple memories may exist.

In addition, the processor may control a series of processes so that the UE can operate according to the above-described embodiment. For example, the processor may receive DCI including two layers and control the elements of the UE to simultaneously receive multiple PDSCHs. Multiple processors may exist, and the processor may perform operation of controlling elements of the UE by executing a program stored in the memory.

Figure 20:
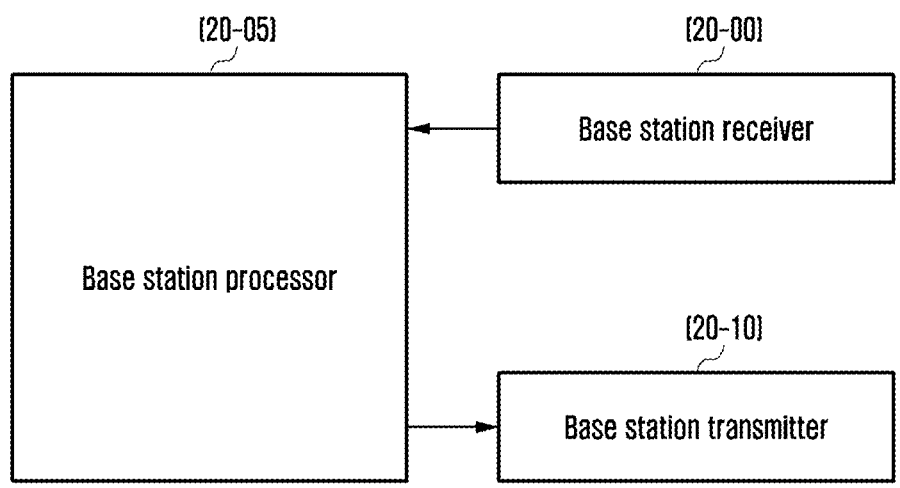
FIG. 20 illustrates a structure of a base station in a wireless communication system according to an embodiment of the disclosure.

FIG. 20 illustrates a structure of a base station in a wireless communication system according to an embodiment of the disclosure.

Referring to FIG. 20, the base station may include a transceiver, which refers to a base station receiver 20-00 and a base station transmitter 20-10, a memory (not shown), and a base station processor 20-05 (or a base station controller or processor). According to the communication method of the base station described above, the transceiver 20-00 and 20-10 of the base station, the memory, and the base station processor 20-05 may operate. However, the elements of the base station are not limited to the above-described examples. For example, the base station may include more or fewer elements than the aforementioned elements. In addition, the transceiver, the memory, and the processor may be implemented in the form of one chip.

The transceiver may transmit/receive a signal to/from the UE. Here, the signal may include control information and data. To this end, the transceiver may include an RF transmitter for up-converting and amplifying a frequency of a transmitted signal, and an RF receiver for low-noise amplifying and down-converting a received signal. However, this is only an exemplary embodiment of the transceiver, and the elements of the transceiver are not limited to the RF transmitter and the RF receiver.

In addition, the transceiver may receive a signal through a wireless channel and output the received signal to the processor, and may transmit a signal, which is output from the processor, through the wireless channel.

The memory may store programs and data necessary for the operation of the base station. In addition, the memory may store control information or data included in a signal transmitted and received by the base station. The memory may be configured as a storage medium, such as ROM, RAM, hard disk, CD-ROM, and DVD or a combination of storage media. In addition, multiple memories may exist.

The processor may control a series of processes so that the base station can operate according to the above-described embodiment. For example, the processor may configure two types of layers of DCI including allocation information for multiple PDSCHs, and may control each element of the base station in order to transmit the DCI. Multiple processors may exist, and the processor may perform operation of controlling elements of the base station by executing a program stored in the memory.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be implemented in combination without departing from the Various embodiments of the disclosure have been described. The above description of the disclosure is merely for the purpose of illustration, and is not intended to limit embodiments of the disclosure to the embodiments set forth herein. Those skilled in the art will appreciate that other specific modifications and changes may be easily made thereto without changing the technical idea or essential features of the disclosure. The scope of the disclosure should be determined not by the above description but by the appended claims, and all changes and modifications derived from the meaning and scope of the claims and equivalent concepts thereof shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   transmitting first capability information indicating a counting number of blind decodings for two physical downlink control channel (PDCCH) candidates associated with linked search spaces for PDCCH repetitions;
   receiving configuration information indicating that a first search space and a second search space are the linked search spaces for PDCCH repetitions;
   identifying monitoring occasions of a first PDCCH candidate associated with the first search space and a second PDCCH candidate associated with the second search space for detection of a first downlink control information (DCI) format and a monitoring occasion of a third PDCCH candidate for detection of a second DCI format; and
   performing a PDCCH monitoring based on the identification,
   wherein the third PDCCH candidate is not counted for a number of blind decodings, in case that one of the first PDCCH candidate and the second PDCCH candidate overlaps with the third PDCCH candidate.

2. The method of claim 1, wherein the second DCI format has a same size as the first DCI format.

3. The method of claim 1, wherein the third PDCCH candidate and one of the first PDCCH candidate and the second PDCCH candidate that overlaps with the third PDCCH candidate are associated with a same scrambling, a same set of control channel elements (CCEs), and a same control resource set (CORESET).

4. The method of claim 1, wherein the first capability information indicates either 2 or 3.

5. The method of claim 1, further comprising transmitting second capability information indicating that the terminal supports monitoring of an individual PDCCH candidate.

6. The method of claim 5, wherein the third PDCCH candidate is monitored according to the second capability information.

7. The method of claim 1, further comprising transmitting third capability information indicating a maximum number of overlaps between one of the two PDCCH candidates associated with the linked search spaces for PDCCH repetitions and an individual PDCCH candidate using a same set of control channel elements (CCEs) per slot.

8. The method of claim 1, further comprising determining a later in time of the first PDCCH candidate and the second PDCCH candidate as a reference PDCCH candidate for receiving a physical downlink shared channel (PDSCH).

9. A terminal in a wireless communication system, the terminal comprising:
   a transceiver; and
   a controller configured to:
      transmit, via the transceiver, first capability information indicating a counting number of blind decodings for two physical downlink control channel (PDCCH) candidates associated with linked search spaces for PDCCH repetitions,
      receive, via the transceiver, configuration information indicating that a first search space and a second search space are the linked search spaces for PDCCH repetitions,
      identify monitoring occasions of a first PDCCH candidate associated with the first search space and a second PDCCH candidate associated with the second search space for detection of a first downlink control information (DCI) format and a monitoring occasion of a third PDCCH candidate for detection of a second DCI format, and
      perform a PDCCH monitoring based on the identification,
   wherein the third PDCCH candidate is not counted for a number of blind decodings, in case that one of the first PDCCH candidate and the second PDCCH candidate overlaps with the third PDCCH candidate.

10. The terminal of claim 9, wherein the second DCI format has a same size as the first DCI format.

11. The terminal of claim 9, wherein the third PDCCH candidate and one of the first PDCCH candidate and the second PDCCH candidate that overlaps with the third PDCCH candidate are associated with a same scrambling, a same set of control channel elements (CCEs), and a same control resource set (CORESET).

12. The terminal of claim 9, wherein the first capability information indicates either 2 or 3.

13. The terminal of claim 9, wherein the controller is further configured to transmit, via the transceiver, second capability information indicating that the terminal supports monitoring of an individual PDCCH candidate.

14. The terminal of claim 13, wherein the third PDCCH candidate is monitored according to the second capability information.

15. The terminal of claim 9, wherein the controller is further configured to transmit, via the transceiver, third capability information indicating a maximum number of overlaps between one of the two PDCCH candidates associated with the linked search spaces for PDCCH repetitions and an individual PDCCH candidate using a same set of control channel elements (CCEs) per slot.

16. The terminal of claim 9, wherein the controller is further configured to determine a later in time of the first PDCCH candidate and the second PDCCH candidate as a reference PDCCH candidate for receiving a physical downlink shared channel (PDSCH).

* * * * *